US012462363B2

(12) United States Patent
Masuda et al.

(10) Patent No.: US 12,462,363 B2
(45) Date of Patent: Nov. 4, 2025

(54) DETECTION DEVICE, IMAGING APPARATUS, DETECTION METHOD, AND PROGRAM

(71) Applicant: FUJIFILM Corporation, Tokyo (JP)

(72) Inventors: Tomonori Masuda, Saitama (JP); Koichi Tanaka, Saitama (JP)

(73) Assignee: FUJIFILM Corporation, Tokyo (JP)

(*) Notice: Subject to any disclaimer, the term of this patent is extended or adjusted under 35 U.S.C. 154(b) by 357 days.

(21) Appl. No.: 18/317,932

(22) Filed: May 16, 2023

(65) Prior Publication Data

US 2023/0289944 A1 Sep. 14, 2023

Related U.S. Application Data

(63) Continuation of application No. PCT/JP2021/042370, filed on Nov. 18, 2021.

(30) Foreign Application Priority Data

Nov. 24, 2020 (JP) .................................. 2020-194566

(51) Int. Cl.
G06T 7/00 (2017.01)
G06T 3/4053 (2024.01)
(Continued)

(52) U.S. Cl.
CPC .......... *G06T 7/0002* (2013.01); *G06T 3/4053* (2013.01); *G06T 5/20* (2013.01);
(Continued)

(58) Field of Classification Search
CPC ....... G06T 7/0002; G06T 3/4053; G06T 5/20; G06T 5/50; G06T 5/77;
(Continued)

(56) References Cited

U.S. PATENT DOCUMENTS 8,842,212 B2 * 9/2014 Nagano .................... G02B 7/34
396/119
2009/0135452 A1 5/2009 Matsuura
(Continued)

FOREIGN PATENT DOCUMENTS

EP 1017240 7/2000
JP H06245149 9/1994
(Continued)

OTHER PUBLICATIONS

"International Search Report (Form PCT/ISA/210) of PCT/JP2021/042370", mailed on Feb. 1, 2022, with English translation thereof, pp. 1-5.
(Continued)

*Primary Examiner* — Ali Bayat
(74) *Attorney, Agent, or Firm* — JCIPRNET

(57) ABSTRACT

A processor of a detection device is configured to, in physical pixel disposition before and after movement of an image sensor having a plurality of physical pixels arranged in a first direction and a second direction intersecting the first direction, move the image sensor to a location at which a first physical pixel after movement to a location adjacent to a second physical pixel different from the first physical pixel before movement is positioned, cause the image sensor to perform imaging before and after movement, and detect a defective physical pixel from the plurality of physical pixels based on a degree of difference in pixel values between image pixels corresponding to the second physical pixel before movement and the first physical pixel after movement, respectively, among a plurality of image pixels included in each of a plurality of images obtained by being captured by the image sensor.

20 Claims, 26 Drawing Sheets

(51) Int. Cl.
  *G06T 5/20* (2006.01)
  *G06T 5/50* (2006.01)
  *G06T 5/77* (2024.01)
  *G06V 10/75* (2022.01)
  *H04N 25/68* (2023.01)

(52) U.S. Cl.
  CPC .................. *G06T 5/50* (2013.01); *G06T 5/77* (2024.01); *G06V 10/751* (2022.01); *H04N 25/68* (2023.01); *G06T 2207/10024* (2013.01); *G06T 2207/20221* (2013.01)

(58) Field of Classification Search
  CPC .......... G06T 2207/10024; G06T 2207/20221; G06V 10/751; H04N 25/68; H04N 25/71
  USPC ....................................................... 382/275
  See application file for complete search history.

(56) References Cited

U.S. PATENT DOCUMENTS

| 2013/0038762 | A1* | 2/2013 | Honda | H04N 23/10 348/E9.002 |
| 2015/0244956 | A1* | 8/2015 | Furuya | H04N 25/683 348/246 |
| 2015/0381913 | A1* | 12/2015 | Honda | H04N 25/683 348/246 |
| 2017/0180681 | A1* | 6/2017 | Okita | H04N 25/134 |
| 2019/0166320 | A1* | 5/2019 | Maruyama | H04N 25/68 |
| 2019/0296062 | A1* | 9/2019 | Terauchi | G06F 9/30003 |
| 2019/0364200 | A1* | 11/2019 | Kishi | H04N 23/681 |
| 2020/0327644 | A1* | 10/2020 | Lin | G06T 5/70 |

FOREIGN PATENT DOCUMENTS

| JP | H07322151 | 12/1995 |
| JP | H1051736 | 2/1998 |
| JP | 2000244937 | 9/2000 |
| JP | 2002359783 | 12/2002 |
| JP | 2006279990 | 10/2006 |
| JP | 2008236156 | 10/2008 |
| JP | 2009130818 | 6/2009 |

OTHER PUBLICATIONS

"Written Opinion of the International Searching Authority (Form PCT/ISA/237) of PCT/JP2021/042370", mailed on Feb. 1, 2022, with English translation thereof, pp. 1-6.

* cited by examiner

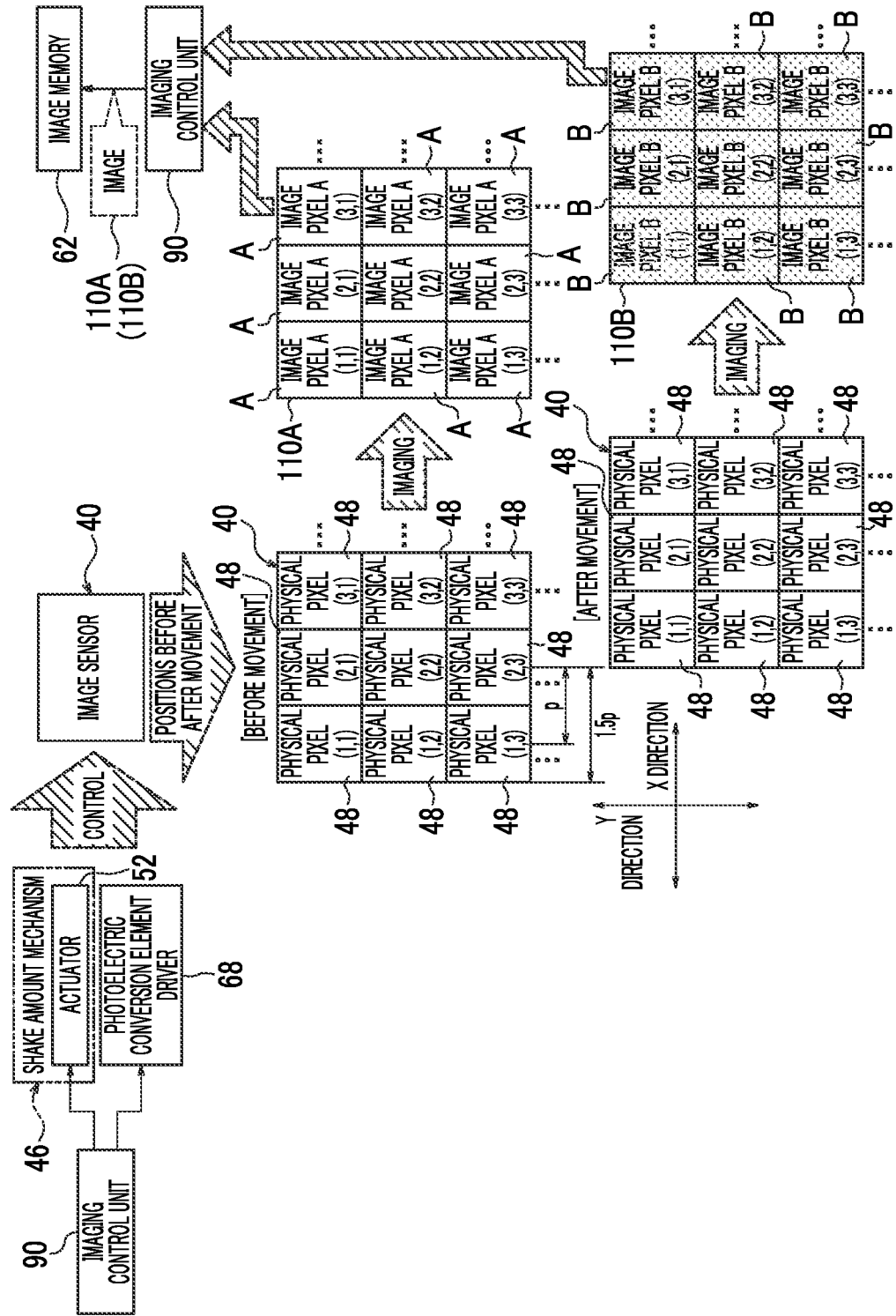

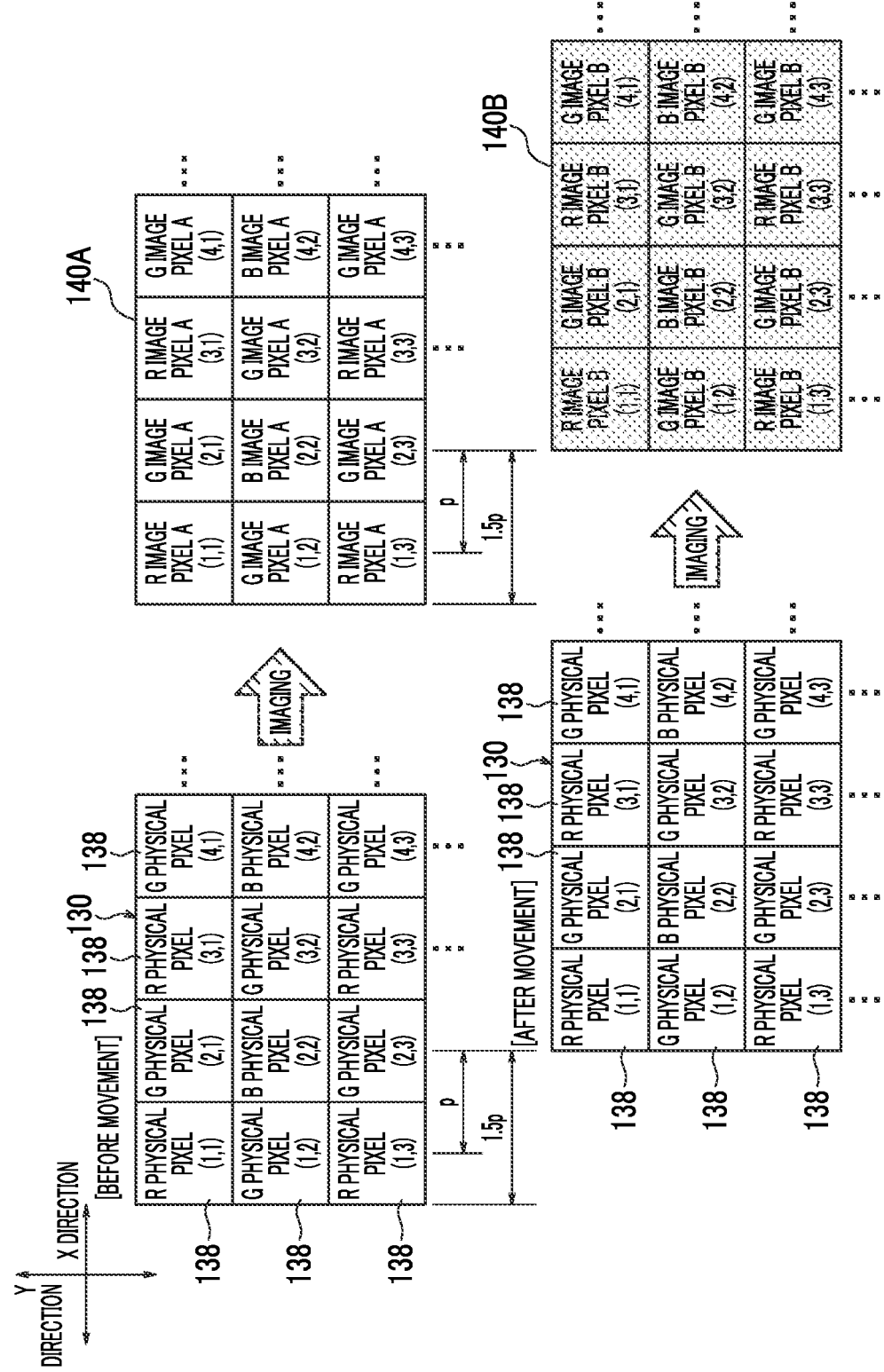

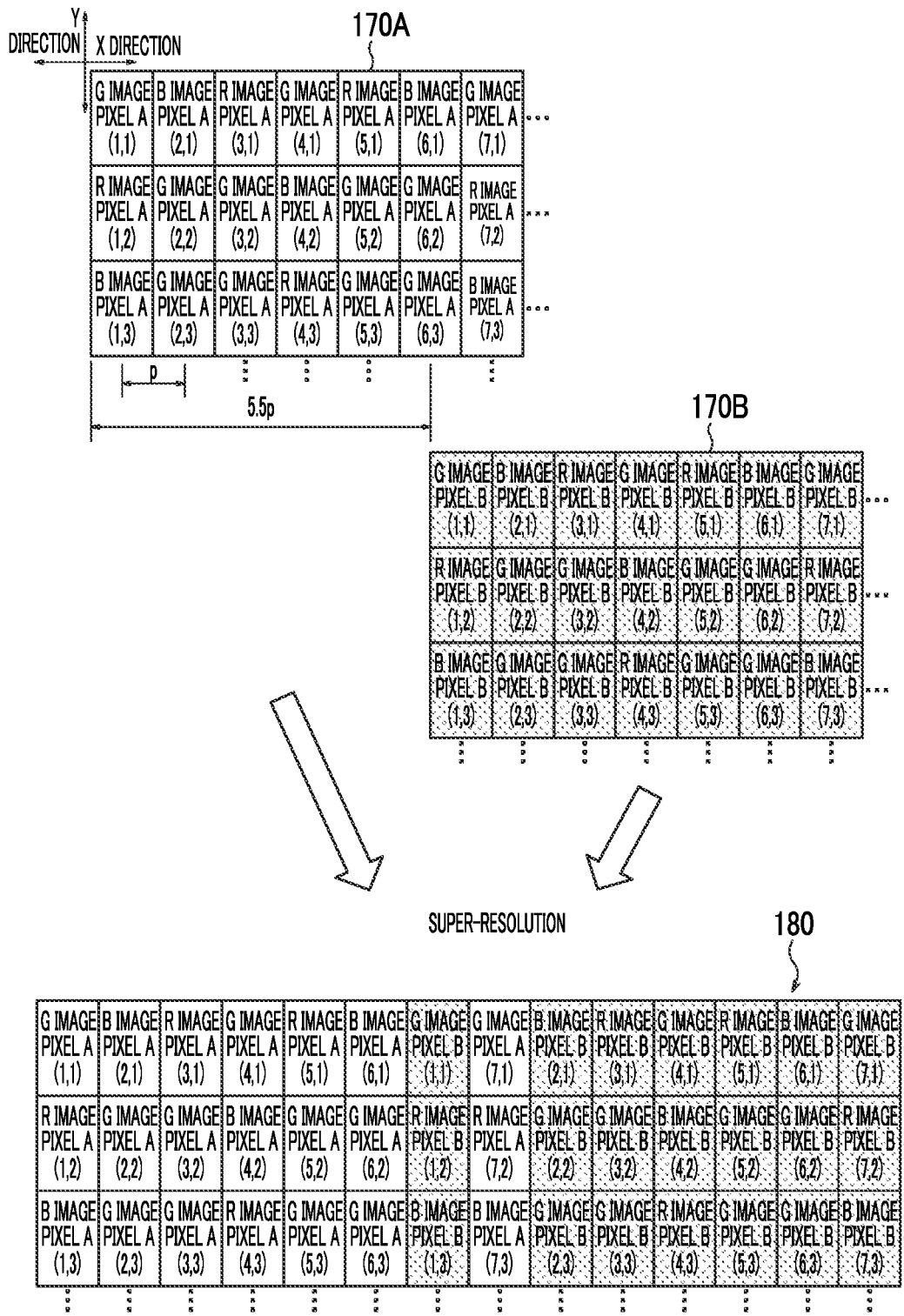

DETECTION DEVICE, IMAGING APPARATUS, DETECTION METHOD, AND PROGRAM

CROSS-REFERENCE TO RELATED APPLICATIONS

This application is a continuation application of International Application No. PCT/JP2021/042370, filed Nov. 18, 2021, the disclosure of which is incorporated herein by reference in its entirety. Further, this application claims priority under 35 USC 119 from Japanese Patent Application No. 2020-194566 filed Nov. 24, 2020, the disclosure of which is incorporated by reference herein.

BACKGROUND

1. Technical Field

The technology of the present disclosure relates to a detection device, an imaging apparatus, a detection method, and a program.

2. Description of the Related Art

JP2008-236156A discloses a photodetector comprising a vertical CCD unit, a charge accumulation gate unit, a horizontal CCD unit, and a floating diffusion amplifier. The vertical CCD unit has a TDI function of converting light into a charge and transmitting the generated charge in a vertical direction. The charge accumulation gate unit accumulates the charge transmitted from the vertical CCD unit for a time for one pixel or a plurality of pixels based on a drive signal from the outside. The horizontal CCD unit transmits the charge transmitted from the charge accumulation gate unit in a horizontal direction. The floating diffusion amplifier performs charge accumulation of the charge transmitted from the horizontal CCD unit for a time for one pixel or a plurality of pixels based on the drive signal from the outside, converts the charge into a voltage signal having an intensity according to an amount of the accumulated charge, and outputs the converted charge.

JP2006-279990A discloses a solid-state imaging apparatus that obtains captured data without relatively displacing a position of an imaging element with respect to a subject image imaged by an optical system, obtains one or more captured data by relatively displacing the position of the imaging element with respect to the subject image in horizontal and vertical directions by a predetermined amount, and creates one image data by combining the captured data. This solid-state imaging apparatus has a plurality of imaging modes in which the number of image data to be captured is different.

JP2000-244937A discloses a method of generating a high-quality image of a camera. In the method of generating the high-quality image of the camera, original video signals output from a charge coupled device (CCD) via a shift circuit unit are shifted in a predetermined direction by a predetermined distance and are stored in a temporary memory, and the video signals stored in the temporary memory are combined, are subjected to signal processing, and then are recorded in a recording medium or output to a video display device. In the method of generating the high-quality image of the camera, the original video signals output from the CCD are shifted by distances corresponding to a pitch of N/2 pixels, a pitch of N pixels, and a pitch of 3N/2 pixels in a horizontal direction, and are shifted by distances corresponding to a pitch of N/2 pixels, a pitch of N pixels, and a pitch of 3N/2 pixels in a vertical direction. In the method of generating the high-quality image of the camera, a video signal matrix having 2N times as many pixels as the number of pixels of an original video signal matrix is generated.

JP1998-51736A (JP-H10-51736A) discloses a digital image data recording device. In the digital image data recording device, a size of a recording region for recording frame unit image data representing an image of one frame on a recording medium and a recording time required for recording the frame unit image data are predetermined, and the digital image data recording device is a device that divides the frame unit image data into two field unit image data, and records the two field unit image data in the recording region. The digital image data recording device comprises an imaging unit, a division unit, a storage unit, a read out unit, and a recording control unit. The imaging unit includes a solid-state electronic imaging element that generates image data of a data amount n times (n is a positive integer of 2 or more) of the frame unit image data for the image of one frame, and outputs image data representing a subject image obtained by imaging a subject using the solid-state electronic imaging element. A division unit divides the image data output from the imaging unit into 2n field unit image data each representing the image of one frame. The storage unit temporarily stores (2n−1) field unit image data among the 2n field unit image data divided by the division unit. The read out unit reads out the (2n−1) field unit image data stored in the storage unit from the storage unit in an order for each field unit image data. The recording control unit sequentially records one field unit image data excluding the field unit image data stored in the storage unit among the 2n field unit image data divided by the division unit, and the (2n−1) field unit image data read out from the storage unit by the read out unit on the recording medium over n recording regions with a recording time of n times.

JP1994-245149A (JP-H6-245149A) discloses a pixel defect correction device comprising a plurality of solid-state imaging elements, a sampling circuit, an extraction circuit, a first arithmetic processing circuit, a second arithmetic processing circuit, a third arithmetic processing circuit, a fourth arithmetic processing circuit, a logic product circuit, and a correction circuit. In the plurality of solid-state imaging elements, a second solid-state imaging element is disposed at a position deviated by half a pixel with respect to a first solid-state imaging element. The sampling circuit samples signals read out from the plurality of solid-state imaging elements. The extraction circuit extracts, from the output of the sampling circuit, a value of a first pixel of the first solid-state imaging element, values of second and third pixels of the second solid-state imaging element, which are adjacent to the first pixel by half pixel, and values of fourth and fifth pixels of the first solid-state imaging element, which are adjacent to the first pixel by one pixel. The first arithmetic processing circuit obtains a difference between the value of the first pixel and the value of the fourth pixel, and compares the difference with a first fixed value. The second arithmetic processing circuit obtains a difference between the value of the first pixel and the value of the fifth pixel, and compares the difference with a second fixed value. The third arithmetic processing circuit obtains a difference between the value of the second pixel and the value of the fourth pixel, and compares the difference with a value obtained by multiplying the difference between the value of the first pixel and the value of the fourth pixel by a third coefficient. The fourth arithmetic processing circuit obtains a difference between the value of the third pixel and the value of the fifth pixel, and compares the difference with a value obtained by multiplying the difference between the value of the first pixel and the value of the fifth pixel by a fourth coefficient. The logic product circuit obtains the logical product of the outputs of the first, second, third, and fourth arithmetic processing circuits. The correction circuit corrects the output of the sampling circuit by the output of the logic product circuit.

SUMMARY

One embodiment according to the technology of the present disclosure provides, as one aspect, a detection device, an imaging apparatus, a detection method, and a program capable of detecting a defective physical pixel from a plurality of physical pixels included in an image sensor based on a plurality of images obtained by being captured by the image sensor before and after movement of the image sensor.

A first aspect of the technology of the present disclosure relates to a detection device comprising a processor, and a memory coupled to or integrated with the processor, in which the processor is configured to, in physical pixel disposition before and after movement of an image sensor having a plurality of physical pixels arranged in a first direction and a second direction intersecting the first direction, move the image sensor to a location at which a first physical pixel after movement to a location adjacent to a second physical pixel different from the first physical pixel before movement is positioned, cause the image sensor to perform imaging before and after movement, and detect a defective physical pixel from the plurality of physical pixels based on a degree of difference in pixel values between image pixels corresponding to the second physical pixel before movement and the first physical pixel after movement, respectively, among a plurality of image pixels included in each of a plurality of images obtained by being captured by the image sensor.

A second aspect of the technology of the present disclosure relates to the detection device according to the first aspect, in which the processor is configured to store in the memory, the plurality of images obtained by being captured by the image sensor, and detect the defective physical pixel based on the degree of difference in pixel values between the image pixels among the plurality of image pixels included in each of the plurality of images stored in the memory.

A third aspect of the technology of the present disclosure relates to the detection device according to the first or second aspect, in which, in a case in which pitches between the plurality of physical pixels in the first direction or the second direction are 1, the processor is configured to move the image sensor in the first direction or the second direction by a movement amount that is a decimal larger than 1.

A fourth aspect of the technology of the present disclosure relates to the detection device according to any one of the first to third aspects, in which, in a case in which pitches between the plurality of physical pixels in the first direction or the second direction are p, a natural number is n, and a pure decimal is d, the processor is configured to move the image sensor in the first direction or the second direction by a movement amount of $(n+d) \times p$.

A fifth aspect of the technology of the present disclosure relates to the detection device according to any one of the first to fourth aspects, in which the processor is configured to correct a pixel value of a first image pixel corresponding to the defective physical pixel based on a pixel value of a second image pixel adjacent to the first image pixel.

A sixth aspect of the technology of the present disclosure relates to the detection device according to any one of the first to fifth aspects, in which the processor is configured to output positional information corresponding to a position of the defective physical pixel.

A seventh aspect of the technology of the present disclosure relates to the detection device according to any one of the first to sixth aspects, in which the processor is configured to detect the defective physical pixel based on a degree of difference between a pixel value of an out-of-definition image pixel of which a pixel value is out of a predetermined range and a pixel value of an image pixel adjacent to the out-of-definition image pixel.

An eighth aspect of the technology of the present disclosure relates to the detection device according to any one of the first to seventh aspects, in which the image sensor is a monochrome type image sensor.

A ninth aspect of the technology of the present disclosure relates to the detection device according to the eighth aspect, in which, in a case in which pitches between the plurality of physical pixels in the first direction or the second direction are p, the processor is configured to move the image sensor in the first direction or the second direction by a movement amount of $1.5 \times p$.

A tenth aspect of the technology of the present disclosure relates to the detection device according to any one of the first to seventh aspects, in which the image sensor is a color type image sensor in which color filters of different colors are assigned to the plurality of physical pixels in a base arrangement having periodicity, and in a case in which pitches between the plurality of physical pixels in the first direction or the second direction are p, a natural number is n, and the number of physical pixels per period of the base arrangement is T, the processor is configured to move the image sensor in the first direction or the second direction by a movement amount of $\{(T-1)+0.5\} \times n \times p$.

An eleventh aspect of the technology of the present disclosure relates to the detection device according to the tenth aspect, in which the base arrangement is Bayer arrangement, and the movement amount is defined as $1.5 \times p$.

A twelfth aspect of the technology of the present disclosure relates to the detection device according to the tenth aspect, in which the base arrangement is X-Trans (registered trademark) type arrangement, and the movement amount is defined as $5.5 \times p$.

A thirteenth aspect of the technology of the present disclosure relates to the detection device according to any one of the first to seventh aspects, in which the image sensor is a color type image sensor in which color filters of different colors are assigned to the plurality of physical pixels in a base arrangement having periodicity, and the processor is configured to, in the physical pixel disposition before and after movement of the image sensor, move the image sensor to a location at which a third physical pixel after movement to a location that overlaps with a fourth physical pixel to which a color filter of the same color as the third physical pixel before movement is assigned is positioned, cause the image sensor to perform imaging before and after movement, and detect the defective physical pixel from the plurality of physical pixels based on a degree of difference in pixel values between image pixels of the same color corresponding to the fourth physical pixel before movement and the third physical pixel after movement, respectively, among the plurality of image pixels included in each of the plurality of images obtained by being captured by the image sensor.

A fourteenth aspect of the technology of the present disclosure relates to the detection device according to any one of the first to seventh aspects, or thirteenth aspect, in which the image sensor is a color type image sensor in which color filters of different colors are assigned to the plurality of physical pixels in a base arrangement having periodicity, and the processor is configured to, in the physical pixel disposition before and after movement of the image sensor, move the image sensor to a location at which the first physical pixel after movement to a location adjacent to the second physical pixel to which a color filter of the same color as the first physical pixel before movement is assigned is positioned, cause the image sensor to perform imaging before and after movement, and detect the defective physical pixel from the plurality of physical pixels based on a degree of difference in pixel values between image pixels of the same color corresponding to the second physical pixel before movement and the first physical pixel after movement, respectively, among the plurality of image pixels included in each of the plurality of images obtained by being captured by the image sensor.

A fifteenth aspect of the technology of the present disclosure relates to the detection device according to the fourteenth aspect, in which, in a case in which pitches between the plurality of physical pixels in the first direction or the second direction are p, m is a natural number of 2 or more, and a pure decimal is d, the processor performs control of moving the image sensor in the first direction or the second direction by a movement amount of $(m+d) \times p$.

A sixteenth aspect of the technology of the present disclosure relates to the detection device according to the fifteenth aspect, in which the movement amount is defined as $2.5 \times p$.

A seventeenth aspect of the technology of the present disclosure relates to the detection device according to any one of the thirteenth to sixteenth aspects, in which the processor is configured to perform super-resolution on the plurality of images to generate a plurality of monochromatic super-resolution images for each color of the color filter, and combine the plurality of monochromatic super-resolution images.

An eighteenth aspect according to the technology of the present disclosure relates to an imaging apparatus comprising the detection device according to any one of the first to seventeenth aspects, the image sensor, and a moving mechanism that moves the image sensor at least one of the first direction or the second direction.

A nineteenth aspect according to the technology of the present disclosure relates to a detection method comprising, in physical pixel disposition before and after movement of an image sensor having a plurality of physical pixels arranged in a first direction and a second direction intersecting the first direction, moving the image sensor to a location at which a first physical pixel after movement to a location adjacent to a second physical pixel different from the first physical pixel before movement is positioned, causing the image sensor to perform imaging before and after movement, and detecting a defective physical pixel from the plurality of physical pixels based on a degree of difference in pixel values between image pixels corresponding to the second physical pixel before movement and the first physical pixel after movement, respectively, among a plurality of image pixels included in each of a plurality of images obtained by being captured by the image sensor.

A twentieth aspect according to the technology of the present disclosure relates to a non-transitory computer-readable storage medium storing a program for causing a computer to execute a process comprising, in physical pixel disposition before and after movement of an image sensor having a plurality of physical pixels arranged in a first direction and a second direction intersecting the first direction, moving the image sensor to a location at which a first physical pixel after movement to a location adjacent to a second physical pixel different from the first physical pixel before movement is positioned, causing the image sensor to perform imaging before and after movement, and detecting a defective physical pixel from the plurality of physical pixels based on a degree of difference in pixel values between image pixels corresponding to the second physical pixel before movement and the first physical pixel after movement, respectively, among a plurality of image pixels included in each of a plurality of images obtained by being captured by the image sensor.

BRIEF DESCRIPTION OF THE DRAWINGS

FIG. 7A is a conceptual diagram showing an example of a state in which a plurality of images are captured by the image sensor shown in FIG. 6.

FIG. 10A is a conceptual diagram showing an example of a state in which a plurality of images are captured by the image sensor shown in FIG. 9.

FIG. 12B is a conceptual diagram showing an example of a state in which a super-resolution image is generated from the plurality of images shown in FIG. 12A.

DETAILED DESCRIPTION

Hereinafter, an example of an embodiment of a detection device, an imaging apparatus, a detection method, and a program according to the technology of the present disclosure will be described with reference to the accompanying drawings.

The terms used in the following description will be described first.

CPU refers to an abbreviation of "Central Processing Unit". RAM refers to an abbreviation of "Random Access Memory". IC refers to an abbreviation of "Integrated Circuit". ASIC refers to an abbreviation of "Application Specific Integrated Circuit". PLD refers to an abbreviation of "Programmable Logic Device". FPGA refers to an abbreviation of "Field-Programmable Gate Array". SoC refers to an abbreviation of "System-on-a-Chip". SSD refers to an abbreviation of "Solid State Drive". USB refers to an abbreviation of "Universal Serial Bus". HDD refers to an abbreviation of "Hard Disk Drive". EEPROM refers to an abbreviation of "Electrically Erasable and Programmable Read Only Memory". EL refers to an abbreviation of "Electro-Luminescence". IF refers to an abbreviation of "Interface". UI refers to an abbreviation of "User Interface". CMOS refers to an abbreviation of "Complementary Metal Oxide Semiconductor". CCD refers to an abbreviation of "Charge Coupled Device". LAN refers to an abbreviation of "Local Area Network". WAN refers to an abbreviation of "Wide Area Network".

In the description of the present specification, "vertical/perpendicular" refers to the verticality/perpendicularity in the sense of including an error generally allowed in the technical field to which the technology of the present disclosure belongs, that is, the error to the extent that it does not contradict the purpose of the technology of the present disclosure, in addition to the exact verticality/perpendicularity. In the description of the present specification, "match" refers to the match in the sense of including an error generally allowed in the technical field to which the technology of the present disclosure belongs, that is, the error to the extent that it does not contradict the purpose of the technology of the present disclosure, in addition to the exact match.

First Embodiment

Figure 1:
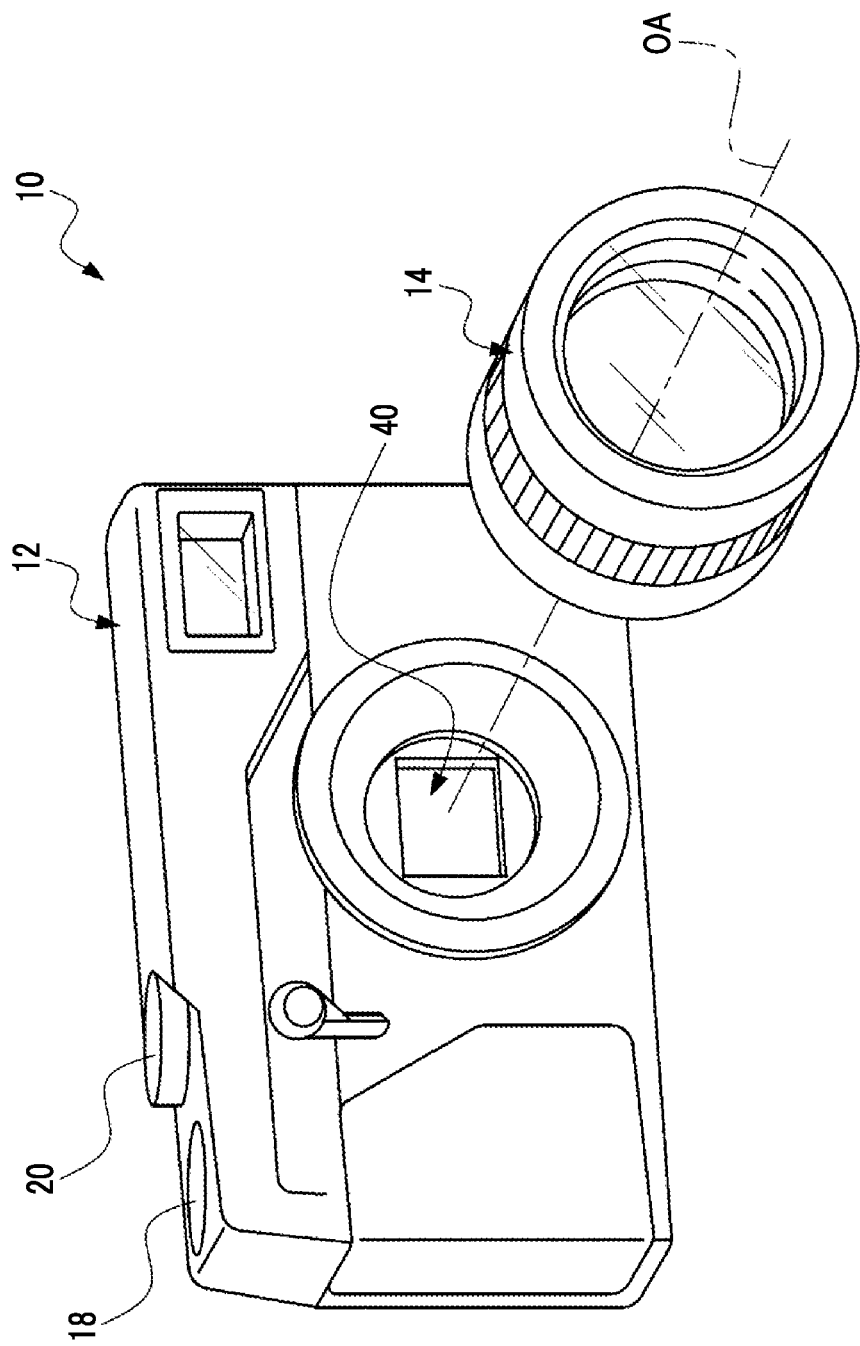
FIG. 1 is a perspective view showing an example of an appearance of an imaging apparatus.

First, the description of a first embodiment will be made. As an example, as shown in FIG. 1, an imaging apparatus 10 is a digital camera that is a lens interchangeable type and omits a reflex mirror. The imaging apparatus 10 comprises an imaging apparatus body 12 and an interchangeable lens 14 that is interchangeably mounted on the imaging apparatus body 12.

It should be noted that examples of the imaging apparatus 10 include a digital camera that is a lens interchangeable type and does not use a reflex mirror. However, the technology of the present disclosure is not limited to this, and a lens-fixed type digital camera may be adopted, a digital camera using a reflex mirror may be adopted, or a digital camera built in various electronic apparatuses, such as a smart device, a wearable terminal, a cell observation device, an ophthalmic observation device, or a surgical microscope, may be adopted.

The imaging apparatus body 12 is provided with an image sensor 40. The image sensor 40 is a CMOS image sensor, for example. The image sensor 40 images an imaging region including a subject group. In a case in which the interchangeable lens 14 is mounted on the imaging apparatus body 12, subject light representing a subject is transmitted through the interchangeable lens 14 and imaged on the image sensor 40, so that image data representing the image of the subject is generated by the image sensor 40.

It should be noted that the CMOS image sensor is shown as an example of the image sensor 40, but the technology of the present disclosure is not limited to this. For example, the technology of the present disclosure is established even in a case in which the image sensor 40 is another type of image sensor, such as a CCD image sensor.

An upper surface of the imaging apparatus body 12 is provided with a release button 18 and a dial 20. The dial 20 is operated in a case of setting an operation mode of an imaging system, an operation mode of a playback system, and the like, and the imaging apparatus 10 selectively sets an imaging mode and a playback mode as the operation modes by operating the dial 20.

The release button 18 functions as an imaging preparation instruction unit and an imaging instruction unit, and can detect a push operation of two stages of an imaging preparation instruction state and an imaging instruction state. The imaging preparation instruction state refers to, for example, a state in which the release button 18 is pushed to an intermediate position (half push position) from a standby position, and the imaging instruction state refers to a state in which the release button 18 is pushed to a final push position (full push position) beyond the intermediate position.

It should be noted that, in the following description, the "state in which the release button 18 is pushed to the half push position from the standby position" will be referred to as a "half push state", and the "state in which the release button 18 is pushed to the full push position from the standby position" will be referred to as a "full push state". Depending on the configuration of the imaging apparatus 10, the imaging preparation instruction state may be a state in which a finger of a user comes into contact with the release button 18, and the imaging instruction state may be a state in which the finger of the user who performs the operation proceeds from the state of coming into contact with the release button 18 to a state of being separated from the release button 18.

Figure 2:
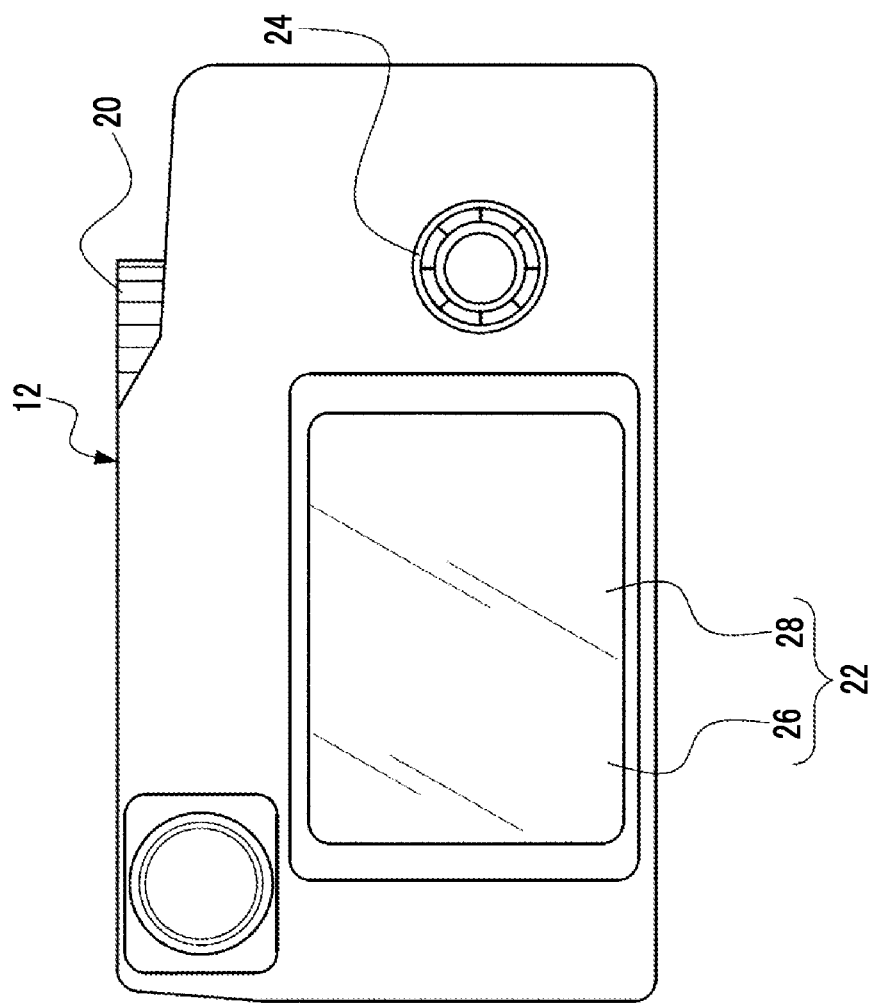
FIG. 2 is a rear view showing an example of an appearance of a rear side of the imaging apparatus shown in FIG. 1.

As an example, as shown in FIG. 2, a rear surface of the imaging apparatus body 12 is provided with a touch panel display 22 and an instruction key 24. The touch panel display 22 comprises a display 26 and a touch panel 28. Examples of the display 26 include an organic EL display. The display 26 may be another type of display, such as a liquid crystal display or an inorganic EL display, instead of the organic EL display.

The display 26 displays an image and/or character information. The display 26 is used for imaging for a live view image, that is, for displaying the live view image obtained by performing continuous imaging in a case in which the imaging apparatus 10 is in the imaging mode. The "live view image" refers to a moving image for display based on the image data obtained by being captured by the image sensor 40. In general, the live view image is also referred to as a live preview image.

The display 26 is also used for displaying a still image obtained by performing the imaging for the still image in a case in which the imaging apparatus 10 is instructed to capture the still image via the release button 18. Further, the display 26 is used for displaying a playback image and displaying a menu screen in a case in which the imaging apparatus 10 is in the playback mode.

The touch panel 28 is a transmissive touch panel and is superimposed on a surface of a display region of the display 26. The touch panel 28 receives an instruction from the user by sensing a contact of a finger or an indicator, such as a stylus pen. It should be noted that, in the following description, for convenience of description, a state in which the user turns on a soft key for starting the imaging via the touch panel 28 is also included in the "full push state" described above.

In the present embodiment, examples of the touch panel display 22 include an out-cell type touch panel display in which the touch panel 28 is superimposed on the surface of the display region of the display 26, but this is merely an example. For example, an on-cell type or in-cell type touch panel display can also be applied as the touch panel display 22.

The instruction key 24 receives various instructions. Here, the "various instructions" refer to various instructions, such as an instruction for displaying a menu screen on which various menus can be selected, an instruction for selecting one or a plurality of menus, an instruction for confirming a selected content, an instruction for deleting the selected content, zooming in, zooming out, and frame advance. These instructions may be given by the touch panel 28.

Figure 3:
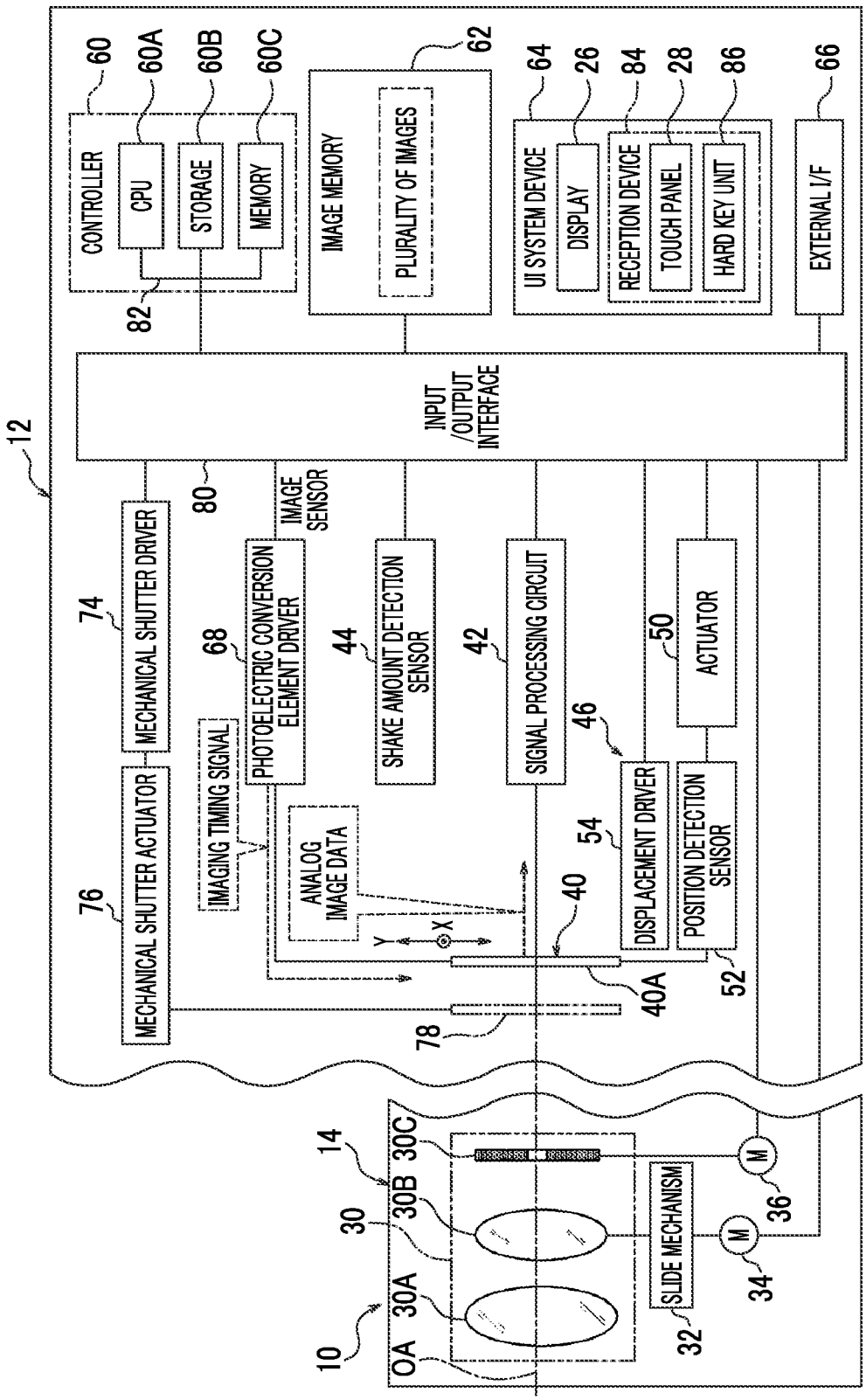
FIG. 3 is a schematic configuration diagram showing an example of a hardware configuration of the imaging apparatus shown in FIG. 1.

As an example, as shown in FIG. 3, the interchangeable lens 14 comprises an imaging lens 30. The imaging lens 30 comprises an objective lens 30A, a focus lens 30B, and a stop 30C. The objective lens 30A, the focus lens 30B, and the stop 30C are disposed in an order of the objective lens 30A, the focus lens 30B, and the stop 30C along an optical axis OA (see FIG. 1) from a subject side (object side) to the imaging apparatus body 12 side (image side).

In addition, the interchangeable lens 14 comprises a slide mechanism 32, a motor 34, and a motor 36. The focus lens 30B is attached to the slide mechanism 32 in a slidable manner along the optical axis OA. In addition, the motor 34 is connected to the slide mechanism 32, and the slide mechanism 32 moves the focus lens 30B along the optical axis OA by receiving power of the motor 34 to operate. The stop 30C is a stop with an aperture having a variable size. The motor 36 is connected to the stop 30C, and the stop 30C adjusts exposure by receiving power of the motor 36 to operate. It should be noted that a structure and/or an operation method of the interchangeable lens 14 can be changed as needed.

The motor 34 and the motor 36 are connected to the imaging apparatus body 12 via a mount (not shown), and driving of the motor 34 and the motor 36 is controlled in response to a command from the imaging apparatus body 12. It should be noted that a stepping motor is adopted as an example of the motor 34 and the motor 36. Therefore, the motor 34 and the motor 36 operate in synchronization with a pulse signal in response to the command from the imaging apparatus body 12. In the example shown in FIG. 3, an example is shown in which the motor 34 and the motor 36 are provided in the interchangeable lens 14. However, the technology of the present disclosure is not limited to this, and one of the motor 34 or the motor 36 may be provided in the imaging apparatus body 12, or both the motor 34 and the motor 36 may be provided in the imaging apparatus body 12.

The imaging apparatus body 12 comprises an image sensor 40, a signal processing circuit 42, a shake amount detection sensor 44, and a shake correction mechanism 46.

The image sensor 40 includes a light-receiving surface 40A. The image sensor 40 is a photoelectric conversion element, for example. Sometimes the image sensor 40 is referred to as a solid-state imaging element. For example, the image sensor 40 is disposed in the imaging apparatus body 12 (see FIG. 1) such that the center of the light-receiving surface 40A matches the optical axis OA. The image sensor 40 may be either a monochrome type image sensor or a color type image sensor in which color filters of different colors are assigned to a plurality of physical pixels. In the first embodiment, for example, the image sensor 40 is the monochrome type image sensor. It should be noted that the monochrome type image sensor 40 according to the first embodiment is, for example, an image sensor that does not comprise a plurality of color filters, but the technology of the present disclosure is not limited to this. Even in the monochrome type image sensor in which a plurality of monochromatic color filters are assigned to the plurality of physical pixels, the same effect as the effect of the first embodiment is obtained.

The signal processing circuit 42 is connected to the image sensor 40. In a case in which the interchangeable lens 14 is mounted on the imaging apparatus body 12, the subject light incident on the imaging lens 30 is imaged on the light-receiving surface 40A by the imaging lens 30. Under the control of a photoelectric conversion element driver 68, which will be described later, the image sensor 40 photoelectrically converts the subject light received by the light-receiving surface 40A, and outputs an electric signal according to a light amount of the subject light to the signal processing circuit 42 as analog image data representing the subject light. The signal processing circuit 42 generates digital image data by digitizing the analog image data input from the image sensor 40.

The shake amount detection sensor 44 is, for example, a device including a gyro sensor, and detects a shake amount of the imaging apparatus 10 in a direction perpendicular to the optical axis OA. The shake amount detection sensor 44 outputs the detected shake amount to a CPU 60A, which will be described later.

The shake amount detection sensor 44 detects the shake amount of the imaging apparatus 10 in each of an X direction and a Y direction as an example of the direction perpendicular to the optical axis OA. For example, the X direction is a direction parallel to a pitch axis of the imaging apparatus 10, and the Y direction is a direction parallel to a yaw axis of the imaging apparatus 10. The X direction and the Y direction are orthogonal to each other. The gyro sensor provided in the shake amount detection sensor 44 detects a rotational shake amount about each axis of the pitch axis, the yaw axis, and a roll axis (axis parallel to the optical axis OA) of the imaging apparatus 10. The shake amount detection sensor 44 converts the rotational shake amount about the pitch axis and the rotational shake amount about the yaw axis detected by the gyro sensor into a shake amount in a two-dimensional plane parallel to the pitch axis and the yaw axis to detect the shake amount of the imaging apparatus 10 in each direction of the X direction and the Y direction.

It should be noted that examples of the shake amount detection sensor 44 include the device including the gyro sensor, but this is merely an example, and the shake amount detection sensor 44 may be an acceleration sensor. The acceleration sensor detects the shake amount in the two-dimensional plane parallel to the pitch axis and the yaw axis of the imaging apparatus 10.

In addition, although the form example is shown in which the shake amount is detected by a physical sensor, such as the shake amount detection sensor 44, the technology of the present disclosure is not limited to this. For example, a movement vector obtained by comparing images before and after in a time series stored in an image memory 62, which will be described later, may be used as the shake amount. Also, the shake amount to be finally used may be derived based on the shake amount detected by the physical sensor and the movement vector obtained by the image processing.

The shake correction mechanism 46 is a mechanism that applies power generated by a drive source, such as a motor (for example, a voice coil motor), to the image sensor 40 to move the image sensor 40 in a direction perpendicular to the optical axis OA to correct the shake. The shake correction mechanism 46 moves the image sensor 40 in the X direction and the Y direction as an example of the direction perpendicular to the optical axis OA. The shake correction mechanism 46 is an example of a "moving mechanism" according to the technology of the present disclosure.

The shake correction mechanism 46 comprises a displacement driver 50, an actuator 52, and a position detection sensor 54. As a method of correcting the shake by the shake correction mechanism 46, various well-known methods can be adopted. As the method of correcting the shake, a method of correcting the shake by the displacement driver 50 moving the image sensor 40 via the actuator 52 in response to an instruction from the CPU 60A based on the shake amount detected by the shake amount detection sensor 44 is adopted. Specifically, the image sensor 40 is moved in a direction of canceling the shake by a shake cancellation amount, so that the correction of the shake is performed.

The actuator 52 is, for example, a shift mechanism on which the voice coil motor is mounted, and moves the image sensor 40 in the X direction and the Y direction by driving the voice coil motor. It should be noted that, although the shift mechanism on which the voice coil motor is mounted is adopted as an example of the actuator 52, the technology of the present disclosure is not limited to this, and the power source, such as a stepping motor or a piezo element may be applied instead of the voice coil motor.

The position detection sensor 54 detects a position of the image sensor 40 and outputs a position signal indicating the detected position. A device including a hall element is adopted as an example of the position detection sensor 54. The position of the image sensor 40 detected by the position detection sensor 54 refers to a position in a two-dimensional plane parallel to the light-receiving surface 40A of the image sensor 40. The two-dimensional plane is a plane perpendicular to the optical axis OA. It should be noted that, in the present embodiment, the device including the hall element is adopted as an example of the position detection sensor 54, but the technology of the present disclosure is not limited to this, and a magnetic sensor, a photosensor, or the like may be adopted instead of the hall element.

In addition, the imaging apparatus body 12 comprises a controller 60, an image memory 62, a UI system device 64, an external I/F 66, a photoelectric conversion element driver 68, a mechanical shutter driver 74, a mechanical shutter actuator 76, a mechanical shutter 78, and an input/output interface 80.

The controller 60, the image memory 62, the UI system device 64, the external I/F 66, the photoelectric conversion element driver 68, the mechanical shutter driver 74, the signal processing circuit 42, the shake amount detection sensor 44, and the displacement driver 50 are connected to the input/output interface 80.

The controller 60 comprises the CPU 60A, a storage 60B, and a memory 60C. The CPU 60A is an example of a "processor" according to the technology of the present disclosure, the memory 60C and the image memory 62 are examples of a "memory" according to the technology of the present disclosure, and the controller 60 is an example of a "detection device" and a "computer" according to the technology of the present disclosure.

The CPU 60A, the storage 60B, and the memory 60C are connected via a bus 82, and the bus 82 is connected to the input/output interface 80.

It should be noted that, in the example shown in FIG. 3, one bus is shown as the bus 82 for convenience of illustration, but a plurality of buses may be adopted. The bus 82 may be a serial bus, or may be a parallel bus including a data bus, an address bus, a control bus, and the like.

The storage 60B stores various parameters and various programs. The storage 60B is a non-volatile storage device. An EEPROM is adopted as an example of the storage 60B. The EEPROM is merely an example, and an HDD and/or an SSD or the like may be applied as the storage 60B instead of the EEPROM or together with the EEPROM. In addition, the memory 60C temporarily stores various information, and is used as a work memory. Examples of the memory 60C include a RAM, but the technology of the present disclosure is not limited to this, and another type of storage devices may be adopted.

Various programs are stored in the storage 60B. The CPU 60A reads out a needed program from the storage 60B, and executes the read out program on the memory 60C. The CPU 60A controls the entire imaging apparatus body 12 according to the program executed on the memory 60C. In the example shown in FIG. 3, the image memory 62, the UI system device 64, the external I/F 66, the photoelectric conversion element driver 68, the mechanical shutter driver 74, and the displacement driver 50 are controlled by the CPU 60A.

The image sensor 40 is connected to the photoelectric conversion element driver 68. The photoelectric conversion element driver 68 supplies an imaging timing signal defining a timing of the imaging performed by the image sensor 40 to the image sensor 40 in response to the instruction from the CPU 60A. The image sensor 40 performs reset, exposure, and output of the electric signal in response to the imaging timing signal supplied from the photoelectric conversion element driver 68.

The mechanical shutter 78 is, for example, a focal plane shutter, and is disposed between the stop 30C and the light-receiving surface 40A. The mechanical shutter 78 comprises a front curtain (not shown) and a rear curtain (not shown). Each of the front curtain and the rear curtain comprises a plurality of blades. The front curtain is disposed on the subject side with respect to the rear curtain.

The mechanical shutter actuator 76 is an actuator including a front curtain solenoid (not shown) and a rear curtain solenoid (not shown). The front curtain solenoid is a drive source for the front curtain, and is mechanically connected to the front curtain. The rear curtain solenoid is a drive source for the rear curtain, and is mechanically connected to the rear curtain. The mechanical shutter driver 74 controls the mechanical shutter actuator 76 in response to the instruction from the CPU 60A.

The front curtain solenoid selectively performs winding and pulling down of the front curtain by generating power under the control of the mechanical shutter driver 74 and applying the generated power to the front curtain. The rear curtain solenoid selectively performs winding and pulling down of the rear curtain by generating power under the control of the mechanical shutter driver 74 and applying the generated power to the rear curtain. In the imaging apparatus 10, the opening and closing of the front curtain and the opening and closing of the rear curtain are controlled by the CPU 60A, so that an exposure amount to the image sensor 40 is controlled.

In the imaging apparatus 10, the imaging for the live view image and the imaging for a record image for recording the still image and/or the moving image are performed by an exposure sequential reading out method (rolling shutter method). The image sensor 40 has an electronic shutter function, and the imaging for the live view image is realized by activating the electronic shutter function without operating the mechanical shutter 78 in a fully opened state.

On the other hand, imaging accompanied by the main exposure, that is, the imaging for the still image (hereinafter, also referred to as "main exposure imaging") is realized by activating the electronic shutter function and operating the mechanical shutter 78 such that the mechanical shutter 78 transitions from a front curtain closed state to a rear curtain closed state. An image obtained by performing the imaging for the live view image and the imaging for the record image for recording the still image and/or the moving image is an example of an "image" according to the technology of the present disclosure.

The digital image data generated by the signal processing circuit 42 is stored as the image in the image memory 62. The CPU 60A acquires the digital image data from the image memory 62 and executes various processing by using the acquired digital image data.

The UI system device 64 comprises the display 26, and the CPU 60A displays various information on the display 26. Moreover, the UI system device 64 comprises a reception device 84. The reception device 84 comprises the touch panel 28 and a hard key unit 86. The hard key unit 86 is a plurality of hard keys including the instruction key 24 (see FIG. 2). The CPU 60A is operated in response to various instructions received by the touch panel 28. It should be noted that, although the hard key unit 86 is provided in the UI system device 64, the technology of the present disclosure is not limited to this, and for example, the hard key unit 86 may be connected to the external I/F 66.

The external I/F 66 controls transferring of various information with a device (hereinafter, also referred to as an "external device") that is present outside the imaging apparatus 10. Examples of the external I/F 66 include a USB interface. The external device (not shown), such as a smart device, a personal computer, a server, a USB memory, a memory card, and/or a printer, is directly or indirectly connected to the USB interface.

The interchangeable lens 14 comprises a lens CPU (not shown). The lens CPU is a CPU provided in the interchangeable lens 14, and executes a predetermined program to control the operation of the interchangeable lens 14. A first motor driver (not shown) and a second motor driver (not shown) are provided in the interchangeable lens 14. The lens CPU is connected to the motor 34 via the first motor driver. Also, the lens CPU is connected to the motor 36 via the second motor driver. The motor 34 is connected to the input/output interface 80 of the imaging apparatus body 12 via the first motor driver and the lens CPU, and the motor 36 is connected to the input/output interface 80 of the imaging apparatus body 12 via the second motor driver and the lens CPU. The lens CPU controls the operation of the interchangeable lens 14 in response to the instruction given from the CPU 60A via the input/output interface 80.

The lens CPU controls the motor 34 via the first motor driver in response to the instruction from the CPU 60A. By controlling the motor 34 in this way, the position of the focus lens 30B on the optical axis OA is controlled via the slide mechanism 32. Moreover, the lens CPU controls the motor 36 via the second motor driver in response to the instruction from the CPU 60A. By controlling the motor 36 in this way, the size of the aperture of the stop 30C is controlled.

The displacement driver 50 is connected to the actuator 52. The CPU 60A acquires the shake amount detected by the shake amount detection sensor 44, and outputs a command to control the shake correction mechanism 46 based on the acquired shake amount to the displacement driver 50.

Figure 4:
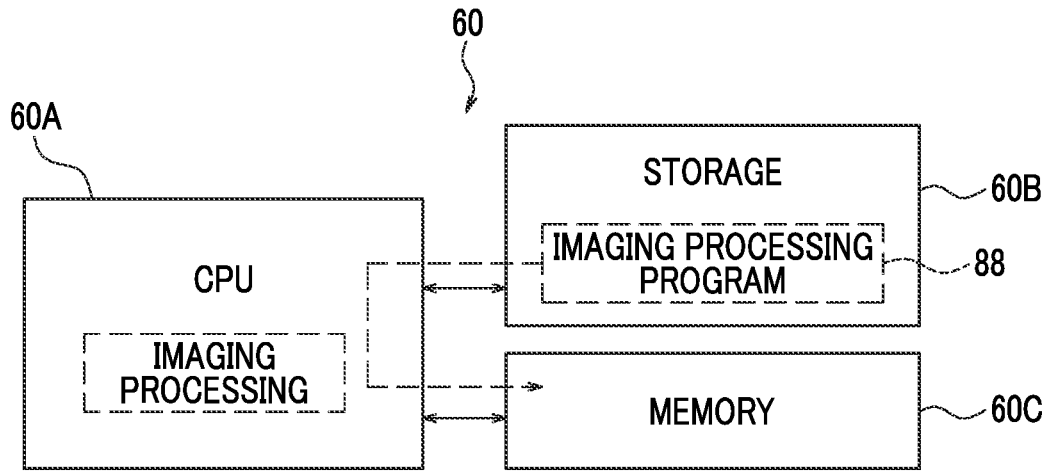
FIG. 4 is a block diagram showing an example of a configuration of a controller shown in FIG. 3.

As an example, as shown in FIG. 4, an imaging processing program 88 is stored in the storage 60B. The imaging processing program 88 is an example of a "program" according to the technology of the present disclosure. The CPU 60A reads out the imaging processing program 88 from the storage 60B and executes the read out imaging processing program 88 on the memory 60C. The CPU 60A performs the imaging processing according to the imaging processing program 88 executed on the memory 60C.

Figure 5:
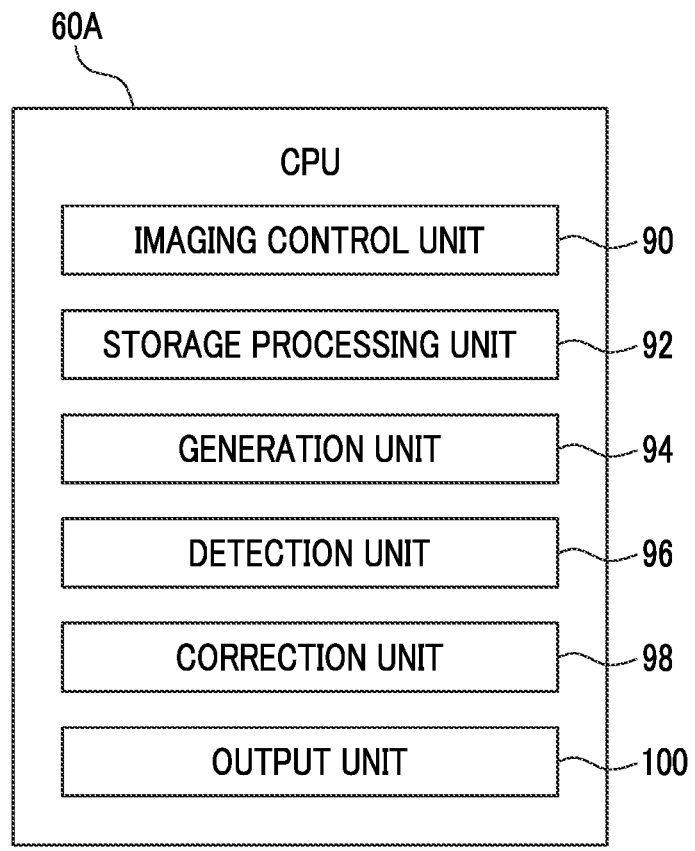
FIG. 5 is a block diagram showing an example of a main function of a CPU shown in FIG. 4.

As an example, as shown in FIG. 5, the CPU 60A executes the imaging processing program 88 to operate as an imaging control unit 90, a storage processing unit 92, a generation unit 94, a detection unit 96, a correction unit 98, and an output unit 100.

Figure 6:
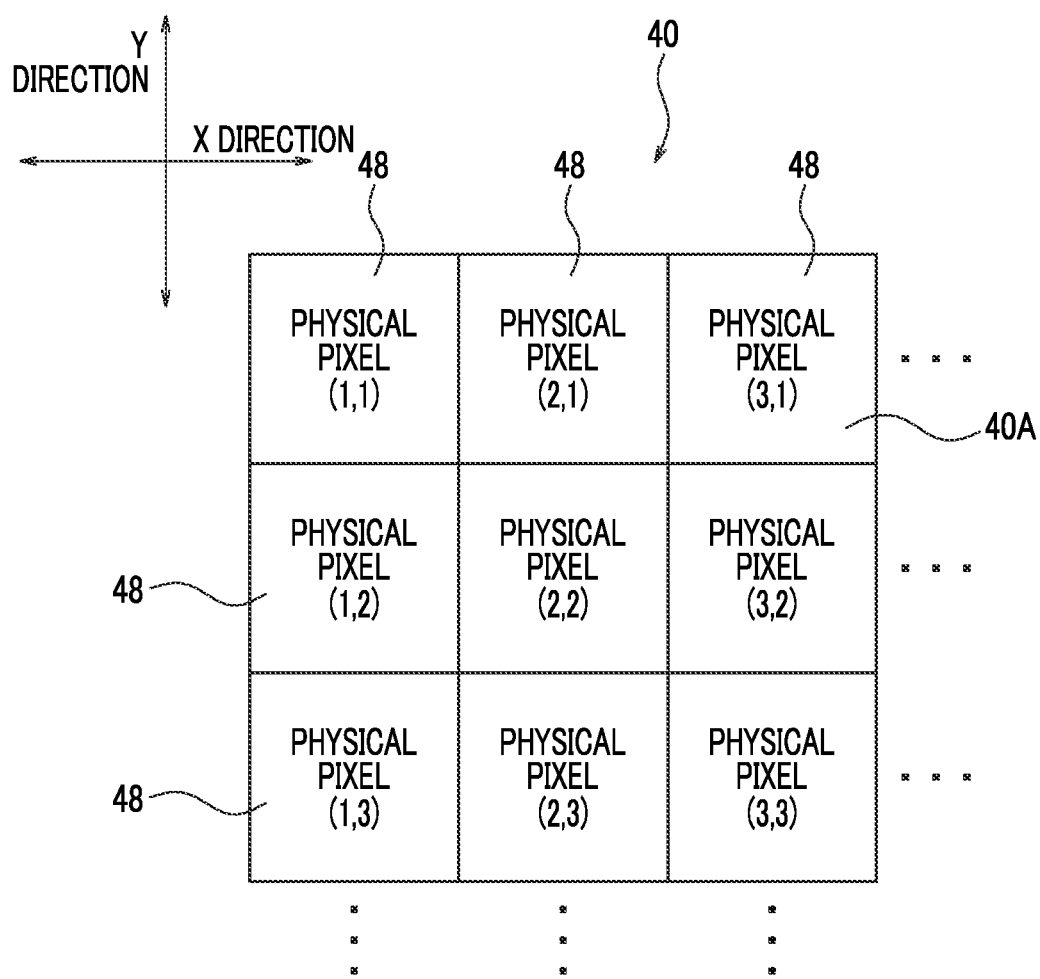
FIG. 6 is a front view showing an example of a configuration of an image sensor according to a first embodiment.

As an example, as shown in FIG. 6, the image sensor 40 has a plurality of physical pixels 48. For example, the plurality of physical pixels 48 are arranged in the X direction and the Y direction. For example, the pitches between the plurality of physical pixels 48 in the X direction are the same, and the pitches between the plurality of physical pixels 48 in the Y direction are the same. In addition, for example, the pitches between the plurality of physical pixels 48 in the X direction are the same as the pitches between the plurality of physical pixels 48 in the Y direction. It should be noted that the pitches between the plurality of physical pixels 48 in the X direction may be different from the pitches between the plurality of physical pixels 48 in the Y direction.

The X direction is an example of a "first direction" according to the technology of the present disclosure, and the Y direction is an example of a "second direction intersecting the first direction" according to the technology of the present disclosure. The pitches between the plurality of physical pixels 48 in the X direction correspond to distances between the centers of the plurality of physical pixels 48 in the X direction. The pitches between the plurality of physical pixels 48 in the Y direction correspond to distances between the centers of the plurality of physical pixels 48 in the Y direction.

The example shown in FIG. 6 shows a part of the plurality of physical pixels 48, that is, 3×3=9 physical pixels 48. In addition, FIG. 6 shows addresses of the plurality of physical pixels 48 in the X direction and addresses thereof in the Y direction. For example, the address (1,1) represents 1 for the address in the X direction and 1 for the address in the Y direction, and the address (2,1) represents 2 for the address in the X direction and 1 for the address in the Y direction. The plurality of physical pixels 48 face the light-receiving surface 40A (see also FIG. 3). Each of the plurality of physical pixels 48 has a photodiode for example, performs photoelectric conversion of the received light, and outputs the electric signal according to the received light amount.

Figure 7B:
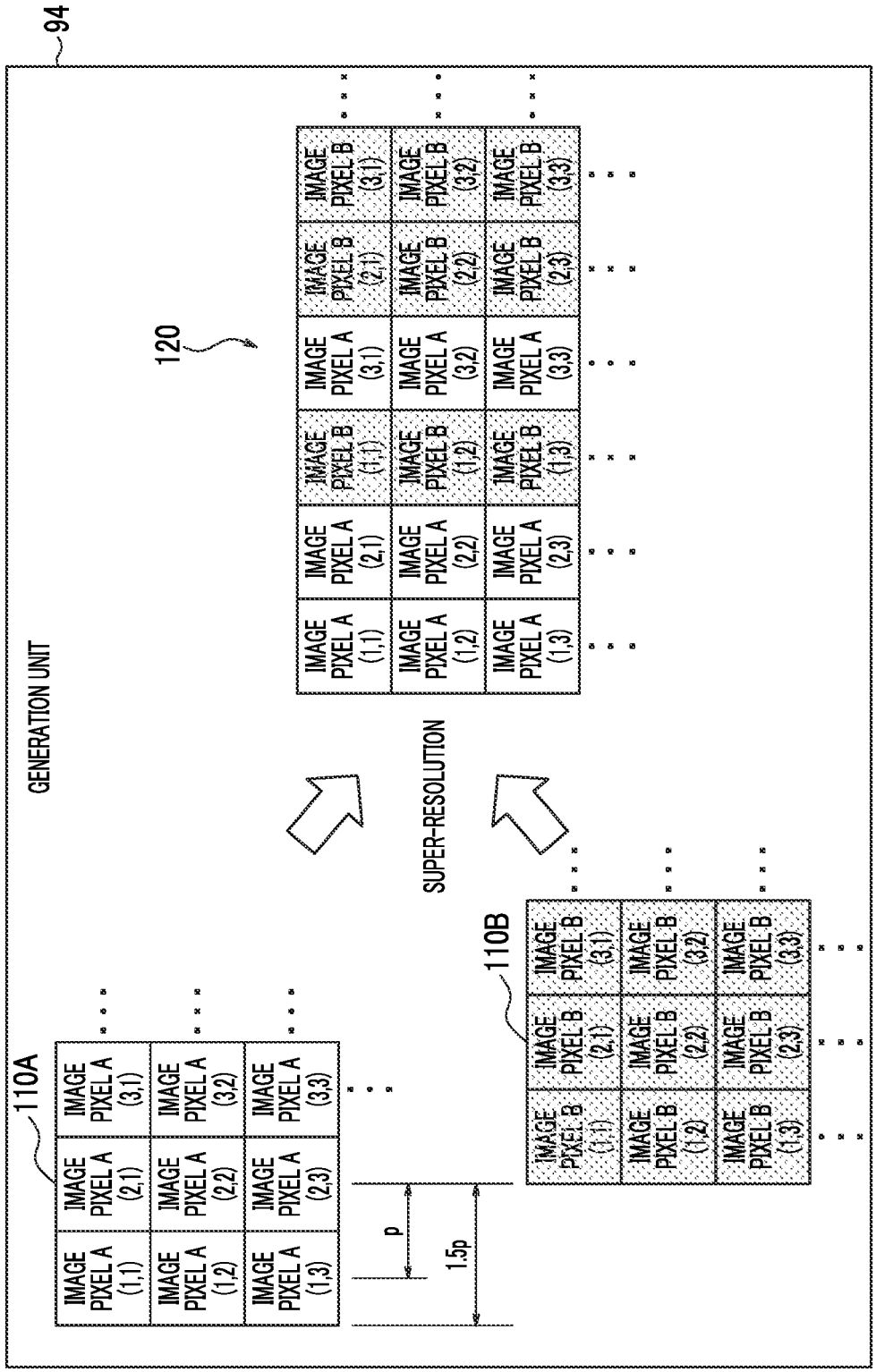
FIG. 7B is a conceptual diagram showing an example of a state in which a super-resolution image is generated from the plurality of images shown in FIG. 7A.

As an example, as shown in FIG. 7A, the imaging control unit 90 performs, with respect to the actuator 52 of the shake correction mechanism 46, control of moving the image sensor 40 in the X direction. In this case, the imaging control unit 90 performs control of moving the image sensor 40 to obtain a super-resolution image 120 (see FIG. 7B), which will be described later.

For example, with the image sensor 40 which is the monochrome type image sensor, the imaging control unit 90 performs control of moving the image sensor 40 as follows. That is, in a case in which the pitches between the plurality of physical pixels 48 are p [μm], the imaging control unit 90 performs control of moving the image sensor 40 in the X direction by a movement amount of 1.5×p [μm] while fixing the position of the image sensor 40 in the Y direction.

In addition, the imaging control unit 90 controls the photoelectric conversion element driver 68 to cause the image sensor 40 to perform the imaging before and after movement. As a result, the imaging control unit 90 acquires images 110A and 110B obtained by being captured by the image sensor 40 before and after movement. The image 110A is an image obtained by being captured by the image sensor 40 before movement, and the image 110B is an image obtained by being captured by the image sensor 40 after movement. The image 110B is an image obtained by being captured by the image sensor 40 at a position deviated in the X direction by 1.5×p [μm] with respect to the image 110A. In the example shown in FIG. 7A, in order to facilitate the distinction between the image 110A and the image 110B, dot-shaped hatching is added to the image 110B obtained by being captured by the image sensor 40 after movement. The image 110A and the image 110B are examples of a "plurality of images" according to the technology of the present disclosure.

The image 110A includes a plurality of image pixels A, and the image 110B includes a plurality of image pixels B. The plurality of image pixels A correspond to the plurality of physical pixels 48 of the image sensor 40 before movement, and the plurality of image pixels B correspond to the plurality of physical pixels 48 of the image sensor 40 after movement. The example shown in FIG. 7A shows a part of the plurality of image pixels A obtained before movement of the image sensor 40 and a part of the plurality of image pixels B obtained after movement of the image sensor 40, that is, 3×3=9 image pixels A and 3×3=9 image pixels B. For example, the image pixels A and B of the address (1,1) correspond to the physical pixels 48 of the address (1,1), and the image pixels A and B of the address (2,1) correspond to the physical pixels 48 of the address (2,1). It should be noted that, in the following description, for convenience of description, in a case in which the distinction is not needed, the image pixel A and the image pixel B are referred to as "image pixels" without reference numerals.

The storage processing unit 92 performs processing of storing, in the image memory 62, the images 110A and 110B obtained by being captured by the image sensor 40.

As an example, as shown in FIG. 7B, the generation unit 94 performs the super-resolution on a plurality of low-resolution images (for example, images 110A and 110B) obtained by being captured by the image sensor 40. Here, the super-resolution means, for example, processing of generating a high-resolution image which is an image having a higher-resolution than the low-resolution image by combining the plurality of low-resolution images by deviating the positions of the image pixels. In general, the high-resolution image generated in this manner is also referred to as a super-resolution image.

In the example shown in FIG. 7B, the generation unit 94 generates the super-resolution image 120 by performing the super-resolution on the images 110A and 110B obtained by being captured by the image sensor 40. The super-resolution in a case in which the monochrome type image sensor 40 is used is realized, for example, in the following manner. That is, an arrangement order of three image pixels A and three image pixels B arranged in the X direction obtained, respectively, before and after movement of the image sensor 40 is determined based on the absolute positions before and after movement of the image sensor 40. The absolute position is a position with the center of the image pixel A and the center of the image pixel B as a reference.

Next, the plurality of image pixels A included in the image 110A obtained before movement of the image sensor 40 and the plurality of image pixels B included in the image 110B obtained after movement of the image sensor 40 are arranged based on the arrangement order described above. As a result, the super-resolution image 120 obtained by performing the super-resolution on the image 110A and the image 110B is obtained. The example shown in FIG. 7B shows a part of the super-resolution image 120, that is, 9×2=18 image pixels A and B obtained, respectively, before and after movement of the image sensor 40.

As shown above, the imaging control unit 90 performs control of moving the image sensor 40 in the X direction by a movement amount of 1.5×p [μm]. As a result, as represented in the super-resolution image 120, in a case in which the image pixel A corresponding to any physical pixel 48 before movement is a first image pixel A, the image pixel A different from the first image pixel A is a second image pixel A, and the image pixel B corresponding to any physical pixel 48 after movement is a first image pixel B, the first image pixel B is adjacent to the second image pixel A.

In the examples shown in FIGS. 7A and 7B, for example, in a case in which the image pixel A of the address (1,1) is the first image pixel A, the image pixel A of the address (2,1) is the second image pixel A, and the image pixel B of the address (1,1) is the first image pixel B, the image pixel B of the address (1,1), that is, the first image pixel B is adjacent to the image pixel A of the address (2,1), that is, the first image pixel A.

The plurality of image pixels A and B correspond to the positions of the plurality of physical pixels 48 before and after movement of the image sensor 40, respectively. Therefore, the super-resolution image 120 represents the physical pixel disposition before and after movement of the image sensor 40. For example, in a case in which the physical pixel 48 corresponding to the first image pixel A and the first image pixel B is the first physical pixel and the physical pixel 48 corresponding to the second image pixel A is the second physical pixel, the imaging control unit 90 performs control of moving, in the physical pixel disposition before and after movement of the image sensor 40 represented by the super-resolution image 120, the image sensor 40 to a location at which the first physical pixel after movement to the location adjacent to the second physical pixel different from the first physical pixel before movement is positioned.

In other words, the imaging control unit 90 moves the image sensor 40 such that the physical pixel disposition before and after movement of the image sensor 40 represented by the super-resolution image 120 becomes the physical pixel disposition in which the adjacent image pixels included in the super-resolution image 120 are made to be the image pixels corresponding to the different physical pixels 48.

As an example of such control, as shown above, the imaging control unit 90 performs control of moving the image sensor 40 in the X direction by a movement amount of 1.5×p [μm]. As described above, the physical pixel disposition before and after movement of the image sensor 40 is represented by, for example, the super-resolution image 120, and the physical pixel disposition is realized regardless of whether or not there is a space for one physical pixel between the physical pixels of the image sensor 40.

It should be noted that, in the example shown in FIGS. 7A and 7B, for example, in a case in which the physical pixel 48 of the address (1,1) is the first physical pixel before movement of the image sensor 40, the physical pixel 48 of the address (1,1) corresponds to an example of a "first physical pixel" according to the technology of the present disclosure, and the physical pixel 48 of the address (2,1), which is the second physical pixel different from the physical pixel 48 of the address (1,1) before movement, corresponds to an example of a "second physical pixel" according to the technology of the present disclosure.

In addition, for example, the image pixel A of the address (1,1) is an example of an "image pixel corresponding to the first physical pixel before movement" according to the technology of the present disclosure, the image pixel A of the address (2,1) is an example of an "image pixel corresponding to a second physical pixel different from the first physical pixel before movement" according to the technology of the present disclosure, and the image pixel B of the address (1,1) is an example of an "image pixel corresponding to the first physical pixel after movement" according to the technology of the present disclosure.

Figure 7C:
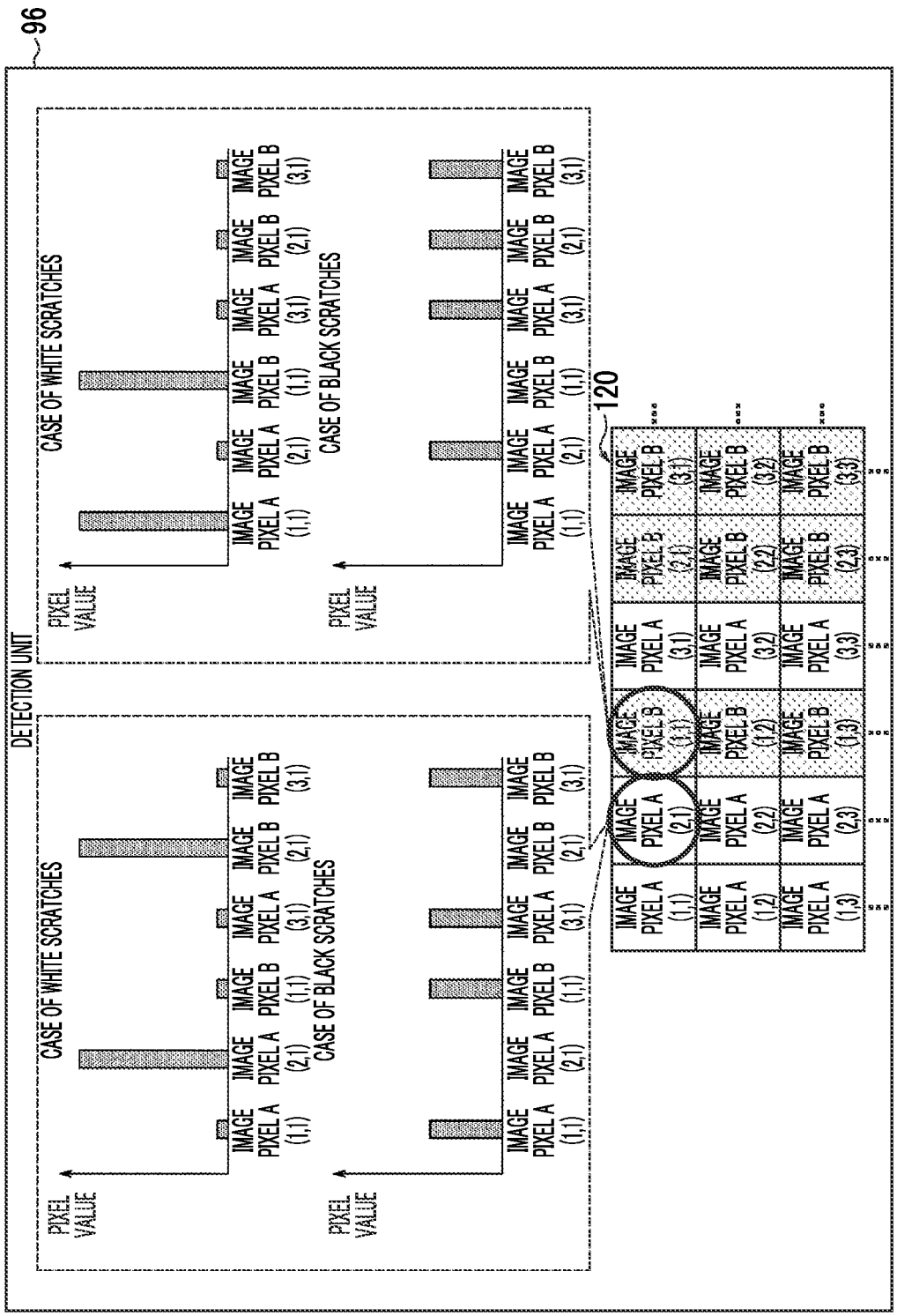
FIG. 7C is a conceptual diagram showing an example of a state in which a defective physical pixel is detected based on the super-resolution image shown in FIG. 7B.

As an example, as shown in FIG. 7C, the detection unit 96 calculates a degree of difference in pixel values between the image pixels A and B corresponding to the second physical pixel before movement and the first physical pixel after movement, respectively, among the plurality of image pixels A and the plurality of image pixels B included in the super-resolution image 120. In a case in which the image sensor 40 moves in the X direction, the image pixels adjacent to each other in the X direction are selected. It should be noted that, in a case in which the image sensor 40 moves in the Y direction, the image pixels adjacent to each other in the Y direction are selected. The pixel value of the image pixel A is proportional to the value of the electric signal output from the physical pixel 48 corresponding to the image pixel A, and the pixel value of the image pixel B is proportional to the value of the electric signal output from the physical pixel 48 corresponding to the image pixel B.

The detection unit 96 detects a defective physical pixel from the plurality of physical pixels 48 based on the calculated degree of difference. The defective physical pixel refers to a defective physical pixel 48. For example, the detection unit 96 sequentially calculates the degree of difference in pixel values between all the image pixels A and B that are targets for detecting the defective physical pixel (hereinafter, simply referred to as "detection targets"). In FIG. 7C, as an example of the image pixels A and B that are the detection target, the image pixel A of the address (2,1) and the image pixel B of the address (1,1) are highlighted (displayed by a circle). Then, a state is shown in which the degree of difference in pixel values between the image pixel A of the address (2,1) and the image pixel B of the address (1,1) is calculated.

Various methods can be applied as the method of detecting the defective physical pixel by the detection unit 96. The detection unit 96 detects the defective physical pixel, for example, in the following manner.

That is, for example, the detection unit 96 calculates a subtraction value or a division value of the pixel values between the image pixels A and B that are the detection targets as the degree of difference in pixel values between the image pixels A and B that are detection targets, and in a case in which the calculated degree of difference exceeds a preset threshold value, acquires the pixel value of each of the image pixels A and B that are the targets for calculating the degree of difference and the pixel value of each of the image pixels A and B in the vicinity thereof. For example, in a case in which the degree of difference in pixel values between the image pixel A of the address (2,1) and the image pixel B of the address (1,1) exceeds the preset threshold value, the detection unit 96 acquires the pixel value of the image pixel A of the address (2,1) and the pixel value of the image pixel B of the address (1,1), and acquires the pixel value of each of the image pixel A of the address (1,1), the image pixel A of the address (3,1), the image pixel B of the address (2,1), and the image pixel B of the address (3,1) in the vicinity thereof.

In a case in which a pixel value pattern, which is the arrangement of the plurality of acquired pixel values, matches an abnormal pixel value pattern in which the image pixel A of the address (2,1) and the image pixel B of the address (2,1) corresponding to the image pixel A of the address (2,1) are predetermined as white scratches or black scratches, the detection unit 96 detects that the physical pixels 48 of the address (2,1) corresponding to the image pixel A of the address (2,1) and the image pixel B of the address (2,1) are the defective physical pixels.

It should be noted that, in this case, in a case in which the acquired pixel value pattern matches the abnormal pixel value pattern including the white scratches, the detection unit 96 may detect that the image pixel A of the address (2,1) and the image pixel B of the address (2,1) are the white scratches. In addition, in a case in which the acquired pixel value pattern matches the abnormal pixel value pattern including the black scratches, the detection unit 96 may detect that the image pixel A of the address (2,1) and the image pixel B of the address (2,1) are the black scratches.

The white scratch refers to a phenomenon in which a pixel appears white due to a defect in which the electric signal output from the defective physical pixel is held at the maximum value. The black scratch refers to a phenomenon in which a pixel appears black due to a defect in which the electric signal is not output from the defective physical pixel.

In addition, in a case in which a pixel value pattern, which is the arrangement of the plurality of acquired pixel values, matches an abnormal pixel value pattern in which the image pixel B of the address (1,1) and the image pixel A of the address (1,1) corresponding to the image pixel B of the address (1,1) are predetermined as white scratches or black scratches, the detection unit 96 detects that the physical pixels 48 of the address (1,1) corresponding to the image pixel B of the address (1,1) and the image pixel A of the address (1,1) are the defective physical pixels.

It should be noted that, in this case, in a case in which the acquired pixel value pattern matches the abnormal pixel value pattern including the white scratches, the detection unit 96 may detect that the image pixel B of the address (1,1) and the image pixel A of the address (1,1) are the white scratches. In addition, in a case in which the acquired pixel value pattern matches the abnormal pixel value pattern including the black scratches, the detection unit 96 may detect that the image pixel B of the address (1,1) and the image pixel A of the address (1,1) are the black scratches.

The correction unit 98 corrects the pixel value of the image pixel corresponding to the defective physical pixel detected by the detection unit 96, based on the pixel value of the image pixel adjacent to the corresponding image pixel. Various methods can be applied as the method of correcting the pixel value. The correction unit 98 corrects the pixel value, for example, in the following manner.

That is, the correction unit 98 performs the correction by setting the pixel value of the first image pixel corresponding to the defective physical pixel detected by the detection unit 96 to an average value or a median value of the pixel values of the second image pixels adjacent to the first image pixel.

For example, in a case in which it is detected that the physical pixel 48 of the address (2,1) is the defective physical pixel, the correction unit 98 performs the correction by setting the image pixel A of the address (2,1) to an average value or a median value of the pixel values of the image pixels A and B adjacent to the image pixel A of the address (2,1), and performs the correction by setting the image pixel B of the address (2,1) to an average value or a median value of the pixel values of the image pixels A and B adjacent to the image pixel B of the address (2,1). In addition, for example, in a case in which it is detected that the physical pixel 48 of the address (1,1) is the defective physical pixel, the correction unit 98 performs the correction by setting the image pixel B of the address (1,1) to the average value or the median value of the pixel values of the image pixels A and B adjacent to the image pixel B of the address (1,1), and performs the correction by setting the image pixel A of the address (1,1) to the average value or the median value of the pixel values of the image pixels A and B adjacent to the image pixel A of the address (1,1). In this way, the corrected super-resolution image 120 is obtained by correcting the pixel values of the image pixels corresponding to the defective physical pixels. For example, in a case in which the image pixel corresponding to the defective physical pixel is the white scratch or the black scratch, the super-resolution image 120 corrected such that the white scratch or the black scratch is not conspicuous is obtained.

It should be noted that, in this example, in a case in which it is detected that the physical pixel 48 of the address (2,1) is the defective physical pixel, the image pixel A of the address (2,1) and the image pixel B of the address (2,1) correspond to an example of a "first image pixel corresponding to the defective physical pixel" according to the technology of the present disclosure, and the image pixels A and B adjacent to the image pixel A of the address (2,1) and the image pixel B of the address (2,1), respectively, correspond to an example of a "second image pixel adjacent to the first image pixel" according to the technology of the present disclosure. In addition, in a case in which it is detected that the physical pixel 48 of the address (1,1) is the defective physical pixel, the image pixel B of the address (1,1) and the image pixel A of the address (1,1) correspond to an example of a "first image pixel corresponding to the defective physical pixel" according to the technology of the present disclosure, and the image pixel A adjacent to the image pixel B of the address (1,1) and the image pixel B adjacent to the image pixel A of the address (1,1) correspond to an example of a "second image pixel adjacent to the first image pixel" according to the technology of the present disclosure.

The output unit 100 performs processing of outputting the corrected super-resolution image 120 to the display 26. As a result, the super-resolution image 120 is displayed on the display 26 in a state in which the pixel value of the image pixel corresponding to the defective physical pixel is corrected. For example, in a case in which the image pixel corresponding to the defective physical pixel is the white scratch or the black scratch, the super-resolution image 120 corrected such that the white scratch or the black scratch is not conspicuous is displayed on the display 26.

Next, an action of the imaging apparatus 10 (operation of the imaging apparatus 10) according to the first embodiment will be described with reference to FIG. 8.

Figure 8:
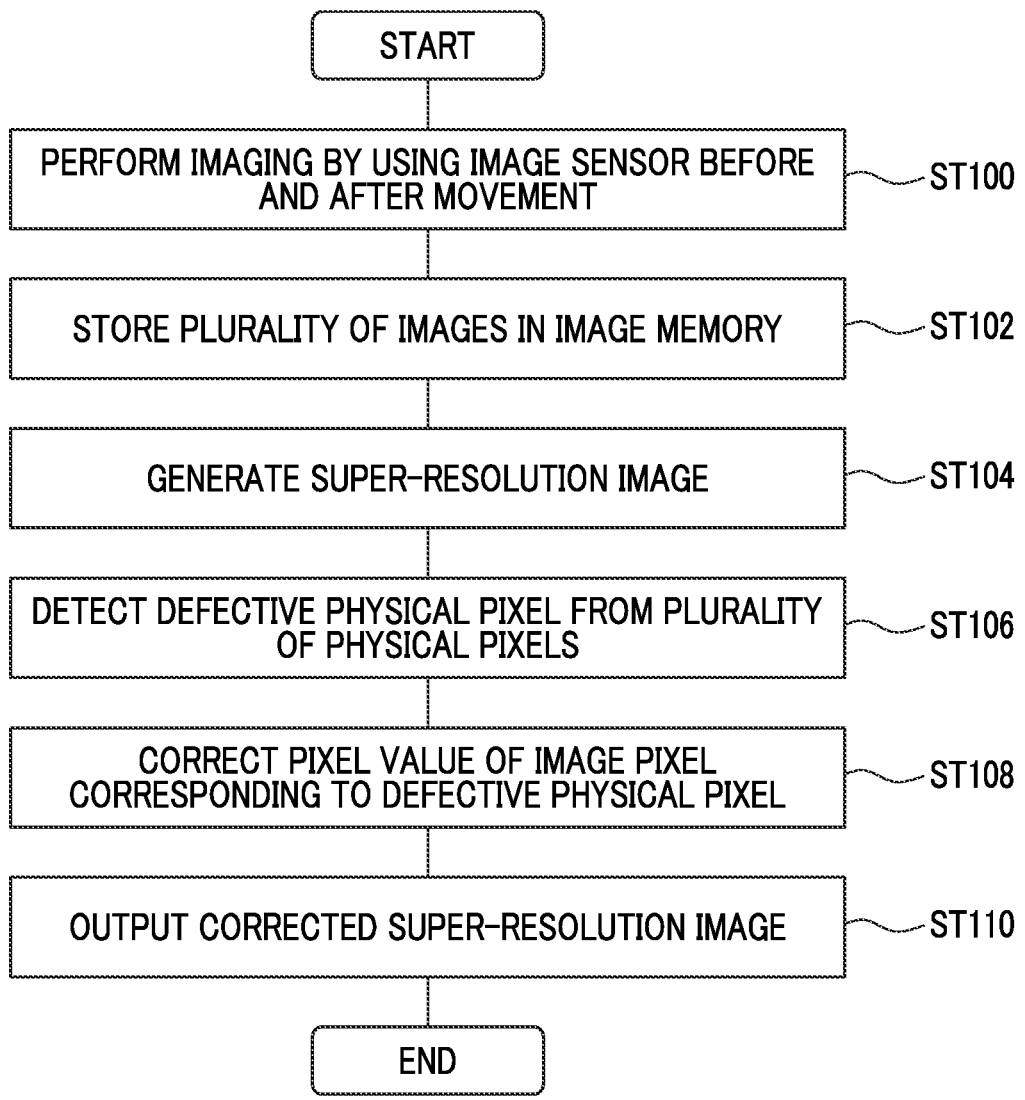
FIG. 8 is a flowchart showing an example of a flow of imaging processing executed by the CPU shown in FIG. 5.

FIG. 8 shows an example of a flow of the imaging processing executed by the CPU 60A in a case in which the imaging mode is set for the imaging apparatus 10.

In the imaging processing shown in FIG. 8, first, in step ST100, the imaging control unit 90 performs, with respect to the actuator 52 of the shake correction mechanism 46, control of moving the image sensor 40 in the X direction. In addition, in a case of performing control of moving the image sensor 40, the imaging control unit 90 controls the photoelectric conversion element driver 68 to cause the image sensor 40 to perform imaging before and after movement of the image sensor 40.

In next step ST102, the storage processing unit 92 performs the processing of storing, in the image memory 62, the images 110A and 110B obtained by being captured by the image sensor 40.

In next step ST104, the generation unit 94 generates the super-resolution image 120 by performing the super-resolution on the images 110A and 110B obtained by being captured by the image sensor 40.

In next step ST106, the detection unit 96 calculates the degree of difference in pixel values between the image pixels A and B corresponding to the second physical pixel before movement and the first physical pixel after movement, respectively, among the image pixels A and B included in the super-resolution image 120. In addition, the detection unit 96 detects the defective physical pixel from the plurality of physical pixels 48 based on the calculated degree of difference.

In next step ST108, the correction unit 98 corrects the pixel value of the image pixel corresponding to the defective physical pixel detected by the detection unit 96, based on the pixel value of the corresponding image pixel adjacent to the image pixel.

In next step ST110, the output unit 100 performs the processing of outputting the corrected super-resolution image 120 to the display 26.

As described above, in the imaging apparatus 10, control of moving, in the physical pixel disposition before and after movement of the image sensor 40 including the plurality of physical pixels 48, the image sensor 40 to a location at which any first physical pixel 48 after movement to a location adjacent to the second physical pixel different from any first physical pixel before movement is positioned is performed. In addition, the image sensor 40 is controlled by the imaging control unit 90 via the photoelectric conversion element driver 68, so that the imaging is performed by the image sensor 40 before and after movement. Then, the defective physical pixel is detected from the plurality of physical pixels 48 based on the degree of difference in pixel values between the image pixel A corresponding to the second physical pixel before movement and the image pixel B corresponding to the first physical pixel after movement among the plurality of image pixels A and the plurality of image pixels B included in each of the images 110A and 110B obtained by being captured by the image sensor 40. Therefore, the defective physical pixel can be detected from the plurality of physical pixels 48 based on the images 110A and 110B obtained by being captured by the image sensor 40 before and after movement.

In addition, the imaging apparatus 10 performs the processing of storing, in the image memory 62, the images 110A and 110B obtained by being captured by the image sensor 40.

Then, the defective physical pixel is detected from the plurality of physical pixels 48 based on the degree of difference in pixel values between the image pixels A and B among the plurality of image pixels A and the plurality of image pixels B included in each of the images 110A and 110B stored in the image memory 62. Therefore, the defective physical pixel can be detected from the plurality of physical pixels 48 based on the images 110A and 110B stored in the image memory 62.

Moreover, in the imaging apparatus 10, the pixel value of the first image pixel corresponding to the defective physical pixel is corrected based on the pixel value of the second image pixel adjacent to the first image pixel. Therefore, it is possible to rectify a defect of the image pixel corresponding to the defective physical pixel.

In addition, in the imaging apparatus 10, for example, the image sensor 40 is the monochrome type image sensor. Therefore, the defective physical pixel can be detected from the plurality of physical pixels 48 included in the monochrome type image sensor 40.

In addition, in the imaging apparatus 10, for example, in a case in which the pitches between the plurality of physical pixels 48 are p, the imaging control unit 90 performs control of moving the image sensor 40 in the X direction by a movement amount of 1.5×p [μm]. Therefore, in the physical pixel disposition before and after movement of the monochrome type image sensor 40, the first physical pixel after movement can be positioned at a location adjacent to the second physical pixel different from the first physical pixel before movement.

In addition, the imaging apparatus 10 comprises the controller 60 that detects the defective physical pixel, the image sensor 40, and the shake correction mechanism 46 that moves the image sensor 40. Therefore, in the imaging apparatus 10, the imaging by the image sensor 40, the movement of the image sensor 40, and the detection of the defective physical pixel can be continuously performed.

It should be noted that, in the first embodiment, the imaging control unit 90 moves the image sensor 40 in the X direction, but may move the image sensor 40 in the Y direction. Also, the imaging control unit 90 may move the image sensor 40 in the X direction and the Y direction. In addition, even in a case in which the image sensor 40 moves in the Y direction or the image sensor 40 moves in the X direction and the Y direction, the processing of detecting the defective physical pixel from the plurality of physical pixels 48 and the processing of correcting the pixel value of the first image pixel corresponding to the defective physical pixel based on the pixel value of the second image pixel adjacent to the first image pixel may be executed by the same method as in the first embodiment.

In addition, in the first embodiment, the imaging control unit 90 moves the image sensor 40 by a movement amount of 1.5×p [μm], but in a case in which the pitches between the plurality of physical pixels 48 are 1, the imaging control unit 90 may move the image sensor 40 in the X direction or the Y direction by a movement amount that is a decimal larger than 1, under the condition that the super-resolution image 120 is obtained. Even with this configuration, in the physical pixel disposition before and after movement of the image sensor 40, the first physical pixel after movement can be positioned at a location adjacent to the second physical pixel different from the first physical pixel before movement.

In addition, in the first embodiment, in a case in which the natural number is n and the pure decimal is d, the imaging control unit 90 may move the image sensor 40 in the X direction or the Y direction by a movement amount of (n+d)×p [μm], under the condition that the super-resolution image 120 is obtained. Even with this configuration, in the physical pixel disposition before and after movement of the image sensor 40, the first physical pixel after movement can be positioned at a location adjacent to the second physical pixel different from the first physical pixel before movement.

It should be noted that, in a case in which the imaging control unit 90 moves the image sensor 40 by a movement amount of 1.5×p [μm], for example, it is possible to obtain the super-resolution image 120 having a higher resolution than a case in which the image sensor 40 is moved by a movement amount that is a decimal larger than 1.5×p or a movement amount that is a decimal smaller than 1.5×p and larger than 1.0×p [μm].

Moreover, in the first embodiment, the output unit 100 may output the positional information corresponding to the position of the defective physical pixel. The positional information is, for example, information corresponding to the address of the physical pixel 48. With this configuration, it is possible to specify the position of the defective physical pixel based on the positional information corresponding to the position of the output defective physical pixel.

In addition, in the first embodiment, the detection unit 96 may extract an out-of-definition image pixel in which the pixel value is out of a predetermined range from among the plurality of image pixels, and detect the defective physical pixel based on a degree of difference between the pixel value of the out-of-definition image pixel and the pixel value of the image pixel adjacent to the out-of-definition image pixel. With this configuration, it is possible to reduce the number of calculation of the degree of difference as compared with a case in which the degree of difference in pixel values between the image pixels corresponding to the all of the second physical pixels before movement and the first physical pixels after movement, respectively, is calculated.

Also, in the first embodiment, the detection unit 96 detects the defective physical pixel from the plurality of physical pixels 48 in the process in which the super-resolution image 120 is generated, but the technology of the present disclosure is not limited to this. For example, in processing different from the process in which the super-resolution image 120 is generated, the detection unit 96 may detect the defective physical pixel from the plurality of physical pixels 48 based on the images 110A and 110B obtained by being captured by the image sensor 40 before and after movement, by the same method described above.

Figure 16:
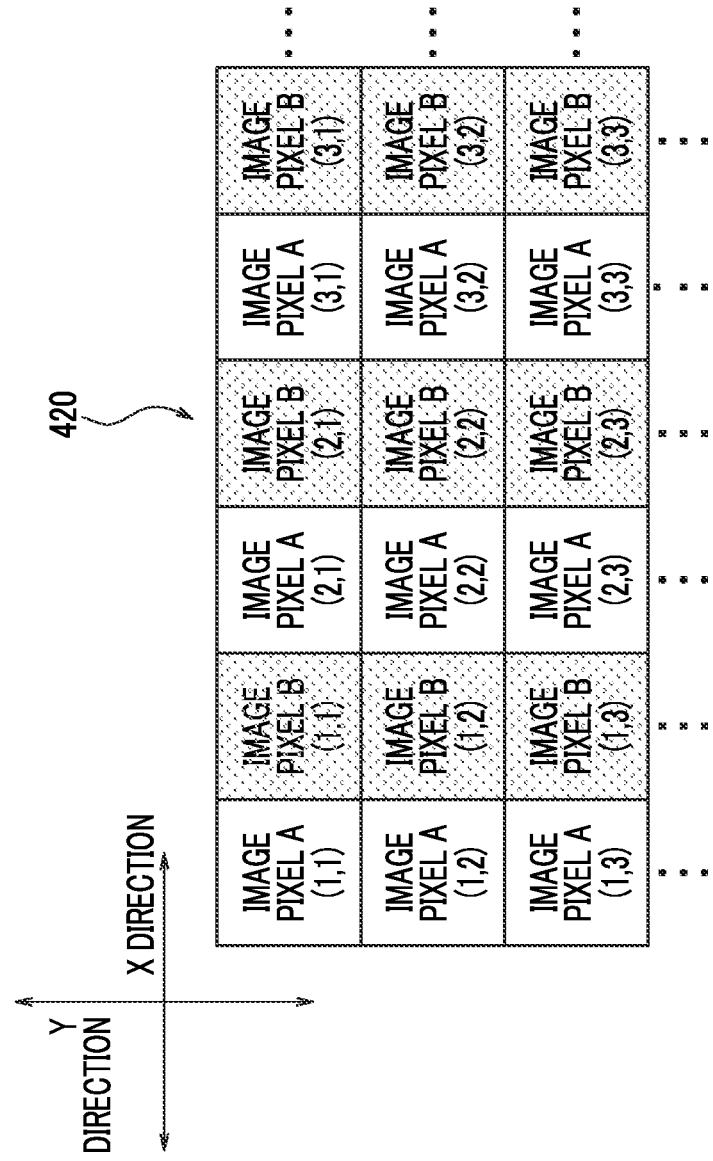
FIG. 16 is a front view showing a first comparative example of the super-resolution image.

It should be noted that FIG. 16 shows a super-resolution image 420 obtained in a comparative example with respect to the first embodiment. The super-resolution image 420 is an image obtained by moving the image sensor 40 (see FIG. 7A) by a movement amount of 0.5×p [μm] instead of movement by 1.5×p [μm]. In this case, in the physical pixel disposition before and after movement of the image sensor 40, the first physical pixel after movement is positioned at a location adjacent to the first physical pixel before movement. Therefore, in the super-resolution image 420, since the pixel values between the adjacent image pixels are the same, it is not possible to detect the defective physical pixel from the plurality of physical pixels.

Second Embodiment

Next, the description of a second embodiment will be made. In the second embodiment, the configuration of the imaging apparatus 10 is changed in the following manner with respect to the first embodiment. It should be noted that, in the second embodiment, the same elements and members as the elements and members in the first embodiment are designated by the same reference numerals as the reference numerals in the first embodiment, and the detailed description thereof will be omitted. In addition, for the overall configuration of the imaging apparatus 10 according to the second embodiment, FIGS. 1 to 5 can be referred to.

Figure 9:
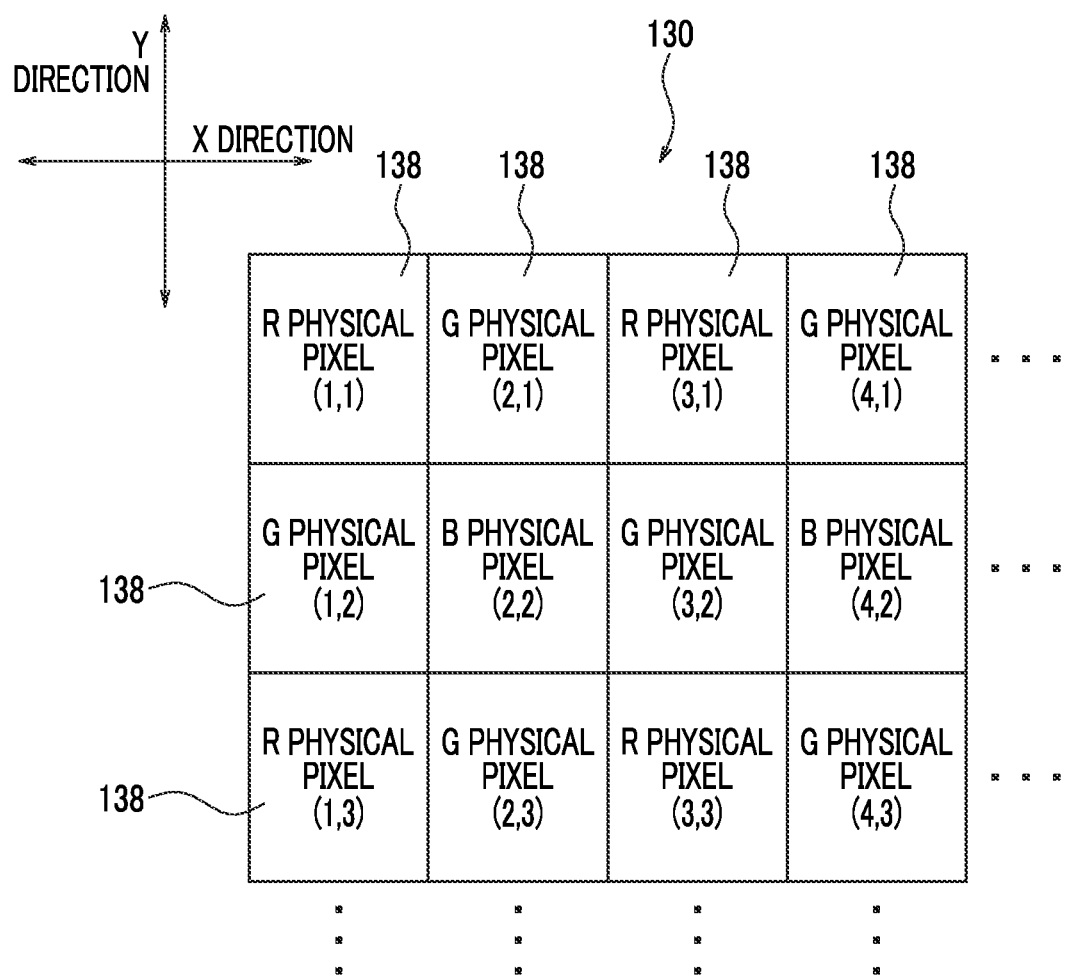
FIG. 9 is a front view showing an example of a configuration of an image sensor according to a second embodiment.

As an example, as shown in FIG. 9, a color type image sensor 130 is used in the second embodiment. The image sensor 130 includes a plurality of physical pixels 138. For example, the plurality of physical pixels 138 are arranged in the X direction and the Y direction. For example, the pitches between the plurality of physical pixels 138 in the X direction are the same, and the pitches between the plurality of physical pixels 138 in the Y direction are the same. In addition, for example, the pitches between the plurality of physical pixels 138 in the X direction are the same as the pitches between the plurality of physical pixels 138 in the Y direction. It should be noted that the pitches between the plurality of physical pixels 138 in the X direction may be different from the pitches between the plurality of physical pixels 138 in the Y direction.

The example shown in FIG. 9 shows a part of the plurality of physical pixels 138, that is, 4×3=12 physical pixels 138. The color filters of different colors are assigned to the plurality of physical pixels 138 in a base arrangement having periodicity. The base arrangement may be any arrangement, such as stripe arrangement, delta arrangement, Bayer arrangement, or X-Trans (registered trademark) type arrangement. The Bayer arrangement is applied to the image sensor 130 as an example of the base arrangement.

The Bayer arrangement is, for example, an arrangement in which 2×2=4 color filters are grouped together. The 2×2=4 color filters are one color filter corresponding to a red wavelength range, two color filters corresponding to a green wavelength range, and one color filter corresponding to a blue wavelength range. Hereinafter, in a case in which the plurality of physical pixels 138 are identified by using the color filters assigned to the plurality of physical pixels 138, the physical pixel 138 to which the color filter corresponding to the red wavelength range is assigned is referred to as a R physical pixel, the physical pixel 138 to which the color filter corresponding to the green wavelength range is assigned is referred to as a G physical pixel, and the physical pixel 138 to which the color filter corresponding to the blue wavelength range is assigned is referred to as a B physical pixel.

The 2×2=4 physical pixels 138 are arranged in the following manner. That is, the two physical pixels 138 in the first column are arranged in an order of the R physical pixel and the G physical pixel. The two physical pixels 138 in the second column are arranged in an order of the G physical pixel and the B physical pixel.

FIG. 9 shows the addresses of the plurality of physical pixels 138 in the X direction and the addresses thereof in the Y direction. For example, the address (1,1) represents 1 for the address in the X direction and 1 for the address in the Y direction, and the address (2,1) represents 2 for the address in the X direction and 1 for the address in the Y direction. Each of the plurality of physical pixels 138 includes a photodiode for example, performs photoelectric conversion of the received light, and outputs the electric signal according to the received light amount.

Next, the imaging control unit 90, the storage processing unit 92, the generation unit 94, the detection unit 96, and the output unit 100 (see FIG. 6) according to the second embodiment will be described.

Figure 10B:
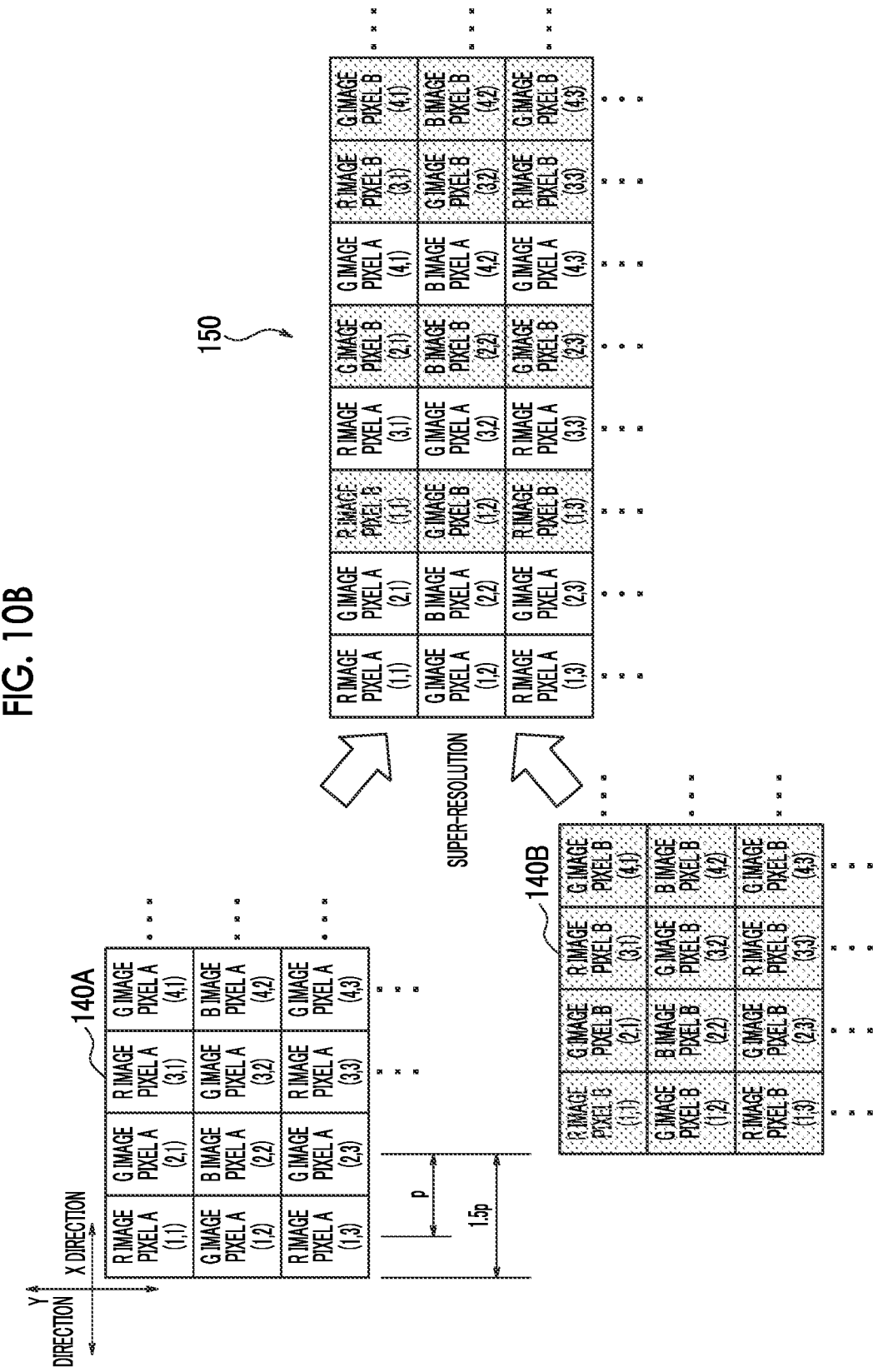
FIG. 10B is a conceptual diagram showing an example of a state in which a super-resolution image is generated from the plurality of images shown in FIG. 10A.

As an example, as shown in FIG. 10A, the imaging control unit 90 performs, with respect to the actuator 52 of the shake correction mechanism 46, control of moving the image sensor 130 in the X direction. In this case, the imaging control unit 90 performs control of moving the image sensor 130 to obtain a super-resolution image 150 (see FIG. 10B), which will be described later.

For example, with the image sensor 130 which is the color type image sensor to which the color filters of different colors are assigned in the Bayer arrangement, the imaging control unit 90 performs control of moving the image sensor 130 in the following manner. That is, in a case in which the pitches between the plurality of physical pixels 138 are p [μm], the natural number is n, and the number of physical pixels per period of the Bayer arrangement is T, the imaging control unit 90 performs control of moving the image sensor 130 in the X direction by a movement amount of $\{(T-1)+0.5\} \times n \times p$ [μm] while fixing the position of the image sensor 130 in the Y direction. For example, since the number of physical pixels T per period of the Bayer arrangement is 2, in a case in which n=1, the movement amount is defined as 1.5×p. For example, the imaging control unit 90 performs control of moving the image sensor 130 by a movement amount of 1.5×p [μm].

In addition, the imaging control unit 90 controls the photoelectric conversion element driver 68 to cause the image sensor 130 to perform the imaging before and after movement. As a result, the imaging control unit 90 acquires images 140A and 140B obtained by being captured by the image sensor 130 before and after movement. The image 140A is an image obtained by being captured by the image sensor 130 before movement, and the image 140B is an image obtained by being captured by the image sensor 130 after movement. The image 140B is an image obtained by being captured by the image sensor 130 at a position deviated in the X direction by 1.5×p [μm] with respect to the image 140A. In the example shown in FIG. 10A, in order to facilitate the distinction between the image 140A and the image 140B, dot-shaped hatching is added to the image 140B obtained by being captured by the image sensor 130 after movement. The image 140A and the image 140B are examples of a "plurality of images" according to the technology of the present disclosure.

The image 140A includes the plurality of image pixels A, and the image 140B includes the plurality of image pixels B. The plurality of image pixels A correspond to the plurality of physical pixels 48 of the image sensor 130 before movement, and the plurality of image pixels B correspond to the plurality of physical pixels 48 of the image sensor 130 after movement. Hereinafter, in a case in which the image pixels A and B are identified by using the colors of the image pixels A and B, red image pixels A and B are referred to as R image pixels A and B, green image pixels A and B are referred to as G image pixels A and B, and blue image pixels A and B are referred to as B image pixels A and B. The example shown in FIG. 10A shows a part of the plurality of image pixels A obtained before movement of the image sensor 130 and a part of the plurality of image pixels B obtained after movement of the image sensor 130, that is, 4×3=12 image pixels A and 4×3=12 image pixels B. For example, the R image pixels A and B of the address (1,1) correspond to the R physical pixel of the address (1,1), and the G image pixels A and B of the address (2,1) correspond to the G physical pixel of the address (2,1). It should be noted that, in the following description, for convenience of description, in a case in which the distinction is not needed, the image pixel A and the image pixel B are referred to as "image pixels" without reference numerals.

The storage processing unit 92 performs processing of storing, in the image memory 62, the images 140A and 140B obtained by being captured by the image sensor 130.

As an example, as shown in FIG. 10B, the generation unit 94 performs the super-resolution on a plurality of low-resolution images (for example, the images 140A and 140B) obtained by being captured by the image sensor 130. Here, the super-resolution means, for example, the processing of generating the high-resolution image which is an image having a higher-resolution than the low-resolution image by combining the plurality of low-resolution images by deviating the positions of the image pixels. In general, the high-resolution image generated in this manner is also referred to as a super-resolution image.

In the example shown in FIG. 10B, the generation unit 94 generates the super-resolution image 150 by performing the super-resolution on the images 140A and 140B obtained by being captured by the image sensor 130. The super-resolution in a case in which the color type image sensor 130 to which the color filters of different colors are assigned in the Bayer arrangement is used is realized, for example, in the following manner. That is, an arrangement order of four image pixels A and four image pixels B arranged in the X direction obtained, respectively, before and after movement of the image sensor 130 is determined based on the absolute positions before and after movement of the image sensor 130. The absolute position is a position with the center of the image pixel A and the center of the image pixel B as a reference.

Next, the plurality of image pixels A included in the image 140A obtained before movement of the image sensor 130 and the plurality of image pixels B included in the image 140B obtained after movement of the image sensor 130 are arranged based on the arrangement order described above. As a result, the super-resolution image 150 obtained by performing the super-resolution on the image 140A and the image 140B is obtained. The example shown in FIG. 10B shows a part of the super-resolution image 150, that is, 12×2=24 image pixels A and B obtained, respectively, before and after movement of the image sensor 130.

As shown above, the imaging control unit 90 performs control of moving the image sensor 130 in the X direction by a movement amount of 1.5×p [μm].

As a result, as represented in the super-resolution image 150, in a case in which the image pixel A corresponding to any physical pixel 138 before movement is a first image pixel A, the image pixel A different from the first image pixel A is a second image pixel A, and the image pixel B corresponding to any physical pixel 138 after movement is a first image pixel B, the first image pixel B is adjacent to the second image pixel A.

In the examples shown in FIGS. 10A and 10B, for example, in a case in which the R image pixel A of the address (1,1) is the first image pixel A, the G image pixel A of the address (2,1) is the second image pixel A, and the R image pixel B of the address (1,1) is the first image pixel B, the R image pixel B of the address (1,1), that is, the first image pixel B is adjacent to the G image pixel A of the address (2,1), that is, the second image pixel A.

The plurality of image pixels A and B correspond to the positions of the plurality of physical pixels 138 before and after movement of the image sensor 130, respectively. Therefore, the super-resolution image 150 represents the physical pixel disposition before and after movement of the image sensor 130. For example, in a case in which the physical pixel 138 corresponding to the first image pixel A and the first image pixel B is the first physical pixel and the physical pixel 138 corresponding to the second image pixel A is the second physical pixel, the imaging control unit 90 performs control of moving, in the physical pixel disposition before and after movement of the image sensor 130 represented by the super-resolution image 150, the image sensor 130 to a location at which the first physical pixel after movement to the location adjacent to the second physical pixel different from the first physical pixel before movement is positioned.

In other words, the imaging control unit 90 moves the image sensor 130 such that the physical pixel disposition before and after movement of the image sensor 130 represented by the super-resolution image 150 becomes the physical pixel disposition in which the adjacent image pixels included in the super-resolution image 150 are made to be the image pixels corresponding to the different physical pixels 138.

As an example of such control, as shown above, the imaging control unit 90 performs control of moving the image sensor 130 in the X direction by a movement amount of 1.5×p [μm]. As described above, the physical pixel disposition before and after movement of the image sensor 130 is represented by, for example, the super-resolution image 150, and the physical pixel disposition is realized regardless of whether or not there is a space for one physical pixel between the physical pixels of the image sensor 130.

It should be noted that, in the example shown in FIGS. 10A and 10B, for example, in a case in which the R physical pixel of the address (1,1) is the first physical pixel before movement of the image sensor 130, the R physical pixel of the address (1,1) corresponds to an example of a "first physical pixel" according to the technology of the present disclosure, and the G physical pixel of the address (2,1), which is the second physical pixel different from the R physical pixel of the address (1,1) before movement, corresponds to an example of a "second physical pixel" according to the technology of the present disclosure.

In addition, for example, the R image pixel A of the address (1,1) is an example of an "image pixel corresponding to the first physical pixel before movement" according to the technology of the present disclosure, the G image pixel A of the address (2,1) is an example of an "image pixel corresponding to a second physical pixel different from the first physical pixel before movement" according to the technology of the present disclosure, and the R image pixel B of the address (1,1) is an example of an "image pixel corresponding to the first physical pixel after movement" according to the technology of the present disclosure.

Figure 10C:
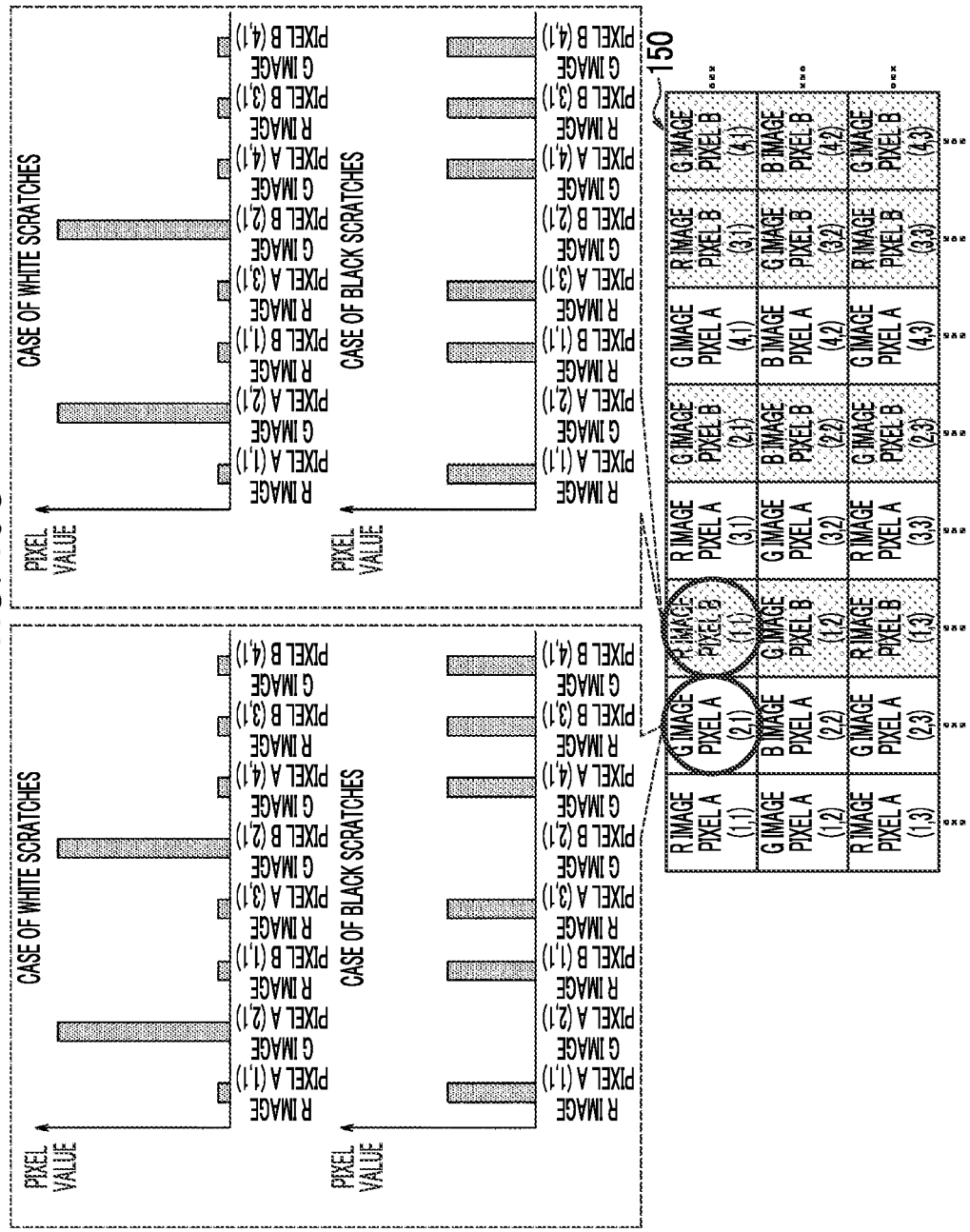
FIG. 10C is a conceptual diagram showing an example of a state in which a defective physical pixel is detected based on the super-resolution image shown in FIG. 10B.

As an example, as shown in FIG. 10C, the detection unit 96 calculates a degree of difference in pixel values between the image pixels A and B corresponding to the second physical pixel before movement and the first physical pixel after movement, respectively, among the plurality of image pixels A and the plurality of image pixels B included in the super-resolution image 150. In a case in which the image sensor 130 moves in the X direction, the image pixels adjacent to each other in the X direction are selected. It should be noted that, in a case in which the image sensor 130 moves in the Y direction, the image pixels adjacent to each other in the Y direction are selected. The pixel value of the image pixel A is proportional to the value of the electric signal output from the physical pixel 138 corresponding to the image pixel A, and the pixel value of the image pixel B is proportional to the value of the electric signal output from the physical pixel 138 corresponding to the image pixel B.

The detection unit 96 detects a defective physical pixel from the plurality of physical pixels 138 based on the calculated degree of difference. The defective physical pixel refers to a defective physical pixel 138. For example, the detection unit 96 sequentially calculates the degree of difference in pixel values between all the image pixels A and B that are the targets for detecting the defective physical pixel (hereinafter, simply referred to as "detection targets"). In FIG. 10C, as an example of the image pixels A and B that are the detection target, the G image pixel A of the address (2,1) and the R image pixel B of the address (1,1) are highlighted (displayed by a circle), and a state is shown in which the degree of difference in pixel values between the G image pixel A of the address (2,1) and the R image pixel B of the address (1,1) is calculated.

Various methods can be applied as the method of detecting the defective physical pixel by the detection unit 96. The detection unit 96 detects the defective physical pixel, for example, in the following manner.

That is, for example, the detection unit 96 calculates the subtraction value or the division value of the pixel values between the image pixels A and B that are the detection targets as the degree of difference in pixel values between the image pixels A and B that are detection targets, and in a case in which the calculated degree of difference exceeds the preset threshold value, acquires the pixel value of each of the image pixels A and B that are the targets for calculating the degree of difference and the pixel value of each of the image pixels A and B in the vicinity thereof. For example, in a case in which the degree of difference in pixel values between the G image pixel A of the address (2,1) and the R image pixel B of the address (1,1) exceeds the preset threshold value, the detection unit 96 acquires the pixel value of the G image pixel A of the address (2,1) and the pixel value of the R image pixel B of the address (1,1), and acquires the pixel value of each of the R image pixel A of the address (1,1), the R image pixel A of the address (3,1), the G image pixel B of the address (2,1), the R image pixel B of the address (3,1), and the G image pixel B of the address (4,1) in the vicinity thereof.

In a case in which a pixel value pattern, which is the arrangement of the plurality of acquired pixel values, matches an abnormal pixel value pattern in which the G image pixel A of the address (2,1) and the G image pixel B of the address (2,1) corresponding to the G image pixel A of the address (2,1) are predetermined as white scratches or black scratches, the detection unit 96 detects that the G physical pixels of the address (2,1) corresponding to the G image pixel A of the address (2,1) and the G image pixel B of the address (2,1) are the defective physical pixels.

It should be noted that, in this case, in a case in which the acquired pixel value pattern matches the abnormal pixel value pattern including the white scratches, the detection unit 96 may detect that the G image pixel A of the address (2,1) and the G image pixel B of the address (2,1) are the white scratches. In addition, in a case in which the acquired pixel value pattern matches the abnormal pixel value pattern including the black scratches, the detection unit 96 may detect that the G image pixel A of the address (2,1) and the G image pixel B of the address (2,1) are the black scratches.

In addition, in a case in which a pixel value pattern, which is the arrangement of the plurality of acquired pixel values, matches an abnormal pixel value pattern in which the R image pixel B of the address (1,1) and the R image pixel A of the address (1,1) corresponding to the R image pixel B of the address (1,1) are predetermined as white scratches or black scratches, the detection unit 96 detects that the R physical pixels of the address (1,1) corresponding to the R image pixel B of the address (1,1) and the R image pixel A of the address (1,1) are the defective physical pixels.

It should be noted that, in this case, in a case in which the acquired pixel value pattern matches the abnormal pixel value pattern including the white scratches, the detection unit 96 may detect that the R image pixel B of the address (1,1) and the R image pixel A of the address (1,1) are the white scratches. In addition, in a case in which the acquired pixel value pattern matches the abnormal pixel value pattern including the black scratches, the detection unit 96 may detect that the R image pixel B of the address (1,1) and the R image pixel A of the address (1,1) are the black scratches.

The correction unit 98 corrects the pixel value of the image pixel corresponding to the defective physical pixel detected by the detection unit 96, based on the pixel value of the image pixel adjacent to the corresponding image pixel. Various methods can be applied as the method of correcting the pixel value. The correction unit 98 corrects the pixel value, for example, in the following manner.

That is, the correction unit 98 performs the correction by setting the pixel value of the first image pixel corresponding to the defective physical pixel detected by the detection unit 96 to the average value or the median value of the pixel values of the second image pixels adjacent to the first image pixel.

For example, in a case in which it is detected that the G physical pixel of the address (2,1) is the defective physical pixel, the correction unit 98 performs the correction by setting the G image pixel A of the address (2,1) to the average value or the median value of the pixel values of the image pixels A and B adjacent to the G image pixel A of the address (2,1), and performs the correction by setting the G image pixel B of the address (2,1) to the average value or the median value of the pixel values of the image pixels A and B adjacent to the G image pixel B of the address (2,1). In addition, for example, in a case in which it is detected that the R physical pixel of the address (1,1) is the defective physical pixel, the correction unit 98 performs the correction by setting the R image pixel B of the address (1,1) to the average value or the median value of the pixel values of the image pixels A and B adjacent to the R image pixel B of the address (1,1), and performs the correction by setting the R image pixel A of the address (1,1) to the average value or the median value of the pixel values of the image pixels A and B adjacent to the R image pixel A of the address (1,1). In this way, the corrected super-resolution image 150 is obtained by correcting the pixel values of the image pixels corresponding to the defective physical pixels. For example, in a case in which the image pixel corresponding to the defective physical pixel is the white scratch or the black scratch, the super-resolution image 150 corrected such that the white scratch or the black scratch is not conspicuous is obtained.

It should be noted that, in this example, in a case in which it is detected that the G physical pixel of the address (2,1) is the defective physical pixel, the G image pixel A of the address (2,1) and the G image pixel B of the address (2,1) correspond to an example of a "first image pixel corresponding to the defective physical pixel" according to the technology of the present disclosure, and the image pixels A and B adjacent to the G image pixel A of the address (2,1) and the G image pixel B of the address (2,1), respectively, correspond to an example of a "second image pixel adjacent to the first image pixel" according to the technology of the present disclosure. In addition, in a case in which it is detected that the R physical pixel of the address (1,1) is the defective physical pixel, the R image pixel B of the address (1,1) and the R image pixel A of the address (1,1) correspond to an example of a "first image pixel corresponding to the defective physical pixel" according to the technology of the present disclosure, and the image pixel A adjacent to the R image pixel B of the address (1,1) and the image pixel B adjacent to the R image pixel A of the address (1,1) correspond to an example of a "second image pixel adjacent to the first image pixel" according to the technology of the present disclosure.

The output unit 100 performs processing of outputting the corrected super-resolution image 150 to the display 26. As a result, the super-resolution image 150 is displayed on the display 26 in a state in which the pixel value of the image pixel corresponding to the defective physical pixel is corrected. For example, in a case in which the image pixel corresponding to the defective physical pixel is the white scratch or the black scratch, the super-resolution image 150 corrected such that the white scratch or the black scratch is not conspicuous is displayed on the display 26.

It should be noted that an action of the imaging apparatus 10 (operation of the imaging apparatus 10) according to the second embodiment is the same as the action of the first embodiment.

As described above, in the imaging apparatus 10 according to the second embodiment, control of moving, in the physical pixel disposition before and after movement of the image sensor 130 including the plurality of physical pixels 138, the image sensor 130 to a location at which any first physical pixel 138 after movement to a location adjacent to the second physical pixel different from any first physical pixel before movement is positioned is performed. In addition, the image sensor 130 is controlled by the imaging control unit 90 via the photoelectric conversion element driver 68, so that the imaging is performed by the image sensor 130 before and after movement. Then, the defective physical pixel is detected from the plurality of physical pixels 138 based on the degree of difference in pixel values between the image pixel A corresponding to the second physical pixel before movement and the image pixel B corresponding to the first physical pixel after movement among the plurality of image pixels A and the plurality of image pixels B included in each of the images 140A and 140B obtained by being captured by the image sensor 130. Therefore, the defective physical pixel can be detected from the plurality of physical pixels 138 based on the images 140A and 140B obtained by being captured by the image sensor 130 before and after movement.

In addition, in the imaging apparatus 10 according to the second embodiment, processing of storing, in the image memory 62, the images 140A and 140B obtained by being captured by the image sensor 130 is performed. Then, the defective physical pixel is detected from the plurality of physical pixels 138 based on the degree of difference in pixel values between the image pixels A and B among the plurality of image pixels A and the plurality of image pixels B included in each of the images 140A and 140B stored in the image memory 62. Therefore, the defective physical pixel can be detected from the plurality of physical pixels 138 based on the images 140A and 140B stored in the image memory 62.

Moreover, in the imaging apparatus 10 according to the second embodiment, the pixel value of the first image pixel corresponding to the defective physical pixel is corrected based on the pixel value of the second image pixel adjacent to the first image pixel. Therefore, it is possible to rectify a defect of the image pixel corresponding to the defective physical pixel.

In addition, in the imaging apparatus 10 according to the second embodiment, for example, the image sensor 130 is a color type image sensor in which the color filters of different colors are assigned to the plurality of physical pixels 138 in the base arrangement having periodicity. Therefore, the defective physical pixel can be detected from the plurality of physical pixels 138 included in the color type image sensor 130.

In addition, in the imaging apparatus 10 according to the second embodiment, for example, in a case in which the pitches between the plurality of physical pixels 138 are p, the imaging control unit 90 performs control of moving the image sensor 130 in the X direction by a movement amount of 1.5×p [μm]. Therefore, in the physical pixel disposition before and after movement of the color type image sensor 130 having the Bayer arrangement, the first physical pixel after movement can be positioned at a location adjacent to the second physical pixel different from the first physical pixel before movement.

In addition, the imaging apparatus 10 according to the second embodiment comprises the controller 60 that detects the defective physical pixel, the image sensor 130, and the shake correction mechanism 46 that moves the image sensor 130. Therefore, in the imaging apparatus 10, the imaging by the image sensor 130, the movement of the image sensor 130, and the detection of the defective physical pixel can be continuously performed.

It should be noted that, in the second embodiment, the imaging control unit 90 moves the image sensor 130 in the X direction, but may move the image sensor 130 in the Y direction. Also, the imaging control unit 90 may move the image sensor 130 in the X direction and the Y direction. In addition, even in a case in which the image sensor 130 moves in the Y direction or the image sensor 130 moves in the X direction and the Y direction, the processing of detecting the defective physical pixel from the plurality of physical pixels 138 and the processing of correcting the pixel value of the first image pixel corresponding to the defective physical pixel based on the pixel value of the second image pixel adjacent to the first image pixel may be executed by the same method as in the second embodiment.

In addition, in the second embodiment, the imaging control unit 90 moves the image sensor 130 by a movement amount of 1.5×p [μm], but in a case in which the pitches between the plurality of physical pixels 138 are 1, the imaging control unit 90 may move the image sensor 130 in the X direction or the Y direction by a movement amount that is a decimal larger than 1, under the condition that the super-resolution image 150 is obtained. Even with this configuration, in the physical pixel disposition before and after movement of the image sensor 130, the first physical pixel after movement can be positioned at a location adjacent to the second physical pixel different from the first physical pixel before movement.

In addition, in the second embodiment, in a case in which the natural number is n and the pure decimal is d, the imaging control unit 90 may move the image sensor 130 in the X direction or the Y direction by a movement amount of (n+d)×p [μm], under the condition that the super-resolution image 150 is obtained. Even with this configuration, in the physical pixel disposition before and after movement of the image sensor 130, the first physical pixel after movement can be positioned at a location adjacent to the second physical pixel different from the first physical pixel before movement.

In addition, in the second embodiment, in a case in which the natural number is n and the number of physical pixels per period of the base arrangement is T, the imaging control unit 90 may move the image sensor 130 in the X direction or the Y direction by a movement amount of {(T−1)+0.5}×n×p [μm]. Even with this configuration, in the physical pixel disposition before and after movement of the image sensor 130, the first physical pixel after movement can be positioned at a location adjacent to the second physical pixel different from the first physical pixel before movement.

It should be noted that, in a case in which the imaging control unit 90 moves the image sensor 130 by a movement amount of 1.5×p [μm], for example, it is possible to obtain the super-resolution image 150 having a higher resolution than a case in which the image sensor 130 is moved by a movement amount that is a decimal larger than 1.5×p or a movement amount that is a decimal smaller than 1.5×p and larger than 1.0×p [μm].

Moreover, in the second embodiment, the output unit 100 may output the positional information corresponding to the position of the defective physical pixel. The positional information is, for example, information corresponding to the address of the physical pixel 138. With this configuration, it is possible to specify the position of the defective physical pixel based on the positional information corresponding to the position of the output defective physical pixel.

In addition, in the second embodiment, the detection unit 96 may extract an out-of-definition image pixel in which the pixel value is out of a predetermined range from among the plurality of image pixels, and detect the defective physical pixel based on a degree of difference between the pixel value of the out-of-definition image pixel and the pixel value of the image pixel adjacent to the out-of-definition image pixel. With this configuration, it is possible to reduce the number of calculation of the degree of difference as compared with a case in which the degree of difference in pixel values between the image pixels corresponding to the all of the second physical pixels before movement and the first physical pixels after movement, respectively, is calculated.

Also, in the second embodiment, the detection unit 96 detects the defective physical pixel from the plurality of physical pixels 138 in the process in which the super-resolution image 150 is generated, but the technology of the present disclosure is not limited to this. For example, in processing different from the process in which the super-resolution image 150 is generated, the detection unit 96 may detect the defective physical pixel from the plurality of physical pixels 138 based on the images 140A and 140B obtained by being captured by the image sensor 130 before and after movement, by the same method described above.

Figure 17:
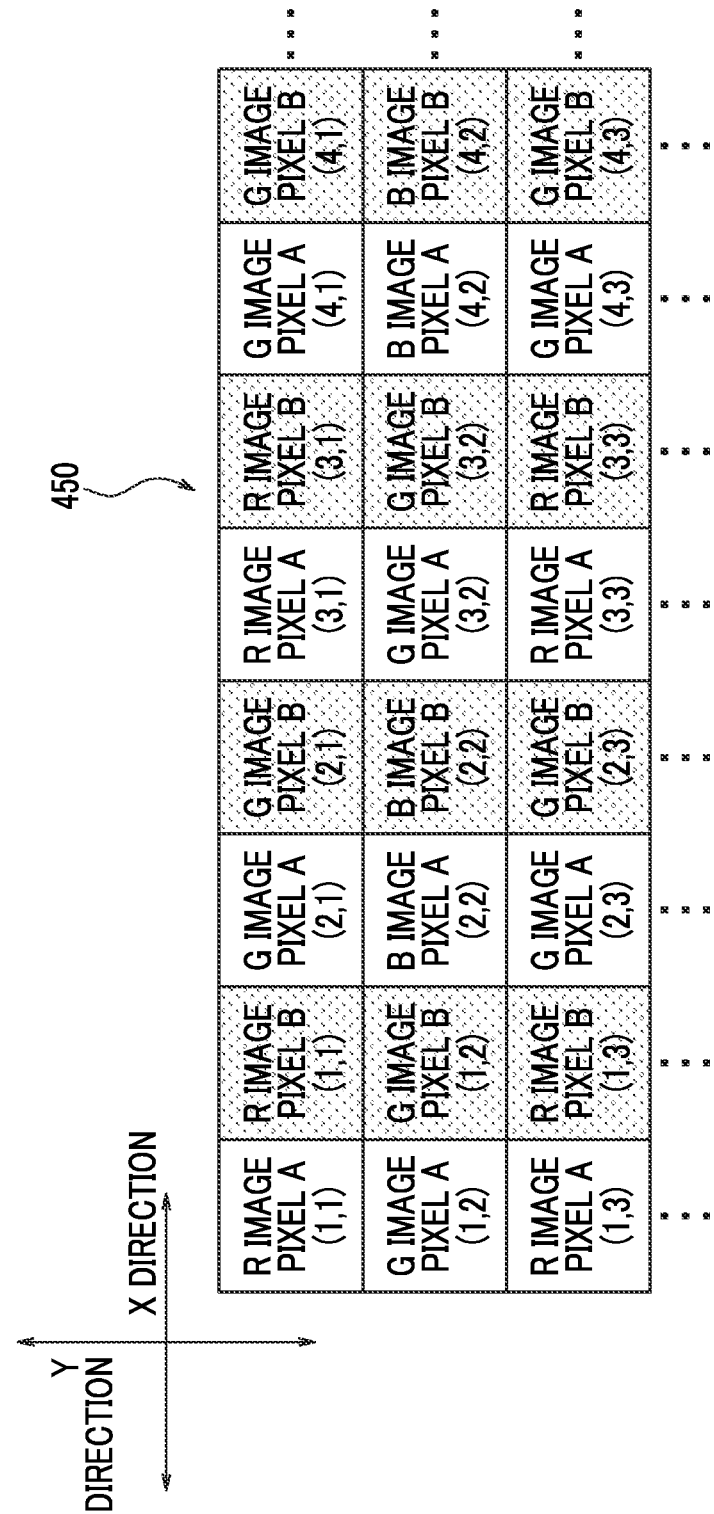
FIG. 17 is a front view showing a second comparative example of the super-resolution image.

It should be noted that FIG. 17 shows a super-resolution image 450 obtained in a comparative example with respect to the second embodiment. The super-resolution image 450 is an image obtained by moving the image sensor 130 (see FIG. 10A) by a movement amount of 0.5×p [μm] instead of movement by the image sensor 40 by 1.5×p [μm]. In this case, in the physical pixel disposition before and after movement of the image sensor 130, the first physical pixel after movement is positioned at a location adjacent to the first physical pixel before movement. Therefore, in the super-resolution image 450, since the pixel values between the adjacent image pixels are the same, it is not possible to detect the defective physical pixel from the plurality of physical pixels.

Third Embodiment

Next, the description of a third embodiment will be made. In the third embodiment, the configuration of the imaging apparatus 10 is changed in the following manner with respect to the first embodiment. It should be noted that, in the third embodiment, the same elements and members as the elements and members in the first embodiment are designated by the same reference numerals as the reference numerals in the first embodiment, and the detailed description thereof will be omitted. In addition, for the overall configuration of the imaging apparatus 10 according to the third embodiment, FIGS. 1 to 5 can be referred to.

Figure 11:
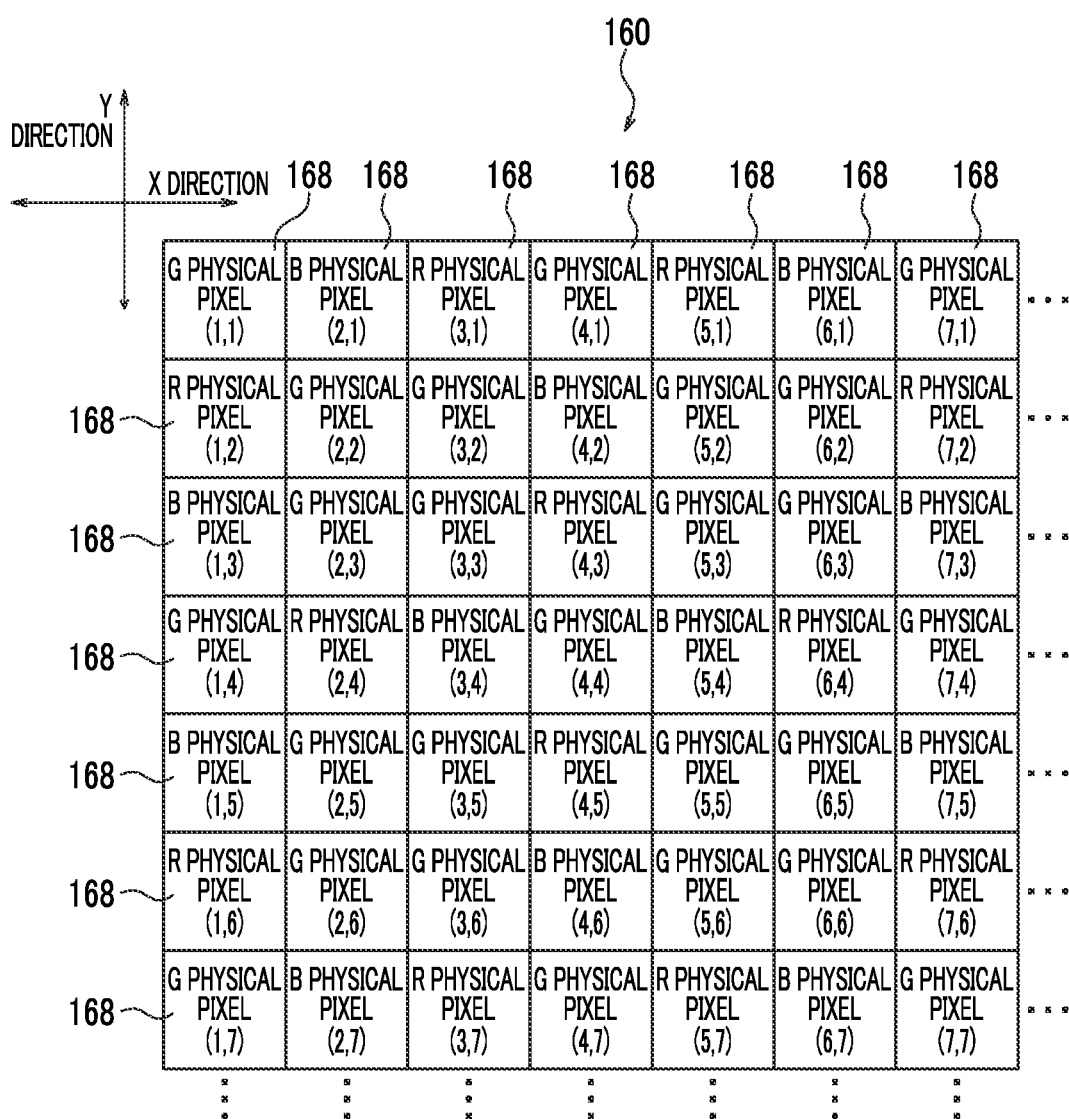
FIG. 11 is a front view showing an example of a configuration of an image sensor according to a third embodiment.

As an example, as shown in FIG. 11, a color type image sensor 160 is used in the third embodiment. The image sensor 160 includes a plurality of physical pixels 168. For example, the plurality of physical pixels 168 are arranged in the X direction and the Y direction. For example, the pitches between the plurality of physical pixels 168 in the X direction are the same, and the pitches between the plurality of physical pixels 168 in the Y direction are the same. In addition, for example, the pitches between the plurality of physical pixels 168 in the X direction are the same as the pitches between the plurality of physical pixels 168 in the Y direction. It should be noted that the pitches between the plurality of physical pixels 168 in the X direction may be different from the pitches between the plurality of physical pixels 168 in the Y direction.

The example shown in FIG. 11 shows a part of the plurality of physical pixels 168, that is, 7×7=49 physical pixels 168. The color filters of different colors are assigned to the plurality of physical pixels 168 in a base arrangement having periodicity. The X-Trans (registered trademark) type arrangement is applied to the image sensor 160 as an example of the base arrangement.

The X-Trans (registered trademark) type arrangement is, for example, an arrangement in which 6×6=36 color filters are grouped together. The 6×6=36 color filters are eight color filter corresponding to a red wavelength range, twenty color filters corresponding to a green wavelength range, and eight color filter corresponding to a blue wavelength range. Hereinafter, in a case in which the plurality of physical pixels 168 are identified by using the color filters assigned to the plurality of physical pixels 168, the physical pixel 168 to which the color filter corresponding to the red wavelength range is assigned is referred to as a R physical pixel, the physical pixel 168 to which the color filter corresponding to the green wavelength range is assigned is referred to as a G physical pixel, and the physical pixel 168 to which the color filter corresponding to the blue wavelength range is assigned is referred to as a B physical pixel.

The 6×6=36 physical pixels 168 are arranged in the following manner. That is, the six physical pixels 168 in the first column are arranged in an order of the G physical pixel, the R physical pixel, the B physical pixel, the G physical pixel, the B physical pixel, and the R physical pixel. The six physical pixels 168 in the second column are arranged in an order of the B physical pixel, the G physical pixel, the G physical pixel, the R physical pixel, the G physical pixel, and the G physical pixel. The six physical pixels 168 in the third column are arranged in an order of the R physical pixel, the G physical pixel, the G physical pixel, the B physical pixel, the G physical pixel, and the G physical pixel. The six physical pixels 168 in the fourth column are arranged in an order of the G physical pixel, the B physical pixel, the R physical pixel, the G physical pixel, the R physical pixel, and the B physical pixel. The six physical pixels 168 in the fifth column are arranged in an order of the R physical pixel, the G physical pixel, the G physical pixel, the B physical pixel, the G physical pixel, and the G physical pixel. The six physical pixels 168 in the sixth column are arranged in an order of the B physical pixel, the G physical pixel, the G physical pixel, the R physical pixel, the G physical pixel, and the G physical pixel.

FIG. 11 shows the addresses of the plurality of physical pixels 168 in the X direction and the addresses thereof in the Y direction. For example, the address (1,1) represents 1 for the address in the X direction and 1 for the address in the Y direction, and the address (2,1) represents 2 for the address in the X direction and 1 for the address in the Y direction. Each of the plurality of physical pixels 168 includes a photodiode for example, performs photoelectric conversion of the received light, and outputs the electric signal according to the received light amount.

Next, the imaging control unit 90, the storage processing unit 92, the generation unit 94, the detection unit 96, and the output unit 100 (see FIG. 6) according to the third embodiment will be described.

Figure 12A:
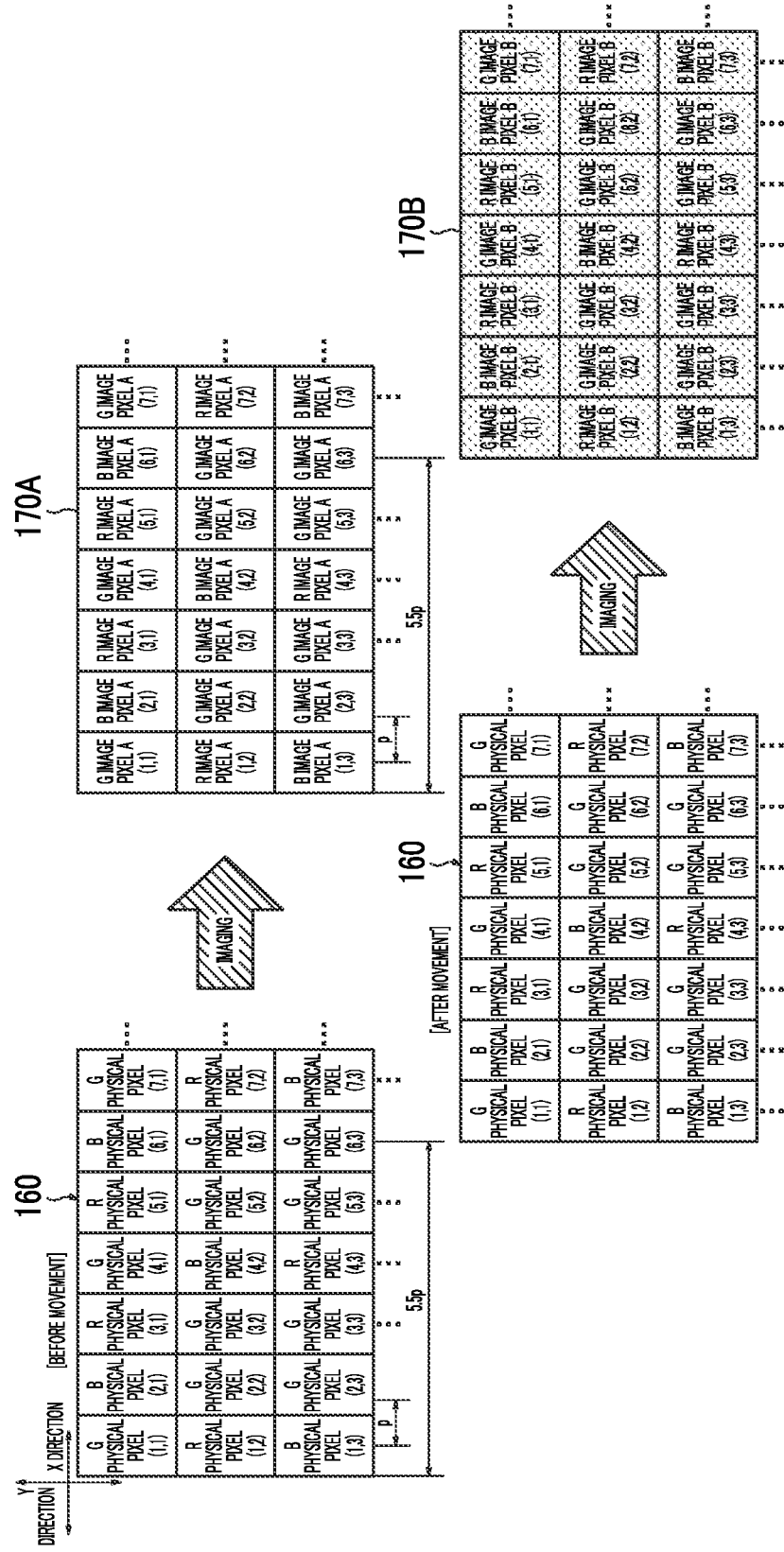
FIG. 12A is a conceptual diagram showing an example of a state in which a plurality of images are captured by the image sensor shown in FIG. 11.

As an example, as shown in FIG. 12A, the imaging control unit 90 performs, with respect to the actuator 52 of the shake correction mechanism 46, control of moving the image sensor 160 in the X direction. In this case, the imaging control unit 90 performs control of moving the image sensor 160 to obtain a super-resolution image 180 (see FIG. 12B), which will be described later.

For example, with the image sensor 160 which is the color type image sensor to which the color filters of different colors are assigned in the X-Trans (registered trademark) type arrangement, the imaging control unit 90 performs control of moving the image sensor 160 in the following manner. That is, in a case in which the pitches between the plurality of physical pixels 168 are p [μm], the natural number is n, and the number of physical pixels per period of the X-Trans (registered trademark) type arrangement is T, the imaging control unit 90 performs control of moving the image sensor 160 in the X direction by a movement amount of $\{(T-1)+0.5\} \times n \times p$ [μm] while fixing the position of the image sensor 160 in the Y direction. For example, since the number of physical pixels T per period of the X-Trans (registered trademark) type arrangement is 6, in a case in which n=1, the movement amount is defined as 5.5×p. For example, the imaging control unit 90 performs control of moving the image sensor 160 by a movement amount of 5.5×p [μm].

In addition, the imaging control unit 90 controls the photoelectric conversion element driver 68 to cause the image sensor 160 to perform the imaging before and after movement. As a result, the imaging control unit 90 acquires images 170A and 170B obtained by being captured by the image sensor 160 before and after movement. The image 170A is an image obtained by being captured by the image sensor 160 before movement, and the image 170B is an image obtained by being captured by the image sensor 160 after movement. The image 170B is an image obtained by being captured by the image sensor 160 at a position deviated in the X direction by 5.5×p [μm] with respect to the image 170A. In the example shown in FIG. 12A, in order to facilitate the distinction between the image 170A and the image 170B, dot-shaped hatching is added to the image 170B obtained by being captured by the image sensor 160 after movement. The image 170A and the image 170B are examples of a "plurality of images" according to the technology of the present disclosure.

The image 170A includes the plurality of image pixels A, and the image 170B includes the plurality of image pixels B. The plurality of image pixels A correspond to the plurality of physical pixels 168 of the image sensor 160 before movement, and the plurality of image pixels B correspond to the plurality of physical pixels 168 of the image sensor 160 after movement. The example shown in FIG. 12A shows a part of the plurality of image pixels A obtained before movement of the image sensor 160 and a part of the plurality of image pixels B obtained after movement of the image sensor 160, that is, 7×3=21 image pixels A and 7×3=21 image pixels B. For example, the G image pixels A and B of the address (1,1) correspond to the G physical pixel of the address (1,1), and the B image pixels A and B of the address (6,1) correspond to the B physical pixel of the address (6,1). It should be noted that, in the following description, for convenience of description, in a case in which the distinction is not needed, the image pixel A and the image pixel B are referred to as "image pixels" without reference numerals.

The storage processing unit 92 performs processing of storing, in the image memory 62, the images 170A and 170B obtained by being captured by the image sensor 160.

As an example, as shown in FIG. 12B, the generation unit 94 performs the super-resolution on a plurality of low-resolution images (for example, the images 170A and 170B) obtained by being captured by the image sensor 160. Here, the super-resolution means, for example, the processing of generating the high-resolution image which is an image having a higher-resolution than the low-resolution image by combining the plurality of low-resolution images by deviating the positions of the image pixels. In general, the high-resolution image generated in this manner is also referred to as a super-resolution image.

In the example shown in FIG. 12B, the generation unit 94 generates the super-resolution image 180 by performing the super-resolution on the images 170A and 170B obtained by being captured by the image sensor 160. The super-resolution in a case in which the color type image sensor 160 to which the color filters of different colors are assigned in the X-Trans (registered trademark) type arrangement is used is realized, for example, in the following manner. That is, an arrangement order of seven image pixels A and seven image pixels B arranged in the X direction obtained, respectively, before and after movement of the image sensor 160 is determined based on the absolute positions before and after movement of the image sensor 160. The absolute position is a position with the center of the image pixel A and the center of the image pixel B as a reference.

Next, the plurality of image pixels A included in the image 170A obtained before movement of the image sensor 160 and the plurality of image pixels B included in the image 170B obtained after movement of the image sensor 160 are arranged based on the arrangement order described above. As a result, the super-resolution image 180 obtained by performing the super-resolution on the image 170A and the image 170B is obtained. The example shown in FIG. 12B shows a part of the super-resolution image 180, that is, 42×2=84 image pixels A and B obtained, respectively, before and after movement of the image sensor 160.

As shown above, the imaging control unit 90 performs control of moving the image sensor 160 in the X direction by a movement amount of 5.5×p [μm]. As a result, as represented in the super-resolution image 180, in a case in which the image pixel A corresponding to any physical pixel 168 before movement is a first image pixel A, the image pixel A different from the first image pixel A is a second image pixel A, and the image pixel B corresponding to any physical pixel 168 after movement is a first image pixel B, the first image pixel B is adjacent to the second image pixel A.

In the examples shown in FIGS. 12A and 12B, for example, in a case in which the G image pixel A of the address (1,1) is the first image pixel A, the B image pixel A of the address (6,1) is the second image pixel A, and the G image pixel B of the address (1,1) is the first image pixel B, the G image pixel B of the address (1,1), that is, the first image pixel B is adjacent to the B image pixel A of the address (6,1), that is, the second image pixel A.

The plurality of image pixels A and B correspond to the positions of the plurality of physical pixels 168 before and after movement of the image sensor 160, respectively. Therefore, the super-resolution image 180 represents the physical pixel disposition before and after movement of the image sensor 160. For example, in a case in which the physical pixel 168 corresponding to the first image pixel A and the first image pixel B is the first physical pixel and the physical pixel 168 corresponding to the second image pixel A is the second physical pixel, the imaging control unit 90 performs control of moving, in the physical pixel disposition before and after movement of the image sensor 160 represented by the super-resolution image 180, the image sensor 160 to a location at which the first physical pixel after movement to the location adjacent to the second physical pixel different from the first physical pixel before movement is positioned.

In other words, the imaging control unit 90 moves the image sensor 160 such that the physical pixel disposition before and after movement of the image sensor 160 represented by the super-resolution image 180 becomes the physical pixel disposition in which the adjacent image pixels included in the super-resolution image 180 are made to be the image pixels corresponding to the different physical pixels 168.

As an example of such control, as shown above, the imaging control unit 90 performs control of moving the image sensor 160 in the X direction by a movement amount of 5.5×p [μm]. As described above, the physical pixel disposition before and after movement of the image sensor 160 is represented by, for example, the super-resolution image 180, and the physical pixel disposition is realized regardless of whether or not there is a space for one physical pixel between the physical pixels of the image sensor 160.

It should be noted that, in the example shown in FIGS. 12A and 12B, for example, in a case in which the G physical pixel of the address (1,1) is the first physical pixel before movement of the image sensor 160, the G physical pixel of the address (1,1) corresponds to an example of a "first physical pixel" according to the technology of the present disclosure, and the B physical pixel of the address (6,1), which is the second physical pixel different from the G physical pixel of the address (1,1) before movement, corresponds to an example of a "second physical pixel" according to the technology of the present disclosure.

In addition, for example, the G image pixel A of the address (1,1) is an example of an "image pixel corresponding to the first physical pixel before movement" according to the technology of the present disclosure, the B image pixel A of the address (6,1) is an example of an "image pixel corresponding to a second physical pixel different from the first physical pixel before movement" according to the technology of the present disclosure, and the G image pixel B of the address (1,1) is an example of an "image pixel corresponding to the first physical pixel after movement" according to the technology of the present disclosure.

Figure 12C:
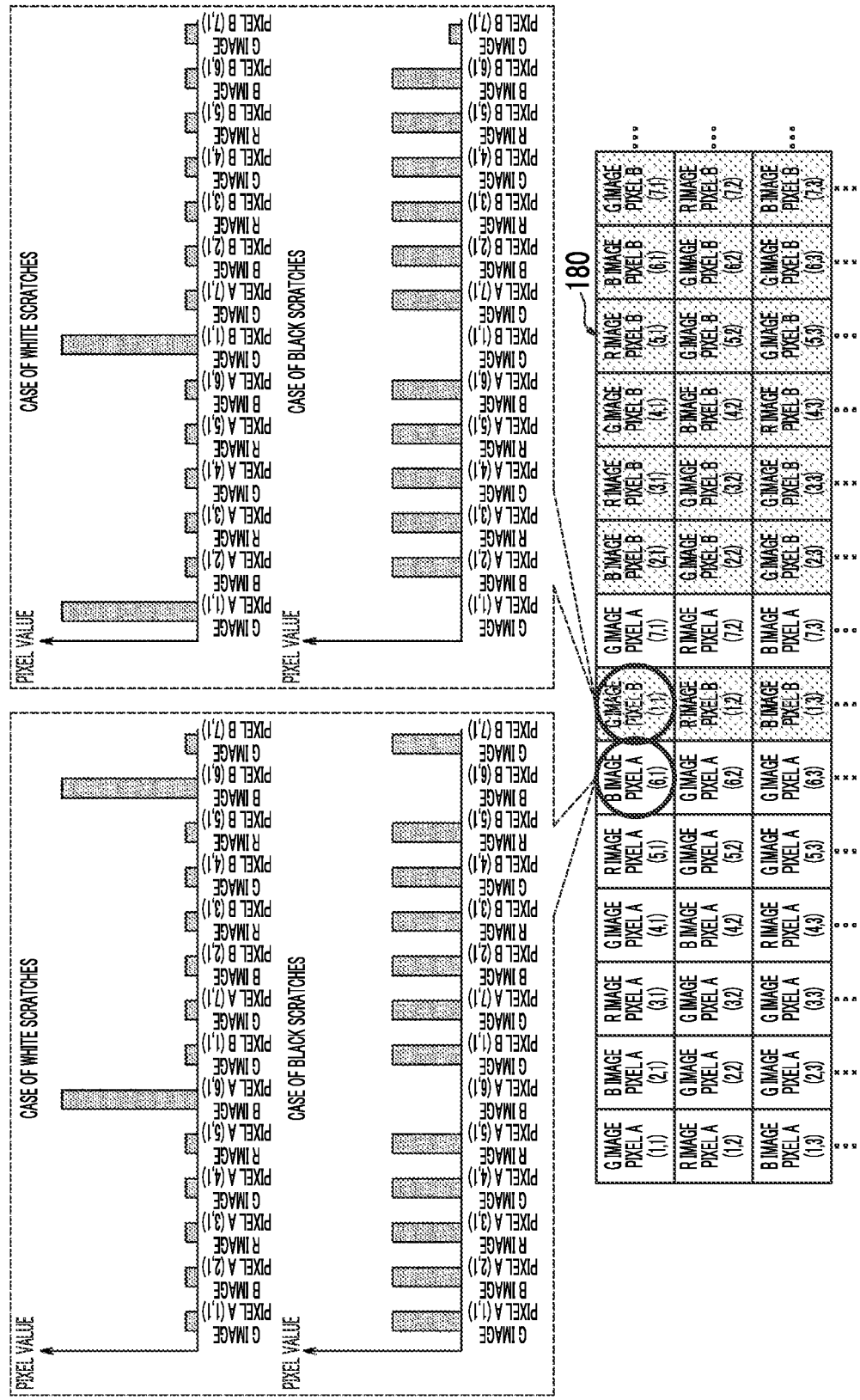
FIG. 12C is a conceptual diagram showing an example of a state in which a defective physical pixel is detected based on the super-resolution image shown in FIG. 12B.

As an example, as shown in FIG. 12C, the detection unit 96 calculates a degree of difference in pixel values between the image pixels A and B corresponding to the second physical pixel before movement and the first physical pixel after movement, respectively, among the plurality of image pixels A and the plurality of image pixels B included in the super-resolution image 180. In a case in which the image sensor 160 moves in the X direction, the image pixels adjacent to each other in the X direction are selected. It should be noted that, in a case in which the image sensor 160 moves in the Y direction, the image pixels adjacent to each other in the Y direction are selected. The pixel value of the image pixel A is proportional to the value of the electric signal output from the physical pixel 168 corresponding to the image pixel A, and the pixel value of the image pixel B is proportional to the value of the electric signal output from the physical pixel 168 corresponding to the image pixel B.

The detection unit 96 detects a defective physical pixel from the plurality of physical pixels 168 based on the calculated degree of difference. The defective physical pixel refers to a defective physical pixel 168. For example, the detection unit 96 sequentially calculates the degree of difference in pixel values between all the image pixels A and B that are the targets for detecting the defective physical pixel (hereinafter, simply referred to as "detection targets"). In FIG. 12C, as an example of the image pixels A and B that are the detection target, the B image pixel A of the address (6,1) and the G image pixel B of the address (1,1) are highlighted (displayed by a circle), and a state is shown in which the degree of difference in pixel values between the B image pixel A of the address (6,1) and the G image pixel B of the address (1,1) is calculated.

Various methods can be applied as the method of detecting the defective physical pixel by the detection unit 96. The detection unit 96 detects the defective physical pixel, for example, in the following manner.

That is, for example, the detection unit 96 calculates the subtraction value or the division value of the pixel values between the image pixels A and B that are the detection targets as the degree of difference in pixel values between the image pixels A and B that are detection targets, and in a case in which the calculated degree of difference exceeds the preset threshold value, acquires the pixel value of each of the image pixels A and B that are the targets for calculating the degree of difference and the pixel value of each of the image pixels A and B in the vicinity thereof.

That is, for example, the detection unit 96 calculates the subtraction value or the division value of the pixel values between the image pixels A and B that are the detection targets as the degree of difference in pixel values between the image pixels A and B that are detection targets, and in a case in which the calculated degree of difference exceeds the preset threshold value, acquires the pixel value of each of the image pixels A and B that are the targets for calculating the degree of difference and the pixel value of each of the image pixels A and B in the vicinity thereof.

For example, in a case in which the degree of difference in pixel values between the B image pixel A of the address (6,1) and the G image pixel B of the address (1,1) exceeds the preset threshold value, the detection unit 96 acquires the pixel values of the B image pixel A of the address (6,1) and the G image pixel B of the address (1,1), and acquires the pixel value of each of the G image pixel A of the address (1,1), the B image pixel A of the address (2,1), the R image pixel A of the address (3,1), the G image pixel A of the address (4,1), the R image pixel A of the address (5,1), the G image pixel A of the address (7,1), the B image pixel B of the address (2,1), the R image pixel B of the address (3,1), the G image pixel B of the address (4,1), the R image pixel B of the address (5,1), the R image pixel B of the address (6,1), and the G image pixel B of the address (7,1) in the vicinity thereof.

In a case in which a pixel value pattern, which is the arrangement of the plurality of acquired pixel values, matches an abnormal pixel value pattern in which the B image pixel A of the address (6,1) and the B image pixel B of the address (6,1) corresponding to the B image pixel A of the address (6,1) are predetermined as white scratches or black scratches, the detection unit 96 detects that the B physical pixels of the address (6,1) corresponding to the B image pixel A of the address (6,1) and the B image pixel B of the address (6,1) are the defective physical pixels.

It should be noted that, in this case, in a case in which the acquired pixel value pattern matches the abnormal pixel value pattern including the white scratches, the detection unit 96 may detect that the B image pixel A of the address (6,1) and the B image pixel B of the address (6,1) are the white scratches. In addition, in a case in which the acquired pixel value pattern matches the abnormal pixel value pattern including the black scratches, the detection unit 96 may detect that the B image pixel A of the address (6,1) and the B image pixel B of the address (6,1) are the black scratches.

In addition, in a case in which a pixel value pattern, which is the arrangement of the plurality of acquired pixel values, matches an abnormal pixel value pattern in which the G image pixel B of the address (1,1) and the G image pixel A of the address (1,1) corresponding to the G image pixel B of the address (1,1) are predetermined as white scratches or black scratches, the detection unit 96 detects that the G physical pixels of the address (1,1) corresponding to the G image pixel B of the address (1,1) and the G image pixel A of the address (1,1) are the defective physical pixels.

It should be noted that, in this case, in a case in which the acquired pixel value pattern matches the abnormal pixel value pattern including the white scratches, the detection unit 96 may detect that the image pixel B of the address (1,1) and the image pixel A of the address (1,1) are the white scratches. In addition, in a case in which the acquired pixel value pattern matches the abnormal pixel value pattern including the black scratches, the detection unit 96 may detect that the image pixel B of the address (1,1) and the image pixel A of the address (1,1) are the black scratches.

The correction unit 98 corrects the pixel value of the image pixel corresponding to the defective physical pixel detected by the detection unit 96, based on the pixel value of the image pixel adjacent to the corresponding image pixel. Various methods can be applied as the method of correcting the pixel value. The correction unit 98 corrects the pixel value, for example, in the following manner.

That is, the correction unit 98 performs the correction by setting the pixel value of the first image pixel corresponding to the defective physical pixel detected by the detection unit 96 to the average value or the median value of the pixel values of the second image pixels adjacent to the first image pixel. For example, in a case in which it is detected that the B physical pixel of the address (6,1) is the defective physical pixel, the correction unit 98 performs the correction by setting the B image pixel A of the address (6,1) to an average value or a median value of the pixel values of the image pixels A and B adjacent to the B image pixel A of the address (6,1), and performs the correction by setting the B image pixel B of the address (6,1) to the average value or the median value of the pixel values of the image pixels A and B adjacent to the B image pixel B of the address (6,1). In addition, for example, in a case in which it is detected that the G physical pixel of the address (1,1) is the defective physical pixel, the correction unit 98 performs the correction by setting the G image pixel B of the address (1,1) to an average value or a median value of the pixel values of the image pixels A and B adjacent to the G image pixel B of the address (1,1), and performs the correction by setting the G image pixel A of the address (1,1) to the average value or the median value of the pixel values of the image pixels A and B adjacent to the G image pixel A of the address (1,1). In this way, the corrected super-resolution image 180 is obtained by correcting the pixel values of the image pixels corresponding to the defective physical pixels. For example, in a case in which the image pixel corresponding to the defective physical pixel is the white scratch or the black scratch, the super-resolution image 180 corrected such that the white scratch or the black scratch is not conspicuous is obtained.

It should be noted that, in this example, in a case in which it is detected that the B physical pixel of the address (6,1) is the defective physical pixel, the B image pixel A of the address (6,1) and the B image pixel B of the address (6,1) correspond to an example of a "first image pixel corresponding to the defective physical pixel" according to the technology of the present disclosure, and the image pixels A and B adjacent to the B image pixel A of the address (6,1) and the B image pixel B of the address (6,1), respectively, correspond to an example of a "second image pixel adjacent to the first image pixel" according to the technology of the present disclosure. In addition, in a case in which it is detected that the G physical pixel of the address (1,1) is the defective physical pixel, the G image pixel B of the address (1,1) and the G image pixel A of the address (1,1) correspond to an example of a "first image pixel corresponding to the defective physical pixel" according to the technology of the present disclosure, and the image pixel A adjacent to the G image pixel B of the address (1,1) and the image pixel B adjacent to the G image pixel A of the address (1,1) correspond to an example of a "second image pixel adjacent to the first image pixel" according to the technology of the present disclosure.

The output unit 100 performs processing of outputting the corrected super-resolution image 180 to the display 26. As a result, the super-resolution image 180 is displayed on the display 26 in a state in which the pixel value of the image pixel corresponding to the defective physical pixel is corrected. For example, in a case in which the image pixel corresponding to the defective physical pixel is the white scratch or the black scratch, the super-resolution image 180 corrected such that the white scratch or the black scratch is not conspicuous is displayed on the display 26.

It should be noted that an action of the imaging apparatus 10 (operation of the imaging apparatus 10) according to the third embodiment is the same as the action of the first embodiment.

As described above, in the imaging apparatus 10 according to the third embodiment, control of moving, in the physical pixel disposition before and after movement of the image sensor 160 including the plurality of physical pixels 168, the image sensor 160 to a location at which any first physical pixel 168 after movement to a location adjacent to the second physical pixel different from any first physical pixel before movement is positioned is performed. In addition, the image sensor 160 is controlled by the imaging control unit 90 via the photoelectric conversion element driver 68, so that the imaging is performed by the image sensor 160 before and after movement. Then, the defective physical pixel is detected from the plurality of physical pixels 168 based on the degree of difference in pixel values between the image pixel A corresponding to the second physical pixel before movement and the image pixel B corresponding to the first physical pixel after movement among the plurality of image pixels A and the plurality of image pixels B included in each of the images 170A and 170B obtained by being captured by the image sensor 160. Therefore, the defective physical pixel can be detected from the plurality of physical pixels 168 based on the images 170A and 170B obtained by being captured before and after movement of the image sensor 160.

In addition, in the imaging apparatus 10 according to the third embodiment, processing of storing, in the image memory 62, the images 170A and 170B obtained by being captured by the image sensor 160 is performed. Then, the defective physical pixel is detected from the plurality of physical pixels 168 based on the degree of difference in pixel values between the image pixels A and B among the plurality of image pixels A and the plurality of image pixels B included in each of the images 170A and 170B stored in the image memory 62. Therefore, the defective physical pixel can be detected from the plurality of physical pixels 168 based on the images 170A and 170B stored in the image memory 62.

Moreover, in the imaging apparatus 10 according to the third embodiment, the pixel value of the first image pixel corresponding to the defective physical pixel is corrected based on the pixel value of the second image pixel adjacent to the first image pixel. Therefore, it is possible to rectify a defect of the image pixel corresponding to the defective physical pixel.

In addition, in the imaging apparatus 10 according to the third embodiment, for example, the image sensor 160 is a color type image sensor 160 in which the color filters of different colors are assigned to the plurality of physical pixels 168 in the base arrangement having periodicity. Therefore, the defective physical pixel can be detected from the plurality of physical pixels 168 included in the color type image sensor 160.

In addition, in the imaging apparatus 10 according to the third embodiment, for example, in a case in which the pitches between the plurality of physical pixels 168 are p, the imaging control unit 90 performs control of moving the image sensor 160 in the X direction by a movement amount of 5.5×p [μm]. Therefore, in the physical pixel disposition before and after movement of the color type image sensor 160 having the X-Trans (registered trademark) type arrangement, the first physical pixel after movement can be positioned at a location adjacent to the second physical pixel different from the first physical pixel before movement.

In addition, the imaging apparatus 10 according to the third embodiment comprises the controller 60 that detects the defective physical pixel, the image sensor 160, and the shake correction mechanism 46 that moves the image sensor 160. Therefore, in the imaging apparatus 10, the imaging by the image sensor 160, the movement of the image sensor 160, and the detection of the defective physical pixel can be continuously performed.

It should be noted that, in the third embodiment, the imaging control unit 90 moves the image sensor 160 in the X direction, but may move the image sensor 160 in the Y direction. Also, the imaging control unit 90 may move the image sensor 160 in the X direction and the Y direction. In addition, even in a case in which the image sensor 160 moves in the Y direction or the image sensor 160 moves in the X direction and the Y direction, the processing of detecting the defective physical pixel from the plurality of physical pixels 168 and the processing of correcting the pixel value of the first image pixel corresponding to the defective physical pixel based on the pixel value of the second image pixel adjacent to the first image pixel may be executed by the same method as in the third embodiment.

In addition, in the third embodiment, the imaging control unit 90 moves the image sensor 160 by a movement amount of 5.5×p [μm], but in a case in which the pitches between the plurality of physical pixels 168 are 1, the imaging control unit 90 may move the image sensor 160 in the X direction or the Y direction by a movement amount that is a decimal larger than 1, under the condition that the super-resolution image 180 is obtained. Even with this configuration, in the physical pixel disposition before and after movement of the image sensor 160, the first physical pixel after movement can be positioned at a location adjacent to the second physical pixel different from the first physical pixel before movement.

In addition, in the third embodiment, in a case in which the natural number is n and the pure decimal is d, the imaging control unit 90 may move the image sensor 160 in the X direction or the Y direction by a movement amount of (n+d)×p [μm], under the condition that the super-resolution image 180 is obtained. Even with this configuration, in the physical pixel disposition before and after movement of the image sensor 160, the first physical pixel after movement can be positioned at a location adjacent to the second physical pixel different from the first physical pixel before movement.

In addition, in the third embodiment, in a case in which the natural number is n and the number of physical pixels per period of the base arrangement is T, the imaging control unit 90 may move the image sensor 160 in the X direction or the Y direction by a movement amount of $\{(T-1)+0.5\} \times n \times p$ [μm]. Even with this configuration, in the physical pixel disposition before and after movement of the image sensor 160, the first physical pixel after movement can be positioned at a location adjacent to the second physical pixel different from the first physical pixel before movement.

It should be noted that, in a case in which the imaging control unit 90 moves the image sensor 160 by a movement amount of 5.5×p [μm], for example, it is possible to obtain the super-resolution image 180 having a higher resolution than a case in which the image sensor 160 is moved by a movement amount that is a decimal larger than 5.5×p or a movement amount that is a decimal smaller than 5.5×p and larger than 5.0×p.

Moreover, in the third embodiment, the output unit 100 may output the positional information corresponding to the position of the defective physical pixel. The positional information is, for example, information corresponding to the address of the physical pixel 168. With this configuration, it is possible to specify the position of the defective physical pixel based on the positional information corresponding to the position of the output defective physical pixel.

In addition, in the third embodiment, the detection unit 96 may extract an out-of-definition image pixel in which the pixel value is out of a predetermined range from among the plurality of image pixels, and detect the defective physical pixel based on a degree of difference between the pixel value of the out-of-definition image pixel and the pixel value of the image pixel adjacent to the out-of-definition image pixel. With this configuration, it is possible to reduce the number of calculation of the degree of difference as compared with a case in which the degree of difference in pixel values between the image pixels corresponding to the all of the second physical pixels before movement and the first physical pixels after movement, respectively, is calculated.

Also, in the third embodiment, the detection unit 96 detects the defective physical pixel from the plurality of physical pixels 168 in the process in which the super-resolution image 180 is generated, but the technology of the present disclosure is not limited to this. For example, in processing different from the process in which the super-resolution image 180 is generated, the detection unit 96 may detect the defective physical pixel from the plurality of physical pixels 168 based on the images 170A and 170B obtained by being captured by the image sensor 160 before and after movement, by the same method described above.

Figure 18:
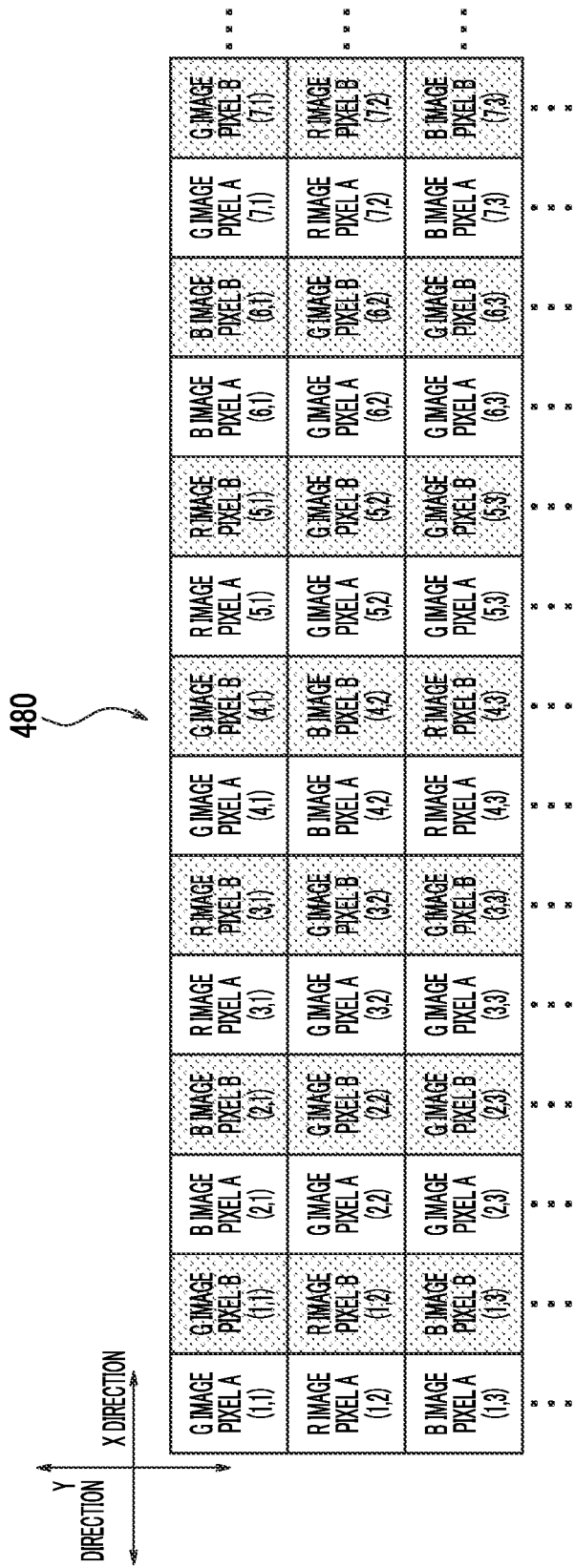
FIG. 18 is a front view showing a third comparative example of the super-resolution image.

It should be noted that FIG. 18 shows a super-resolution image 480 obtained in a comparative example with respect to the third embodiment. The super-resolution image 480 is an image obtained by moving the image sensor 160 (see FIG. 12A) by a movement amount of 0.5×p [μm] instead of movement by the image sensor 40 by 5.5×p [μm]. In this case, in the physical pixel disposition before and after movement of the image sensor 160, the first physical pixel after movement is positioned at a location adjacent to the first physical pixel before movement. Therefore, in the super-resolution image 480, since the pixel values between the adjacent image pixels are the same, it is not possible to detect the defective physical pixel from the plurality of physical pixels.

Fourth Embodiment

Next, the description of a fourth embodiment will be made. In the fourth embodiment, the configuration of the imaging apparatus 10 is changed in the following manner with respect to the second embodiment. It should be noted that, in the fourth embodiment, the same elements and members as the elements and members in the second embodiment are designated by the same reference numerals as the reference numerals in the second embodiment, and the detailed description thereof will be omitted. In addition, for the overall configuration of the imaging apparatus 10 according to the fourth embodiment, FIGS. 1 to 5, and 9 can be referred to.

In the fourth embodiment, as an example of the color type image sensor 130, an image sensor 130 (see FIG. 9) in which the color filters of different colors are assigned to the plurality of physical pixels in the Bayer arrangement is used.

The imaging control unit 90, the storage processing unit 92, the generation unit 94, the detection unit 96, and the output unit 100 (see FIG. 6) according to the fourth embodiment are configured in the following manner.

Figure 13A:
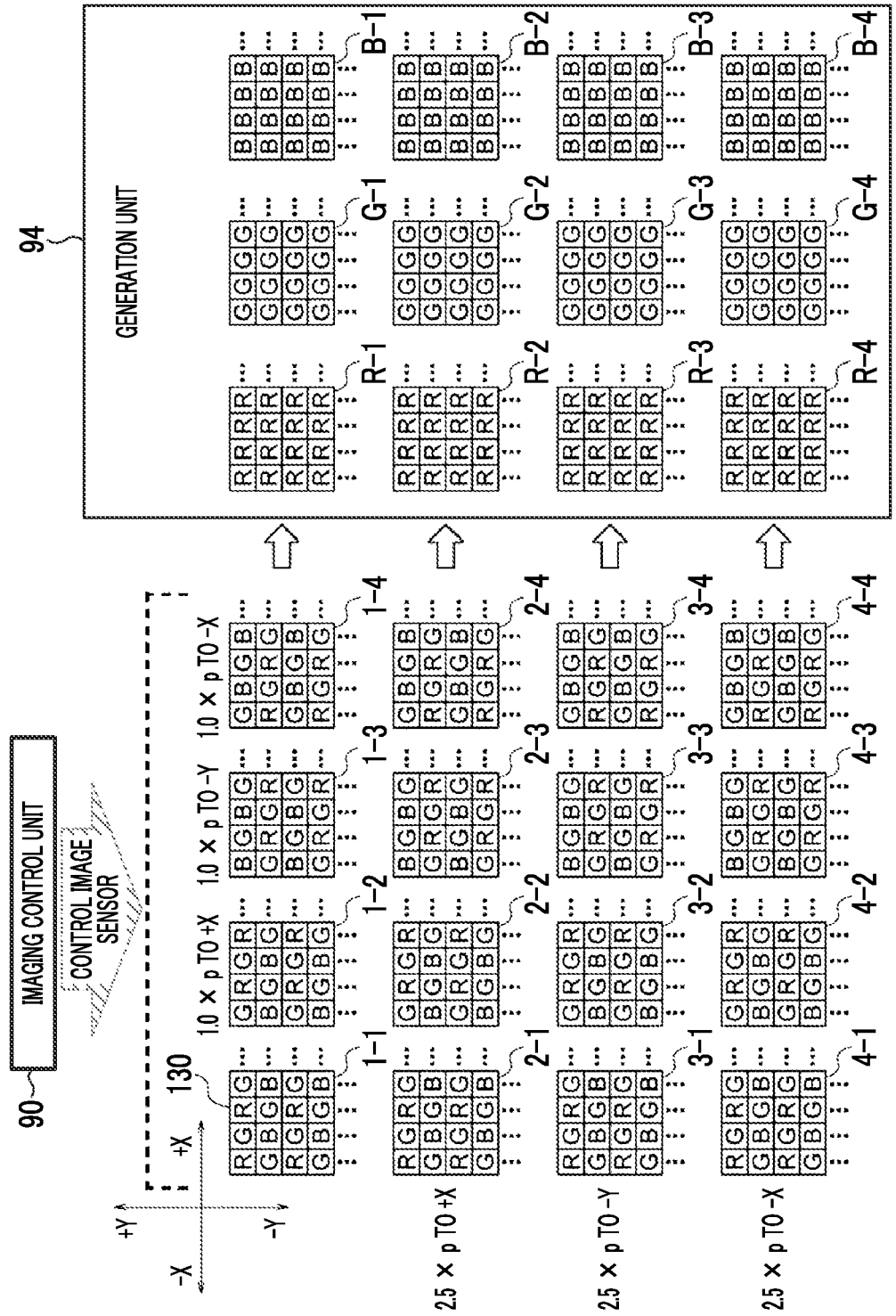
FIG. 13A is a conceptual diagram showing an example of a state in which a plurality of images are captured by an image sensor according to a fourth embodiment and a plurality of monochromatic images are generated from the plurality of images.
Figure 13B:
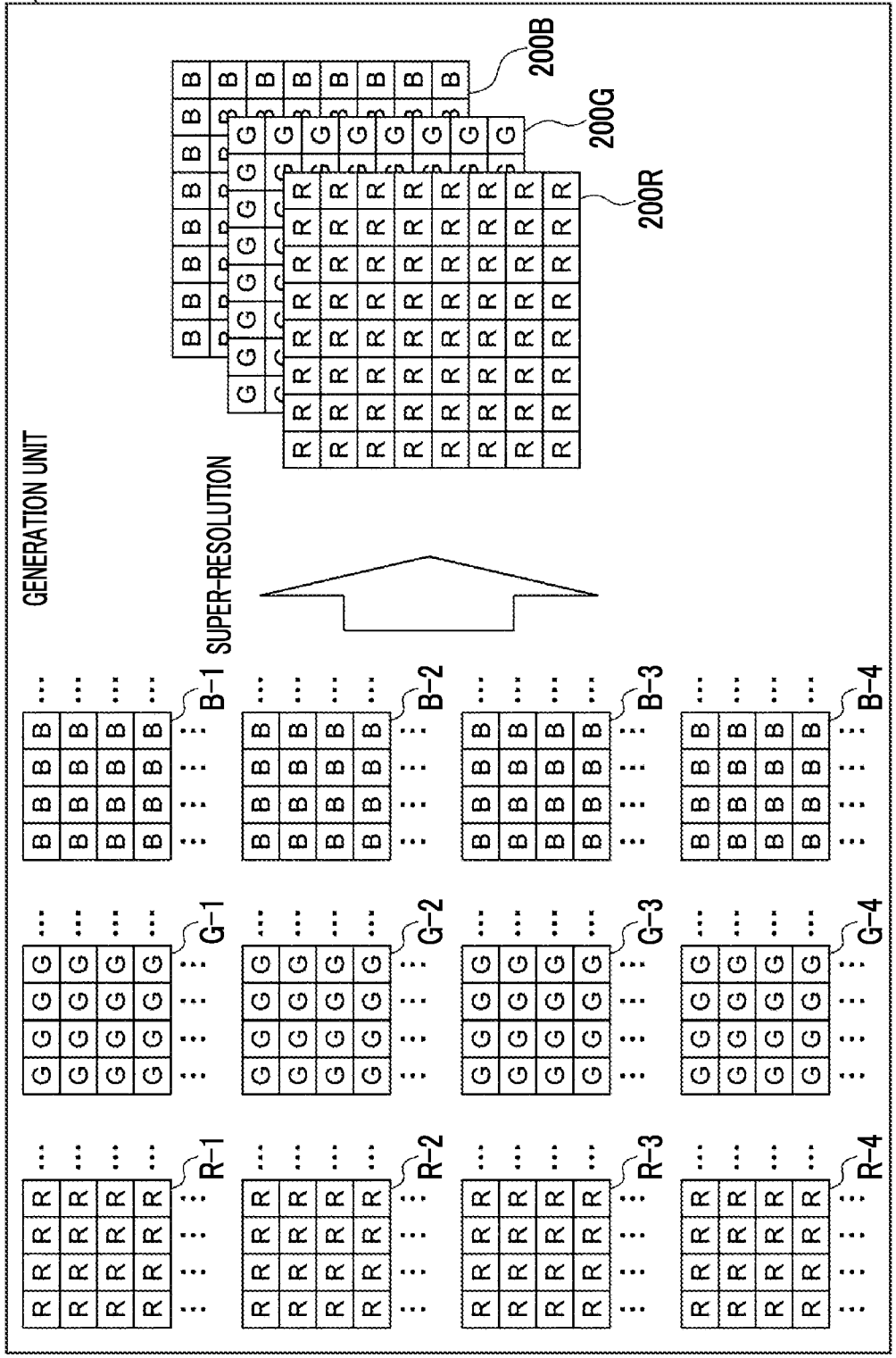
FIG. 13B is a conceptual diagram showing an example of a state in which a plurality of monochromatic super-resolution images are generated from the plurality of monochromatic images shown in FIG. 13A.
Figure 13C:
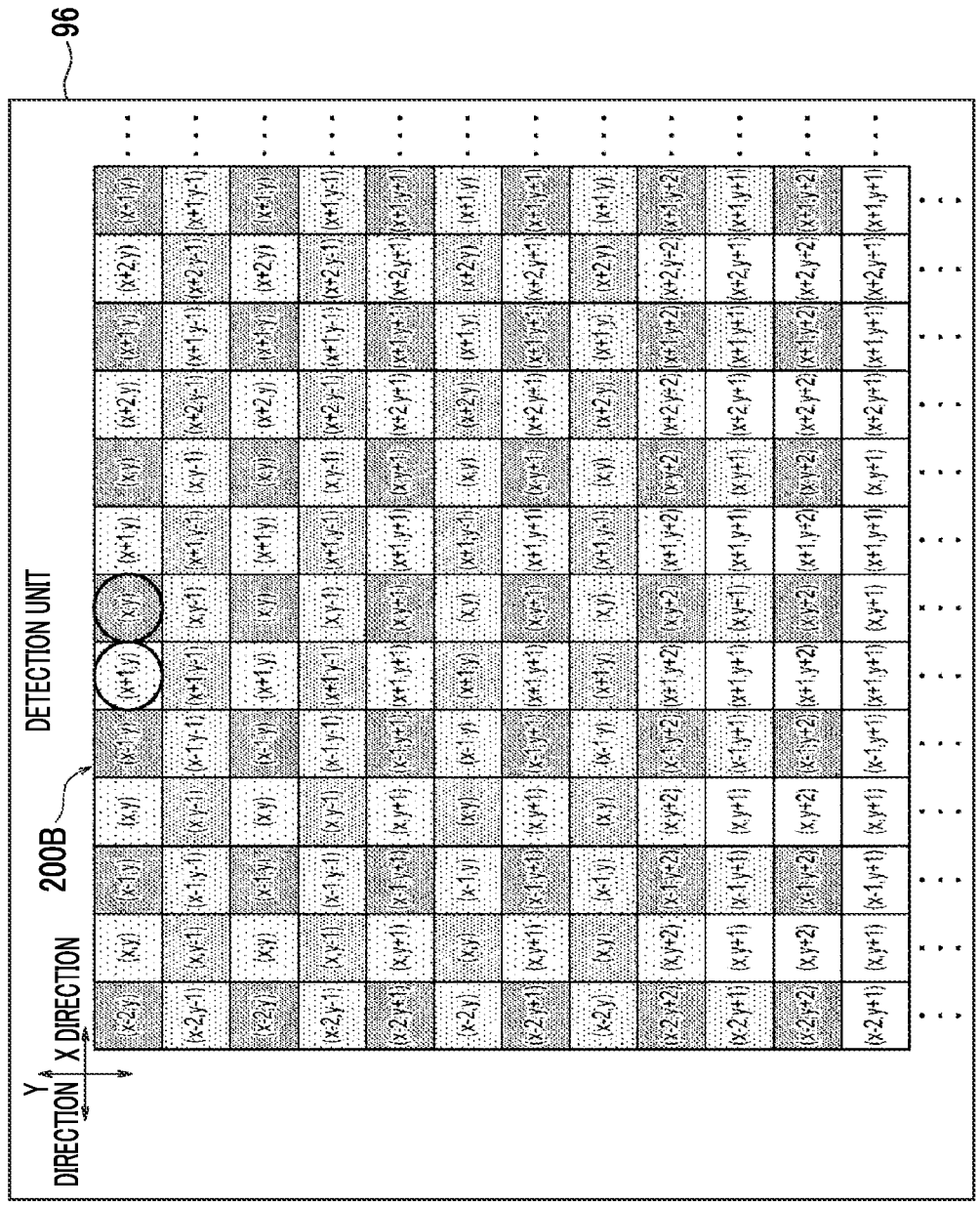
FIG. 13C is an enlarged view showing an enlarged example of the monochromatic super-resolution image shown in FIG. 13B.

As an example, as shown in FIGS. 13A to 13C, the imaging control unit 90 performs control of moving the image sensor 130 and control of causing the image sensor 130 to perform the imaging before and after movement to obtain a plurality of monochromatic super-resolution images 200R, 200G, and 200B (see FIG. 13B), which will be described later. In FIGS. 13A and 13B, "R" represents a physical pixel to which a red color filter is assigned and a red image pixel corresponding to the physical pixel to which the red color filter is assigned, "G" represents a physical pixel to which a green color filter is assigned and a green image pixel corresponding to the physical pixel to which the green color filter is assigned, and "B" represents a physical pixel to which a blue color filter is assigned and a blue image pixel corresponding to the physical pixel to which the blue color filter is assigned.

As an example, as shown in FIG. 13A, the imaging control unit 90 performs control of causing the image sensor 130 before movement to perform the imaging. As a result, an image 1-1 corresponding to the arrangement of the plurality of color filters is obtained. Next, the imaging control unit 90 performs control of moving the image sensor 130 in the +X direction by a movement amount of 1.0×p [μm], and performs control of causing the image sensor 130 after movement to perform the imaging. As a result, an image 1-2 is obtained. Next, the imaging control unit 90 performs control of moving the image sensor 130 in the -Y direction by a movement amount of 1.0×p [μm], and performs control of causing the image sensor 130 after movement to perform the imaging. As a result, an image 1-3 is obtained. Next, the imaging control unit 90 performs control of moving the image sensor 130 in the -X direction by a movement amount of 1.0×p [μm], and performs control of causing the image sensor 130 after movement to perform the imaging. As a result, an image 1-4 is obtained. In FIG. 13A, a part of the images 1-1 to 1-4, that is, images for 4×4=16 image pixels obtained, respectively, before and after movement of the image sensor 130 are shown, respectively.

The images 1-1 to 1-4 obtained in this way represent the physical pixel disposition before and after movement of the image sensor 130. As described above, the imaging control unit 90 performs control of moving the image sensor 130 in the X direction or the Y direction by a movement amount of 1.0×p [μm]. As a result, for example, in the images 1-1 to 1-4, in a case in which any physical pixel before movement is a third physical pixel before movement and the physical pixel before movement to which the color filter of the same color as the third physical pixel before movement is assigned is a fourth physical pixel, the third physical pixel after movement overlaps with the fourth physical pixel before movement. For example, in the example shown in FIG. 13A, a green physical pixel at a position at which the image 1-1 is obtained overlaps with another green physical pixel at a position at which the image 1-3 is obtained. Similarly, in the example shown in FIG. 13A, a green physical pixel at a position at which the image 1-2 is obtained overlaps with another green physical pixel at a position at which the image 1-4 is obtained.

As described above, such that the images 1-1 to 1-4 are obtained, the imaging control unit 90 performs control of moving, in the physical pixel disposition before and after movement of the image sensor 130, the image sensor 130 to a position at which the third physical pixel after movement to a location that overlaps with the fourth physical pixel to which the color filter of the same color as the third physical pixel before movement is assigned is positioned.

In the example shown in FIG. 13A, in a case in which the green physical pixel at the position at which the image 1-1 is obtained is any physical pixel before movement of the image sensor 130, the green physical pixel corresponds to an example of a "third physical pixel" according to the technology of the present disclosure, and another green physical pixel at the position at which the image 1-3 is obtained corresponds to an example of a "fourth physical pixel' according to the technology of the present disclosure. In addition, in the example shown in FIG. 13B, in a case in which the green physical pixel at the position at which the image 1-2 is obtained is any physical pixel before movement of the image sensor 130, the green physical pixel corresponds to an example of a "third physical pixel" according to the technology of the present disclosure, and another green physical pixel at the position at which the image 1-4 is obtained corresponds to an example of a "fourth physical pixel' according to the technology of the present disclosure.

In addition, for example, with the image sensor 130 which is the color type image sensor to which the color filters of different colors are assigned in the Bayer arrangement, the imaging control unit 90 performs control of moving the image sensor 130 in the following manner. That is, in a case in which the pitches between the plurality of physical pixels are p [μm], the natural number of 2 or more is m, and the pure decimal is d, the imaging control unit 90 performs control of moving the image sensor 130 in the +X direction by a movement amount of (m+d)×p [μm] while fixing the position of the image sensor 130 in the Y direction. For example, in a case in which m=2 and d=0.5, the movement amount is defined as 2.5×p. For example, the imaging control unit 90 performs control of moving the image sensor 130 in the +X direction by a movement amount of 2.5×p [μm]. Then, the imaging control unit 90 performs control of causing the image sensor 130 after movement to perform the imaging. As a result, an image 2-1 is obtained. In addition, the imaging control unit 90 performs control of moving the image sensor 130 and control of causing the image sensor 130 after movement to perform the imaging in the same manner as in the case in which the images 1-2 to 1-4 are obtained. As a result, images 2-2 to 2-4 are obtained.

Similarly, the imaging control unit 90 performs control of moving the image sensor 130 in the −Y direction by a movement amount of 2.5×p [μm] while fixing the position of the image sensor 130 in the X direction. Then, the imaging control unit 90 performs control of causing the image sensor 130 after movement to perform the imaging. As a result, an image 3-1 is obtained. In addition, the imaging control unit 90 performs control of moving the image sensor 130 and control of causing the image sensor 130 after movement to perform the imaging in the same manner as in the case in which the images 1-2 to 1-4 are obtained. As a result, images 3-2 to 3-4 are obtained.

Similarly, the imaging control unit 90 performs control of moving the image sensor 130 in the −X direction by a movement amount of 2.5×p [μm] while fixing the position of the image sensor 130 in the Y direction. Then, the imaging control unit 90 performs control of causing the image sensor 130 after movement to perform the imaging. As a result, an image 4-1 is obtained. In addition, the imaging control unit 90 performs control of moving the image sensor 130 and control of causing the image sensor 130 after movement to perform the imaging in the same manner as in the case in which the images 1-2 to 1-4 are obtained. As a result, images 4-2 to 4-4 are obtained.

The storage processing unit 92 performs processing of storing, in the image memory 62, the plurality of images 1-1 to 4-4 obtained by being captured by the image sensor 130.

As an example, as shown in FIG. 13A, the generation unit 94 generates a plurality of monochromatic images R-1 to B-4 for each color of the color filter based on the plurality of images 1-1 to 4-4. The monochromatic image R-1 is a red image generated based on the red pixels among the images 1-1 to 1-4, the monochromatic image R-2 is a red image generated based on the red pixels among the images 2-1 to 2-4, the monochromatic image R-3 is a red image generated based on the red pixels among the images 3-1 to 3-4, and the monochromatic image R-4 is a red image generated based on the red pixels among the images 4-1 to 4-4.

Similarly, the monochromatic image G-1 is a green image generated based on the green pixels among the images 1-1 to 1-4, the monochromatic image G-2 is a green image generated based on the green pixels among the images 2-1 to 2-4, the monochromatic image G-3 is a green image generated based on the green pixels among the images 3-1 to 3-4, and the monochromatic image G-4 is a green image generated based on the green pixels among the images 4-1 to 4-4.

Similarly, the monochromatic image B-1 is a blue image generated based on the blue pixels among the images 1-1 to 1-4, the monochromatic image B-2 is a blue image generated based on the blue pixels among the images 2-1 to 2-4, the monochromatic image B-3 is a blue image generated based on the blue pixels among the images 3-1 to 3-4, and the monochromatic image B-4 is a blue image generated based on the blue pixels among the images 4-1 to 4-4.

The generation of the monochromatic images R-1 to B-4 based on the plurality of images 1-1 to 4-4 is realized, for example, in the following manner. That is, for each color of the color filter, the arrangement order is determined based on the absolute positions before and after movement of the image sensor 130 for the plurality of image pixels obtained, respectively, before and after movement of the image sensor 130. The absolute position is a position with the center of the image pixel A and the center of the image pixel B as a reference. Next, the plurality of image pixels included in each of the plurality of images obtained before and after movement of the image sensor 130 are arranged based on the arrangement order described above. For example, the average value or the median value of the overlapping image pixels is adopted as the pixel value of the overlapping image pixels before and after movement of the image sensor 130. As a result, the monochromatic images R-1 to B-4 are obtained. In FIG. 13A, a part of the monochromatic images R-1 to B-4, that is, images for 4×4=16 image pixels are shown, respectively.

As an example, as shown in FIG. 13B, the generation unit 94 generates the plurality of monochromatic super-resolution images 200R, 200G and 200B for each color of the color filter by performing the super-resolution on the plurality of monochromatic images R-1 to B-4 obtained by being captured by the image sensor 40. The monochromatic super-resolution image 200R is a red super-resolution image generated based on the monochromatic images R-1 to 4, the monochromatic super-resolution image 200G is a green super-resolution image generated based on the monochromatic images G-1 to 4, and the monochromatic super-resolution image 200B is a blue super-resolution image generated based on the monochromatic images B-1 to 4.

The super-resolution of the monochromatic super-resolution images 200R, 200G and 200B based on the plurality of monochromatic images R-1 to B-4 is realized, for example, in the following manner. That is, for each color of the color filter, the arrangement order is determined based on the absolute positions before and after movement of the image sensor 130 for the plurality of image pixels obtained, respectively, before and after movement of the image sensor 130. The absolute position is a position with the center of the image pixel and the center of the image pixel as a reference. Next, the plurality of image pixels included in each of the plurality of images obtained before and after movement of the image sensor 130 are arranged based on the arrangement order described above. As a result, the monochromatic super-resolution images 200R, 200G and 200B are obtained. In FIG. 13B, a part of the monochromatic super-resolution images 200R, 200G, and 200B, that is, images for 8×8=64 image pixels are shown, respectively.

As an example, FIG. 13C shows the blue monochromatic super-resolution image 200B. In FIG. 13C, a part of the blue monochromatic super-resolution image 200B, that is, images for 13×12=156 image pixels obtained, respectively, before and after movement of the image sensor 130 are shown, respectively. In addition, FIG. 13 shows the addresses of the plurality of image pixels in the X direction and the addresses in the Y direction. The address x in the X direction and the address y in the Y direction represent any natural number of 1 or more.

As shown above, the imaging control unit 90 repeatedly performs control of moving the image sensor 130 in the +X direction by a movement amount of 1.0×p [μm], moving the image sensor 130 in the −Y direction by a movement amount of 1.0×p [μm], moving the image sensor 130 in the −X direction by a movement amount of 1.0×p [μm], and then moving the image sensor 130 in the X direction or the Y direction by a movement amount of 2.5×p [μm]. As a result, as represented in the blue monochromatic super-resolution image 200B, in a case in which the image pixel corresponding to any physical pixel before movement is the first image pixel, another image pixel to which the color filter of the same color as the first image pixel is assigned is the second image pixel, and the image pixel corresponding to any physical pixel after movement is the first image pixel, the first image pixel is adjacent to the second image pixel.

In the example shown in FIG. 13C, for example, in a case in which the image pixel of the address (x,y) is the first image pixel, the image pixel of the address (x+1,y) is the second image pixel, and the image pixel of the address (x,y) is the first image pixel, the image pixel of the address (x,y), which is the first image pixel, is adjacent to the image pixel of the address (x+1,y), which is the second image pixel.

The plurality of image pixels correspond to the positions of the plurality of physical pixels before and after movement of the image sensor 130, respectively. Therefore, the monochromatic super-resolution image 200B represents the physical pixel disposition before and after movement of the image sensor 130. For example, in a case in which the physical pixel corresponding to the first image pixel is the first physical pixel and the physical pixel corresponding to the second image pixel is the second physical pixel, the imaging control unit 90 performs control of moving, in the physical pixel disposition before and after movement of the image sensor 130 represented by the super-resolution image 120, the image sensor 130 to a location at which the first physical pixel after movement to the location adjacent to the second physical pixel different from the first physical pixel before movement is positioned. In other words, the imaging control unit 90 moves the image sensor 130 such that the physical pixel disposition before and after movement of the image sensor 130 represented by the monochromatic super-resolution image 200B becomes the physical pixel disposition in which the adjacent image pixels included in the monochromatic super-resolution image 200B are made to be the image pixels corresponding to the different physical pixels.

As an example of such control, as shown above, the imaging control unit 90 repeatedly performs control of moving the image sensor 130 in the +X direction by a movement amount of 1.0×p [μm], moving the image sensor 130 in the −Y direction by a movement amount of 1.0×p [μm], moving the image sensor 130 in the −X direction by a movement amount of 1.0×p [μm], and then moving the image sensor 130 in the X direction or the Y direction by a movement amount of 2.5×p [μm]. As described above, the physical pixel disposition before and after movement of the image sensor 130 is represented by, for example, the super-resolution image 120, and the physical pixel disposition is realized regardless of whether or not there is a space for one physical pixel between the physical pixels of the image sensor 40.

It should be noted that, in the example shown in FIG. 13C, for example, in a case in which the physical pixel of the address (x,y) is the first physical pixel before movement of the image sensor 130, the physical pixel of the address (x,y) corresponds to an example of a "first physical pixel" according to the technology of the present disclosure, and the physical pixel of the address (x+1,y), which is the second physical pixel different from the physical pixel of the address (x,y) before movement, corresponds to an example of a "second physical pixel" according to the technology of the present disclosure. In addition, for example, the image pixel before movement of the address (x,y) is an example of an "image pixel corresponding to the first physical pixel before movement" according to the technology of the present disclosure, the image pixel of the address (x+1,y) is an example of an "image pixel corresponding to a second physical pixel different from the first physical pixel before movement" according to the technology of the present disclosure, and the image pixel after movement of the address (1,1) is an example of an "image pixel corresponding to the first physical pixel after movement" according to the technology of the present disclosure.

For example, as shown in FIG. 13C, the detection unit 96 calculates the degree of difference in pixel values between the image pixels of the same color corresponding to the second physical pixel before movement and the first physical pixel after movement, respectively, among the plurality of image pixels included in the monochromatic super-resolution image 200B. For example, the detection unit 96 sequentially calculates the degree of difference in pixel values between all the target image pixels. In FIG. 13C, as an example of the target image pixel, the image pixel of the address (x,y) and the image pixel of the address (x+1,y) is highlighted (displayed by a circle), and a state is shown in which the degree of difference in pixel values between the image pixel of the address (x,y) and the image pixel of the address (x+1,y) is calculated.

Also, the detection unit 96 detects the defective physical pixel from the plurality of physical pixels based on the calculated degree of difference. Various methods can be applied as the method of detecting the defective physical pixel. For example, as described in the second embodiment, the detection unit 96 detects the defective physical pixel by using a pattern matching method of comparing the pattern of the pixel values of the image pixels for which the degree of difference is calculated and the image pixels in the vicinity thereof with the abnormal pixel value pattern.

In addition, the detection unit 96 detects the defective physical pixels for the red monochromatic super-resolution image 200R and the green monochromatic super-resolution image 200G similarly to the monochromatic super-resolution image 200B.

It should be noted that, as described above, in the process in which the monochromatic images R-1 to B-4 are generated, in a case in which any physical pixel before movement is the third physical pixel before movement and the physical pixel before movement to which the color filter of the same color as the third physical pixel before movement is assigned is the fourth physical pixel, the third physical pixel after movement overlaps with the fourth physical pixel before movement. As shown in FIG. 13A, the detection unit 96 may detect the defective physical pixel by using the fact that the third physical pixel after movement overlaps with the fourth physical pixel before movement in the process in which the monochromatic images R-1 to B-4 are generated. That is, the detection unit 96 may detect the defective physical pixel from the plurality of physical pixels based on the degree of difference in pixel values between the image pixels of the same color corresponding to the fourth physical pixel before movement and the third physical pixel after movement, respectively, among the plurality of image pixels included in each of the plurality of images. In addition, for example, the detection unit 96 may sequentially calculate the degree of difference in pixel values between all the target image pixels. Then, the detection unit 96 may detect the defective physical pixel from the plurality of physical pixels based on the calculated degree of difference. Moreover, the defective physical pixel may be detected only for any one or two of the plurality of monochromatic super-resolution images 200B, 200R, and 200G.

The correction unit 98 corrects the pixel value of the image pixel corresponding to the defective physical pixel detected by the detection unit 96, based on the pixel value of the image pixel adjacent to the corresponding image pixel. Various methods can be applied as the method of correcting the pixel value. For example, as described in the second embodiment, the correction unit 98 performs the correction by setting the pixel value of the image pixel corresponding to the defective physical pixel detected by the detection unit 96 to the average value or the median value of the pixel value of the image pixel adjacent to the corresponding image pixel.

It should be noted that, in this example, in a case in which it is detected that the physical pixel of the address (x,y) is the defective physical pixel, the image pixel of the address (x,y) corresponds to an example of a "first image pixel corresponding to the defective physical pixel" according to the technology of the present disclosure, and the image pixel adjacent to the image pixel of the address (x,y) corresponds to an example of a "second image pixel adjacent to the first image pixel" according to the technology of the present disclosure.

In addition, similarly to the monochromatic super-resolution image 200B, the detection unit 96 corrects the pixel value of the image pixel corresponding to the defective physical pixel, also for the red monochromatic super-resolution image 200R and the green monochromatic super-resolution image 200G, based on the pixel value of the image pixel adjacent to the corresponding image pixel.

The output unit 100 performs processing of combining the plurality of corrected monochromatic super-resolution images 200R, 200G, and 200B, and outputting the combined composite image to the display 26. As a result, the composite image obtained by combining the plurality of corrected monochromatic super-resolution images 200R, 200G, and 200B in a state in which the pixel value of the image pixel corresponding to the defective physical pixel is corrected is displayed on the display 26. For example, in a case in which the image pixel corresponding to the defective physical pixel is the white scratch or the black scratch, the composite image corrected such that the white scratch or the black scratch is not conspicuous is displayed on the display 26.

It should be noted that an action of the imaging apparatus 10 (operation of the imaging apparatus 10) according to the fourth embodiment is the same as the action of the first embodiment.

As described above, in the imaging apparatus 10 according to the fourth embodiment, control of moving, in the physical pixel disposition before and after movement of the image sensor 130 including the plurality of physical pixels, the image sensor 130 to a location at which any first physical pixel after movement to a location adjacent to the second physical pixel different from any first physical pixel before movement is positioned is performed. In addition, control of causing the image sensor 130 to perform the imaging before and after movement is performed. Then, the defective physical pixel is detected from the plurality of physical pixels based on the degree of difference in pixel values between the image pixels corresponding to the second physical pixel before movement and the first physical pixel after movement, respectively, among the plurality of image pixels included in each of the plurality of images obtained by being captured by the image sensor 130. Therefore, it is possible to detect the defective physical pixel from the plurality of physical pixels based on the plurality of images obtained by being captured by the image sensor 130 before and after movement.

In addition, in the imaging apparatus 10 according to the fourth embodiment, control of moving, in the physical pixel disposition before and after movement of the image sensor 130, the image sensor 130 to a location at which the first physical pixel after movement to a location adjacent to the second physical pixel to which the color filter of the same color as any first physical pixel before movement is assigned is positioned is performed. In addition, control of causing the image sensor 130 to perform the imaging before and after movement is performed. Then, the defective physical pixel is detected from the plurality of physical pixels based on the degree of difference in pixel values between the image pixels of the same color corresponding to the second physical pixel before movement and the first physical pixel after movement, respectively, among the plurality of image pixels included in each of the plurality of images obtained by being captured by the image sensor 130. Therefore, for example, it is possible to improve the detection accuracy of the defective physical pixel as compared with a case in which the defective physical pixel is detected from the plurality of physical pixels based on the degree of difference in pixel values between the image pixels of different colors.

In addition, in the imaging apparatus 10 according to the fourth embodiment, for example, control of moving, in the physical pixel disposition before and after movement of the image sensor 130, the image sensor 130 to a position at which the third physical pixel after movement to a location that overlaps with the fourth physical pixel to which the color filter of the same color as the third physical pixel before movement is assigned is positioned is performed. In addition, control of causing the image sensor 130 to perform the imaging before and after movement is performed. Then, the defective physical pixel is detected from the plurality of physical pixels based on the degree of difference in pixel values between the image pixels of the same color corresponding to the fourth physical pixel before movement and the third physical pixel after movement, respectively, among the plurality of image pixels included in each of the plurality of images obtained by being captured by the image sensor 130. Therefore, it is possible to improve the detection accuracy of the defective physical pixel as compared with a case in which the defective physical pixel is detected from the plurality of physical pixels based only on the degree of difference in pixel values between the image pixels of the same color corresponding to the second physical pixel before movement and the first physical pixel after movement, respectively, among the plurality of image pixels included in each of the plurality of images obtained by being captured by the image sensor 130.

In addition, in the imaging apparatus 10 according to the fourth embodiment, processing of storing, in the image memory 62, the plurality of images obtained by being captured by the image sensor 130 is performed. Then, the defective physical pixel is detected from the plurality of physical pixels based on the degree of difference in pixel values between the image pixels among the plurality of image pixels included in each of the plurality of images stored in the image memory 62. Therefore, it is possible to detect the defective physical pixel from the plurality of physical pixels based on the plurality of images stored in the image memory 62.

Moreover, in the imaging apparatus 10 according to the fourth embodiment, the pixel value of the first image pixel corresponding to the defective physical pixel is corrected based on the pixel value of the second image pixel adjacent to the first image pixel. Therefore, it is possible to rectify a defect of the image pixel corresponding to the defective physical pixel.

In addition, in the imaging apparatus 10 according to the fourth embodiment, the plurality of images are subjected to the super-resolution, the plurality of monochromatic super-resolution images 200R, 200G, and 200B are generated for each color of the color filter, and the plurality of monochromatic super-resolution images 200R, 200G, and 200B are combined. Therefore, an image having a higher resolution can be displayed on the display 26 as compared with a case in which an image that is not subjected to the super-resolution is output.

In addition, the imaging apparatus 10 comprises the controller 60 that detects the defective physical pixel, the image sensor 130, and the shake correction mechanism 46 that moves the image sensor 130. Therefore, in the imaging apparatus 10, the imaging by the image sensor 130, the movement of the image sensor 130, and the detection of the defective physical pixel can be continuously performed.

It should be noted that, in the fourth embodiment, the imaging control unit 90 repeatedly performs control of moving the image sensor 130 in the +X direction by a movement amount of 1.0×p [μm], moving the image sensor 130 in the −Y direction by a movement amount of 1.0×p [μm], moving the image sensor 130 in the −X direction by a movement amount of 1.0×p [μm], and moving the image sensor 130 in the X direction or the Y direction by a movement amount of 2.5×p [μm] in this order, but the order and direction for moving the image sensor 130 may be the order and direction other than the above description.

In addition, in the fourth embodiment, the imaging control unit 90 moves the image sensor 130 by a movement amount of 2.5×p [μm], but in a case in which the pitches between the plurality of physical pixels are 1, the imaging control unit 90 may move the image sensor 130 in the X direction or the Y direction by a movement amount that is a decimal larger than 1, under the condition that the monochromatic super-resolution images 200R, 200G, and 200B are obtained. Even with this configuration, in the physical pixel disposition before and after movement of the image sensor 130, the first physical pixel after movement can be positioned at a location adjacent to the second physical pixel different from the first physical pixel before movement.

In addition, in the fourth embodiment, in a case in which the natural number is n and the pure decimal is d, the imaging control unit 90 may move the image sensor 130 in the X direction or the Y direction by a movement amount of (n+d)×p [μm], under the condition that the monochromatic super-resolution images 200R, 200G, and 200B are obtained. Even with this configuration, in the physical pixel disposition before and after movement of the image sensor 130, the first physical pixel after movement can be positioned at a location adjacent to the second physical pixel different from the first physical pixel before movement.

In addition, in the fourth embodiment, in a case in which m is the natural number of 2 or more and the pure decimal is d, the imaging control unit 90 may move the image sensor 130 in the X direction or the Y direction by a movement amount of (m+d)×p [μm], under the condition that the super-resolution image 120 is obtained. Even with this configuration, in the physical pixel disposition before and after movement of the image sensor 130, the first physical pixel after movement can be positioned at a location adjacent to the second physical pixel different from the first physical pixel before movement.

It should be noted that, in a case in which the imaging control unit 90 moves the image sensor 130 by a movement amount of 2.5×p [μm], for example, it is possible to obtain the super-resolution image 120 having a higher resolution than a case in which the image sensor 130 is moved by a movement amount that is a decimal larger than 2.5×p or a movement amount that is a decimal smaller than 2.5×p and larger than 2.0×p.

Moreover, in the fourth embodiment, the output unit 100 may output the positional information corresponding to the position of the defective physical pixel. The positional information is, for example, information corresponding to the address of the physical pixel. With this configuration, it is possible to specify the position of the defective physical pixel based on the positional information corresponding to the position of the output defective physical pixel.

In addition, in the fourth embodiment, the detection unit 96 may extract an out-of-definition image pixel in which the pixel value is out of a predetermined range from among the plurality of image pixels, and detect the defective physical pixel based on a degree of difference between the pixel value of the out-of-definition image pixel and the pixel value of the image pixel adjacent to the out-of-definition image pixel. With this configuration, it is possible to reduce the number of calculation of the degree of difference as compared with a case in which the degree of difference in pixel values between the image pixels corresponding to the all of the second physical pixels before movement and the first physical pixels after movement, respectively, is calculated.

In addition, in the fourth embodiment, the detection unit 96 detects the defective physical pixel from the plurality of physical pixels in the process in which the monochromatic super-resolution images 200R, 200G and 200B are generated. However, in processing different from the process in which the monochromatic super-resolution images 200R, 200G, and 200B are generated, the defective physical pixel may be detected from the plurality of physical pixels based on the plurality of images obtained by being captured by the image sensor 130 before and after movement, by the same method described above.

In addition, in the fourth embodiment, as an example of the color type image sensor 130, a color type image sensor having Bayer arrangement is used. However, for example, a color type image sensor having another arrangement, such as stripe arrangement, delta arrangement, Bayer arrangement, and X-Trans (registered trademark) type arrangement, may be used. Even in a case in which the color type image sensor having another arrangement is used, the defective physical pixel can be detected from the plurality of physical pixels based on the plurality of images obtained by being captured by the image sensor 130 before and after movement by the same method as described above.

Figure 19:
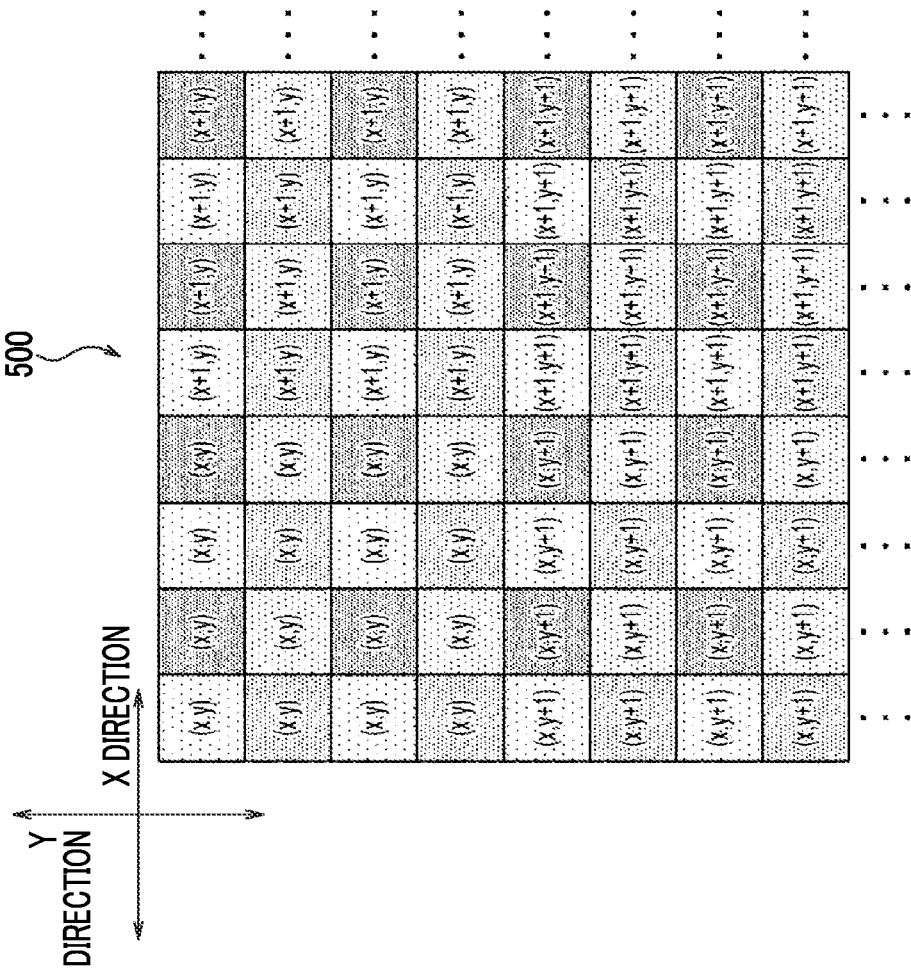
FIG. 19 is a front view showing a comparative example of the monochromatic super-resolution image.

It should be noted that FIG. 19 shows a super-resolution image 500 obtained in a comparative example with respect to the fourth embodiment. The super-resolution image 500 is an image obtained by moving the image sensor 130 (see FIG. 13A) by a movement amount of 0.5×p [μm] instead of movement by the image sensor 40 by 2.5×p [μm]. In this case, in the physical pixel disposition before and after movement of the image sensor 130, the first physical pixel after movement is positioned at a location adjacent to the first physical pixel before movement. Therefore, in the super-resolution image 500, since the pixel values between the adjacent image pixels are the same, it is not possible to detect the defective physical pixel from the plurality of physical pixels.

Figure 14:
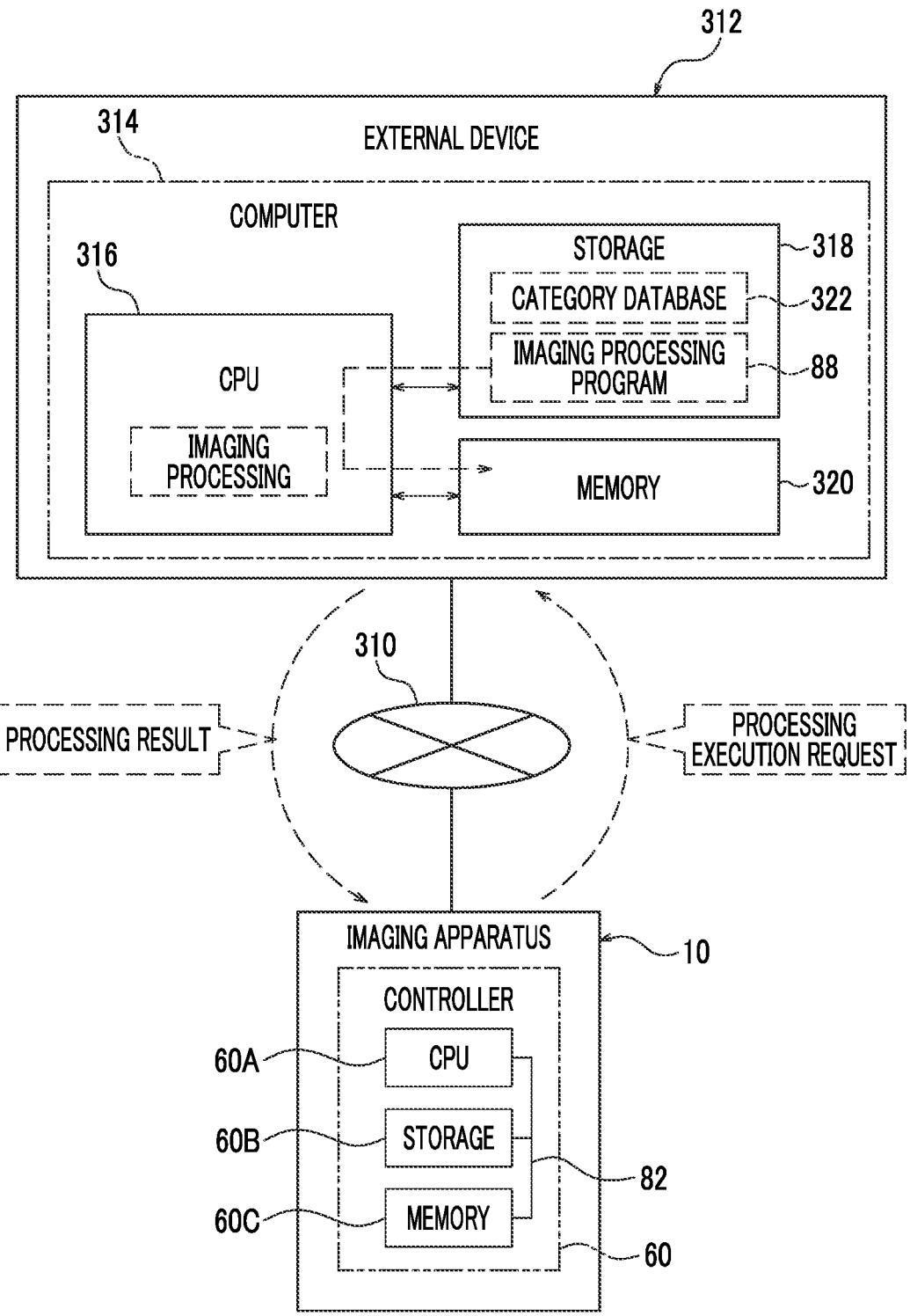
FIG. 14 is a block diagram showing an example of a first modification aspect of the imaging apparatus.

Next, the description of a modification example common to the embodiments will be made. In the embodiment described above, the form example has been described in which the imaging processing is executed by the controller 60 in the imaging apparatus 10, but the technology of the present disclosure is not limited to this. For example, as shown in FIG. 14, the imaging processing may be executed by a computer 314 in an external device 312 communicably connected to the imaging apparatus 10 via a network 310, such as LAN or WAN. In the example shown in FIG. 14, the computer 314 comprises a CPU 316, a storage 318, and a memory 320. A category database 322 is constructed in the storage 318, and the imaging processing program 88 is stored in the storage 318.

The imaging apparatus 10 requests the external device 312 to execute the imaging processing via the network 310. In response to the request, the CPU 316 of the external device 312 reads out the imaging processing program 88 from the storage 318, and executes the imaging processing program 88 on the memory 320. The CPU 316 performs the imaging processing according to the imaging processing program 88 executed on the memory 320. Moreover, the CPU 316 provides a processing result obtained by executing the imaging processing to the imaging apparatus 10 via the network 310.

In addition, the imaging apparatus 10 and the external device 312 may execute the imaging processing in a distributed manner, or a plurality of devices including the imaging apparatus 10 and the external device 312 may execute the imaging processing in a distributed manner.

In addition, in the embodiments described above, a physical camera (hereinafter, also referred to as a "physical camera") is shown as an example of the imaging apparatus 10. However, the technology of the present disclosure is not limited to this, and a virtual camera that generates a virtual viewpoint image data by virtually imaging the subject from a virtual viewpoint based on captured image data obtained by being captured by a plurality of physical cameras set at different positions may be applied instead of the physical camera. In this case, the image represented by the virtual viewpoint image data, that is, the virtual viewpoint image is an example of an "image" according to the technology of the present disclosure.

Figure 15:
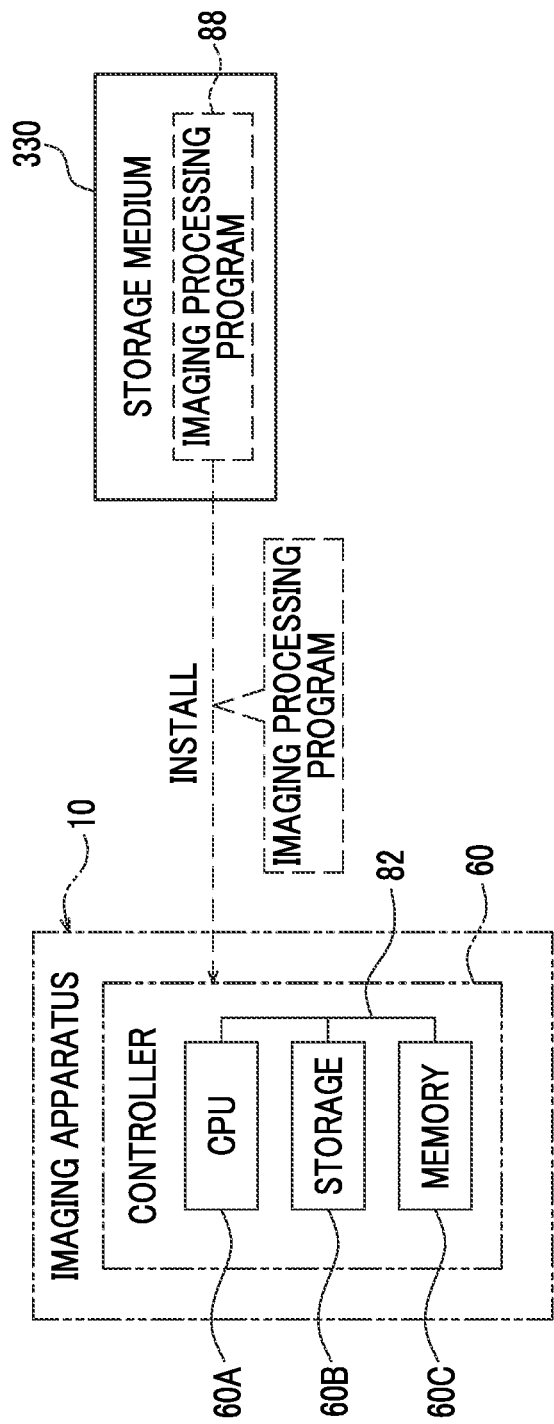
FIG. 15 is a block diagram showing an example of a second modification aspect of the imaging apparatus.

In addition, in the embodiments described above, the form example has been described in which the imaging processing program 88 is stored in the storage 60B. However, the technology of the present disclosure is not limited to this. For example, the imaging processing program 88 may be stored in a storage medium 330, as shown in FIG. 15. The storage medium 330 is a non-temporary storage medium. Examples of the storage medium 330 include any portable storage medium, such as an SSD or a USB memory.

The imaging processing program 88 stored in the storage medium 330 is installed in the controller 60. The CPU 60A executes the imaging processing according to the imaging processing program 88.

In addition, the imaging processing program 88 may be stored in a storage unit of another computer or server device connected to the controller 60 via a communication network (not shown), and the imaging processing program 88 may be downloaded in response to the request of the imaging apparatus 10 and installed in the controller 60.

It should be noted that it is not necessary to store the entire imaging processing program 88 in the storage unit of the other computer or server device connected to the controller 60 or the storage 60B, and a part of the imaging processing program 88 may be stored.

In the example shown in FIG. 15, the aspect example is shown in which the controller 60 is built in the imaging apparatus 10, but the technology of the present disclosure is not limited to this, and for example, the controller 60 may be provided outside the imaging apparatus 10.

In the example shown in FIG. 15, the CPU 60A is a single CPU, but may be a plurality of CPUs. Also, a GPU may be applied instead of the CPU 60A.

In the example shown in FIG. 15, the controller 60 is shown as an example, but the technology of the present disclosure is not limited to this, and a device including an ASIC, an FPGA, and/or a PLD may be applied instead of the controller 60. Also, a hardware configuration and a software configuration may be used in combination, instead of the controller 60.

As the hardware resource for executing the imaging processing described in the embodiments, the following various processors can be used. Examples of the processor include a CPU which is a general-purpose processor functioning as the hardware resource for executing the imaging processing by executing software, that is, a program. Also, examples of the processor include a dedicated electric circuit which is a processor having a circuit configuration specially designed for executing specific processing, such as an FPGA, a PLD, or an ASIC. A memory is also coupled to or integrated with any processor, and any processor executes the imaging processing using the memory.

The hardware resource for executing the imaging processing may be configured by one of these various processors, or may be configured by a combination (for example, a combination of a plurality of FPGAs or a combination of a CPU and an FPGA) of two or more processors of the same type or different types. Also, the hardware resource for executing the imaging processing may be one processor.

As an example of the configuration with one processor, first, there is a form in which one processor is configured by a combination of one or more CPUs and software, and this processor functions as the hardware resource for executing the imaging processing. Secondly, as represented by SoC, there is a form in which a processor that realizes the functions of the entire system including a plurality of hardware resource for executing the imaging processing with one IC chip is used. In this way, the imaging processing is realized by using one or more of the various processors described above as the hardware resource.

Further, as the hardware structure of these various processors, more specifically, an electric circuit in which circuit elements, such as semiconductor elements, are combined can be used. Also, the imaging processing is merely an example. Accordingly, it is needless to say that unnecessary steps may be deleted, new steps may be added, or the processing order may be changed within a range that does not deviate from the gist.

The described contents and the shown contents are the detailed description of the parts according to the technology of the present disclosure, and are merely examples of the technology of the present disclosure. For example, the descriptions of the configurations, the functions, the actions, and the effects are the descriptions of examples of the configurations, the functions, the actions, and the effects of the parts according to the technology of the present disclosure. It is needless to say that unnecessary parts may be deleted, new elements may be added, or replacements may be made with respect to the described contents and the shown contents within a range that does not deviate from the gist of the technology of the present disclosure. In addition, in order to avoid complications and facilitate understanding of the parts according to the technology of the present disclosure, in the described contents and the shown contents, the descriptions of common technical knowledge and the like that do not particularly require the description for enabling the implementation of the technology of the present disclosure are omitted.

In the present specification, "A and/or B" is synonymous with "at least one of A or B". That is, "A and/or B" means that it may be only A, only B, or a combination of A and B. In addition, in the present specification, in a case in which three or more matters are associated and expressed by "and/or", the same concept as "A and/or B" is applied.

All documents, patent applications, and technical standards described in the present specification are incorporated into the present specification by reference to the same extent as in a case in which the individual documents, patent applications, and technical standards are specifically and individually stated to be described by reference.

With regard to the embodiments described above, the following supplementary notes are further disclosed.

SUPPLEMENTARY Note 1

A detection device comprising a processor, and a memory coupled to or integrated with the processor, in which the processor acquires, in physical pixel disposition before and after movement of an image sensor having a plurality of physical pixels arranged in a first direction and a second direction intersecting the first direction, a plurality of images obtained by being captured by the image sensor before and after movement in which the image sensor is moved to a location at which a first physical pixel after movement to a location adjacent to a second physical pixel different from the first physical pixel before movement is positioned, calculates a degree of difference in pixel values between image pixels corresponding to the second physical pixel before movement and the first physical pixel after movement, respectively, among a plurality of image pixels included in each of the plurality of acquired images, and detects a defective physical pixel from the plurality of physical pixels based on the degree of difference.

Supplementary Note 2

A detection device comprising a processor, and a memory coupled to or integrated with the processor, in which the processor performs, in physical pixel disposition before and after movement of a color type image sensor in which color filters of different colors are assigned to a plurality of physical pixels in a base arrangement having periodicity, control of moving the image sensor to a location at which a third physical pixel after movement to a location that overlaps with a fourth physical pixel to which a color filter of the same color as the third physical pixel before movement is assigned is positioned, causes the image sensor to perform imaging before and after movement, and detects a defective physical pixel from the plurality of physical pixels based on a degree of difference in pixel values between image pixels of the same color corresponding to the fourth physical pixel before movement and the third physical pixel after movement, respectively, among the plurality of image pixels included in each of a plurality of images obtained by being captured by the image sensor.

Supplementary Note 3

A detection device comprising a processor, and a memory coupled to or integrated with the processor, in which the processor performs, in physical pixel disposition before and after movement of a color type image sensor in which color filters of different colors are assigned to a plurality of physical pixels in a base arrangement having periodicity, control of moving the image sensor to a location at which a first physical pixel after movement to a location adjacent to a second physical pixel to which a color filter of the same color as the first physical pixel before movement is assigned is positioned, causes the image sensor to perform imaging before and after movement, and detects a defective physical pixel from the plurality of physical pixels based on a degree of difference in pixel values between image pixels of the same color corresponding to the second physical pixel before movement and the first physical pixel after movement, respectively, among the plurality of image pixels included in each of a plurality of images obtained by being captured by the image sensor.

Supplementary Note 4

A detection device comprising a processor, and a memory coupled to or integrated with the processor, in which the processor performs, in physical pixel disposition before and after movement of a color type image sensor in which color filters of different colors are assigned to a plurality of physical pixels in a base arrangement having periodicity, control of moving the image sensor to a location at which a first physical pixel after movement to a location adjacent to a second physical pixel to which a color filter of the same color as the first physical pixel before movement is assigned is positioned, and to a location at which a third physical pixel after movement to a location that overlaps with a fourth physical pixel in which a color filter of the same color as the third physical pixel before movement is assigned is positioned, causes the image sensor to perform imaging before and after movement, and detects a defective physical pixel from the plurality of physical pixels based on a degree of difference in pixel values between image pixels of the same color corresponding to the second physical pixel before movement and the first physical pixel after movement, respectively, among the plurality of image pixels included in each of a plurality of images obtained by being captured by the image sensor.

Supplementary Note 5

The detection device according to Supplementary Note 4, in which the processor detects the defective physical pixel from the plurality of physical pixels based on a degree of difference in pixel values between image pixels of the same color corresponding to the fourth physical pixel before movement and the third physical pixel after movement, respectively, among the plurality of image pixels included in each of the plurality of images obtained by being captured by the image sensor.

What is claimed is:

1. A detection device comprising:
a processor; and
a memory coupled to or integrated with the processor,
wherein the processor is configured to:
in physical pixel disposition before and after movement of an image sensor having a plurality of physical pixels arranged in a first direction and a second direction intersecting the first direction, move the image sensor to a location at which a first physical pixel after movement to a location adjacent to a second physical pixel different from the first physical pixel before movement is positioned,
cause the image sensor to perform imaging before and after movement, and
detect a defective physical pixel from the plurality of physical pixels, based on a degree of difference in pixel values between image pixels corresponding to the second physical pixel before movement and the first physical pixel after movement, respectively, among a plurality of image pixels included in each of a plurality of images obtained by being captured by the image sensor.

2. The detection device according to claim 1,
wherein the processor is configured to:
store, in the memory, the plurality of images obtained by being captured by the image sensor, and
detect the defective physical pixel, based on the degree of difference in pixel values between the image pixels among the plurality of image pixels included in each of the plurality of images stored in the memory.

3. The detection device according to claim 1,
wherein, in a case in which pitches between the plurality of physical pixels in the first direction or the second direction are 1, the processor is configured to move the image sensor in the first direction or the second direction by a movement amount that is a decimal larger than 1.

4. The detection device according to claim 1,
wherein, in a case in which pitches between the plurality of physical pixels in the first direction or the second direction are p, a natural number is n, and a pure decimal is d, the processor is configured to move the image sensor in the first direction or the second direction by a movement amount of $(n+d) \times p$.

5. The detection device according to claim 1,
wherein the processor is configured to correct a pixel value of a first image pixel corresponding to the defective physical pixel based on a pixel value of a second image pixel adjacent to the first image pixel.

6. The detection device according to claim 1,
wherein the processor is configured to output positional information corresponding to a position of the defective physical pixel.

7. The detection device according to claim 1,
wherein the processor is configured to detect the defective physical pixel based on a degree of difference between a pixel value of an out-of-definition image pixel of which a pixel value is out of a predetermined range and a pixel value of an image pixel adjacent to the out-of-definition image pixel.

8. The detection device according to claim 1,
wherein the image sensor is a monochrome type image sensor.

9. The detection device according to claim 8,
wherein, in a case in which pitches between the plurality of physical pixels in the first direction or the second direction are p, the processor is configured to move the image sensor in the first direction or the second direction by a movement amount of $1.5 \times p$.

10. The detection device according to claim 1,
wherein the image sensor is a color type image sensor in which color filters of different colors are assigned to the plurality of physical pixels in a base arrangement having periodicity, and
in a case in which pitches between the plurality of physical pixels in the first direction or the second direction are p, a natural number is n, and the number of physical pixels per period of the base arrangement is T, the processor is configured to move the image sensor in the first direction or the second direction by a movement amount of $\{(T-1)+0.5\} \times n \times p$.

11. The detection device according to claim 10,
wherein the base arrangement is Bayer arrangement, and the movement amount is defined as $1.5 \times p$.

12. The detection device according to claim 10,
wherein the base arrangement is X-Trans (registered trademark) type arrangement, and
the movement amount is defined as $5.5 \times p$.

13. The detection device according to claim 1,
wherein the image sensor is a color type image sensor in which color filters of different colors are assigned to the plurality of physical pixels in a base arrangement having periodicity, and
the processor is configured to:
in the physical pixel disposition before and after movement of the image sensor, move the image sensor to a location at which a third physical pixel after movement to a location that overlaps with a fourth physical pixel to which a color filter of the same color as the third physical pixel before movement is assigned is positioned,
cause the image sensor to perform imaging before and after movement, and detect the defective physical pixel from the plurality of physical pixels based on a degree of difference in pixel values between image pixels of the same color corresponding to the fourth physical pixel before movement and the third physical pixel after movement, respectively, among the plurality of image pixels included in each of the plurality of images obtained by being captured by the image sensor.

14. The detection device according to claim 1, wherein the image sensor is a color type image sensor in which color filters of different colors are assigned to the plurality of physical pixels in a base arrangement having periodicity, and
the processor is configured to:
 in the physical pixel disposition before and after movement of the image sensor, move the image sensor to a location at which the first physical pixel after movement to a location adjacent to the second physical pixel to which a color filter of the same color as the first physical pixel before movement is assigned is positioned,
 cause the image sensor to perform imaging before and after movement, and
 detect the defective physical pixel from the plurality of physical pixels based on a degree of difference in pixel values between image pixels of the same color corresponding to the second physical pixel before movement and the first physical pixel after movement, respectively, among the plurality of image pixels included in each of the plurality of images obtained by being captured by the image sensor.

15. The detection device according to claim 14, wherein, in a case in which pitches between the plurality of physical pixels in the first direction or the second direction are p, m is a natural number of 2 or more, and a pure decimal is d, the processor performs control of moving the image sensor in the first direction or the second direction by a movement amount of $(m+d) \times p$.

16. The detection device according to claim 15, wherein the movement amount is defined as $2.5 \times p$.

17. The detection device according to claim 13, wherein the processor is configured to:
 perform super-resolution on the plurality of images to generate a plurality of monochromatic super-resolution images for each color of the color filter, and
 combine the plurality of monochromatic super-resolution images.

18. An imaging apparatus comprising:
the detection device according to claim 1;
the image sensor; and
a moving mechanism that moves the image sensor at least one of the first direction or the second direction.

19. A detection method comprising:
in physical pixel disposition before and after movement of an image sensor having a plurality of physical pixels arranged in a first direction and a second direction intersecting the first direction, moving the image sensor to a location at which a first physical pixel after movement to a location adjacent to a second physical pixel different from the first physical pixel before movement is positioned;
causing the image sensor to perform imaging before and after movement; and
detecting a defective physical pixel from the plurality of physical pixels based on a degree of difference in pixel values between image pixels corresponding to the second physical pixel before movement and the first physical pixel after movement, respectively, among a plurality of image pixels included in each of a plurality of images obtained by being captured by the image sensor.

20. A non-transitory computer-readable storage medium storing a program for causing a computer to execute a process comprising:
in physical pixel disposition before and after movement of an image sensor having a plurality of physical pixels arranged in a first direction and a second direction intersecting the first direction, moving the image sensor to a location at which a first physical pixel after movement to a location adjacent to a second physical pixel different from the first physical pixel before movement is positioned;
causing the image sensor to perform imaging before and after movement; and
detecting a defective physical pixel from the plurality of physical pixels based on a degree of difference in pixel values between image pixels corresponding to the second physical pixel before movement and the first physical pixel after movement, respectively, among a plurality of image pixels included in each of a plurality of images obtained by being captured by the image sensor.

* * * * *